United States Patent
Bartels et al.

(10) Patent No.: US 12,528,784 B2
(45) Date of Patent: Jan. 20, 2026

(54) ALKYNYL-(HETEROARYL)-CARBOXAMIDE HCN1 INHIBITORS

(71) Applicant: Hoffmann-La Roche Inc., Little Falls, NJ (US)

(72) Inventors: Bjoern Bartels, Schopfheim (DE); Amanda Lee Dupont, Riehen (CH); Benjamin J. Hall, Copenhagen (DK); Jean-Yves Wach, Basel (CH); Christian Schnider, Biel-Benken (CH); Patrick Schnider, Bottmingen (CH); Michael Reutlinger, Freiburg (DE); Eoin O'Connor, Basel (CH); Eva Katrin Harde, Basel (CH); Michael Weber, Sissach (CH)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 841 days.

(21) Appl. No.: 17/830,215

(22) Filed: Jun. 1, 2022

(65) Prior Publication Data
US 2022/0306607 A1     Sep. 29, 2022

Related U.S. Application Data

(63) Continuation of application No. PCT/EP2020/083851, filed on Nov. 30, 2020.

(30) Foreign Application Priority Data

Dec. 2, 2019   (EP) ...................................... 19212809

(51) Int. Cl.
| | | |
|---|---|---|
| A61P 25/00 | (2006.01) | |
| A61P 25/08 | (2006.01) | |
| A61P 25/16 | (2006.01) | |
| A61P 25/18 | (2006.01) | |
| A61P 25/30 | (2006.01) | |
| C07D 233/90 | (2006.01) | |
| C07D 401/04 | (2006.01) | |
| C07D 401/06 | (2006.01) | |
| C07D 401/14 | (2006.01) | |
| C07D 405/14 | (2006.01) | |
| C07D 409/14 | (2006.01) | |

(52) U.S. Cl.
CPC ......... *C07D 401/14* (2013.01); *C07D 233/90* (2013.01); *C07D 401/04* (2013.01); *C07D 401/06* (2013.01); *C07D 405/14* (2013.01); *C07D 409/14* (2013.01)

(58) Field of Classification Search
None
See application file for complete search history.

(56) References Cited

U.S. PATENT DOCUMENTS

| | | |
|---|---|---|
| 2002/0128263 A1 | 9/2002 | Mutel et al. |
| 2016/0264585 A1 | 9/2016 | Flohr et al. |

FOREIGN PATENT DOCUMENTS

| | | | |
|---|---|---|---|
| CN | 1759111 | | 4/2006 |
| CN | 1802368 | A | 7/2006 |
| CN | 102174017 | A | 9/2011 |
| CN | 103068372 | A | 4/2013 |
| CN | 104860864 | A | 8/2015 |
| JP | 2016050201 | A * | 4/2016 |
| WO | 2011/000915 | A1 | 1/2011 |
| WO | 2014/053409 | A1 | 4/2014 |

OTHER PUBLICATIONS

JP2016050201A_translated_claims (Year: 2016).*
JP2016050201A_translated_description (Year: 2016).*
International Preliminary Report on Patentability—PCT/EP2020/083851 issued May 17, 2022, pp. 1-10.
International Search Report with Written Opinion—PCT/EP2020/083851 mailed Jan. 18, 2021, pp. 1-14.
Mcclure, K.J. et al., "Discovery of a novel series of selective HCN1 blockers" Bioorg. Med. Chem. Lett. 21:5197-5201 (2011).
Romanelli, M.N. et al., "HCN Channels Modulators: The Need for Selectivity" Curr. Top .Med .Chem. 16:1764-1791 (2016).

* cited by examiner

*Primary Examiner* — Kortney L. Klinkel
*Assistant Examiner* — Alison Azar Salamatian
(74) *Attorney, Agent, or Firm* — Bradley Davis

(57) ABSTRACT

The present invention provides compounds of formula I

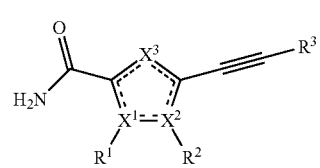

wherein $R^1$, $R^2$ or $R^3$ are as described herein, as well as pharmaceutically acceptable salts thereof. Further the present invention is concerned with the manufacture of the compounds of formula I, pharmaceutical compositions comprising them and their use as medicaments.

26 Claims, No Drawings

ALKYNYL-(HETEROARYL)-CARBOXAMIDE HCN1 INHIBITORS

This application is a continuation of International Application No. PCT/EP2020/083851 having an International filing date of Nov. 30, 2020, and which claims benefit of and priority to European Patent Application No. 19212809.8, filed Dec. 2, 2019; the contents of which are incorporated herein by reference in their entirety.

The present invention provides compounds which are inhibitors of the hyperpolarization-activated and cyclic nucleotide-gated (HCN) channel isoform 1 (HCN1), in particular wherein the compounds are selective over HCN2 and HCN4 isoforms, for use in the treatment, prevention and/or delay of progression of CNS disorders more particularly cognitive impairments associated with schizophrenia (CIAS), early infantile epileptic encephalopathies (EIEE) and mood disorders, most particularly cognitive impairments associated with schizophrenia, their manufacture and pharmaceutical compositing comprising them.

In particular, the present invention relates to compounds of formula I

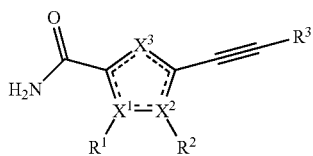

wherein
$X^1$ is either N or C
$X^2$ is either N or C
$X^3$ is either N or C
provided that at least one of $X^1$, $X^2$ and $X^3$ is N and that no more than two of $X^1$, $X^2$ and $X^3$ represent N and that if $X^1$ is N then $X^2$ can not be N;
the dotted lines represent a single or double bond, to enable the five membered rings to be aromatic;
$R^1$ is phenyl, N-heteroaryl, wherein said N-heteroaryl comprises 1, 2 or 3 nitrogen ring atoms and wherein said phenyl or said N-heteroaryl are optionally substituted with 1, 2, 3 or 4 substituents selected from $R^4$;
$R^2$ is hydrogen or $C_1$-$C_6$ alkyl, with the proviso that if $X^2$ is N then $R^2$ is not hydrogen;
$R^3$ is a heteroaryl or a phenyl, wherein said heteroaryl or said phenyl are optionally substituted with 1, 2, 3 or 4 substituents selected from $R^5$;
$R^4$ is independently selected from halogen, $C_1$-$C_6$ alkyl, $C_1$-$C_6$ alkoxy, cyano, halo$C_1$-$C_6$ alkyl and halo$C_1$-$C_6$ alkoxy; and
$R^5$ is independently selected from hydroxy, halogen, cyano, $C_1$-$C_6$ alkyl, $C_1$-$C_6$ alkoxy, halo$C_1$-$C_6$ alkyl and halo$C_1$-$C_6$ alkoxy, or
where two vicinal $R^5$ groups form a five-membered or six-membered heterocyclyl fused ring, where the heterocyclyl fused ring is optionally substituted with one or more groups independently selected from—hydroxy, halogen, $C_1$-$C_6$ alkyl, $C_1$-$C_6$ alkoxy, halo$C_1$-$C_6$ alkyl and halo$C_1$-$C_6$ alkoxy; or
pharmaceutically acceptable salts thereof.

Unless otherwise defined, all technical and scientific terms used herein have the same meaning as commonly understood by one of ordinary skill in the art to which this invention belongs. Although methods and materials similar or equivalent to those described herein can be used in the practice or testing of the invention, suitable methods and materials are described below.

All publications, patent applications, patents, and other references mentioned herein are incorporated by reference in their entirety.

The nomenclature used in this application is based on IUPAC systematic nomenclature, unless indicated otherwise.

Any open valency appearing on a carbon, oxygen, sulfur or nitrogen atom in the structures herein indicates the presence of a hydrogen, unless indicated otherwise.

"halo" or "halogen" means fluoro, chloro, bromo or iodo, particularly chloro or fluoro.

"hydroxy" refers to a —OH group.

"($C_1$-$C_6$)alkyl" refers to a branched or straight hydrocarbon chain of one to six carbon atoms, such as methyl, ethyl, n-propyl, isopropyl, n-butyl, isobutyl, sec-butyl, t-butyl, pentyl and hexyl.

"($C_1$-$C_6$)alkoxy" means a moiety of the formula —$OR^a$, wherein $R^a$ is an ($C_1$-$C_6$)alkyl moiety as defined herein. Examples of ($C_1$-$C_6$)alkoxy moieties include, but are not limited to, methoxy, ethoxy, isopropoxy, and the like.

The term "therapeutically effective amount" denotes an amount of a compound or molecule of the present invention that, when administered to a subject, (i) treats or prevents the particular disease, condition or disorder, (ii) attenuates, ameliorates or eliminates one or more symptoms of the particular disease, condition, or disorder, or (iii) prevents or delays the onset of one or more symptoms of the particular disease, condition or disorder described herein. The therapeutically effective amount will vary depending on the compound, the disease state being treated, the severity of the disease treated, the age and relative health of the subject, the route and form of administration, the judgement of the attending medical or veterinary practitioner, and other factors.

The term "perhalo($C_1$-$C_3$)alkyl" means an ($C_1$-$C_3$)alkyl group as defined above wherein all hydrogen atoms have been replaced with halogen atoms. More particularly "($C_1$-$C_3$)perhaloalkyl" is ($C_1$-$C_3$)perfluoroalkyl, most preferably trifluoromethyl.

"halo-($C_1$-$C_6$)alkyl" refers to an alkyl, as defined above, substituted with one or more halogen atoms, particularly with one to three halogen atoms. More particularly halo-($C_1$-$C_6$)alkyl is the chloro- and fluoro-($C_1$-$C_6$)alkyl. In some particular embodiment halo-($C_1$-$C_6$)alkyl refers to perhalo ($C_1$-$C_3$)alkyl, such as trifluoromethyl.

"halo-($C_1$-$C_6$)alkoxy" refers to an alkoxy, as defined above, substituted with one or more halogen atoms, particularly with one to three halogen atoms. More particularly halo-($C_1$-$C_6$)alkoxy are the chloro- and fluoro-($C_1$-$C_6$) alkoxy.

"Heteroaryl" means a monovalent monocyclic or bicyclic moiety of 5 to 12 ring atoms having at least one aromatic ring containing one, two, or three ring heteroatoms selected each independently from N, O, or S (preferably N or O), the remaining ring atoms being C, with the understanding that the attachment point of the heteroaryl moiety will be on an aromatic ring. More specifically the term heteroaryl includes, but is not limited to, pyridinyl, furanyl, thienyl, thiazolyl, isothiazolyl, triazolyl, imidazolyl, isoxazolyl, oxazolyl, pyrrolyl, pyrazolyl, pyrimidinyl, pyrazinyl, pyridazinyl, benzofuranyl, tetrahydrobenzofuranyl, isobenzofuranyl, benzothiazolyl, benzoisothiazolyl, benzotriazolyl, indolyl, isoindolyl, benzoxazolyl, quinolyl, tetrahydroquinolinyl, isoquinolyl, benzimidazolyl, benzisoxazolyl or benzothienyl, imidazo[1,2-a]-pyridinyl, imidazo[2,1-b]thiazolyl, and the derivatives thereof. "N-heteroaryl" in particular refers to heteroaryl as previously defined containing at least one nitrogen atom. The point of attachment of the N-heteroaryl to the rest of the molecule can be through the nitrogen or a carbon ring atom. Example of N-heteroaryl are pyridinyl, pyrazinyl, pyridazinyl, pyrimidinyl.

The term "selective" or "HCN1 selective compound" in context of the present invention refers to the potency of an inhibitor to inhibit HCN1 with a higher efficiency than HCN2 and HCN4 isoforms. In a preferred embodiment, the compounds of formula (I) are more effective on the HCN1 isoform than on the HCN2 and HCN4 isoforms. In a particular embodiment, the compounds according to the invention, more particularly the compounds of formula (I) are at least 5 times, particularly at least 20 times, more particularly at least 50 times, even more particularly at least 100 fold, most particularly at least 1000 fold more effective on the HCN1 isoform than on the HCN2 and HCN4 isoforms.

The term "heterocyclyl" denotes a monovalent saturated or partly unsaturated mono-ring system of 4 to 9 ring atoms, comprising 1, 2, or 3 ring heteroatoms selected independently from N, O and S, the remaining ring atoms being carbon. Examples for heterocyclyl are pyrrolidinyl, tetrahydrofuranyl, tetrahydro-thienyl, pyrazolidinyl, imidazolidinyl, oxazolidinyl, isoxazolidinyl, thiazolidinyl, piperidinyl, tetrahydropyranyl, tetrahydrothiopyranyl, piperazinyl, morpholinyl, thiomorpholinyl, dioxolane, 1,1-dioxo-thiomorpholin-4-yl, azepanyl, diazepanyl, homopiperazinyl, or oxazepanyl. More particularly heterocyclyl refers to dihydrofuryl, 1,3-dioxolyl, dihydropyrryl, dihydrothiophyl, dihydropyrazolyl, dihydroisoxazolyl, tetrahydropyridyl, tetrahydropyranyl, tetrahydrothiopyranyl, piperazinyl, 3,4-dihydro-2H-1,4-oxazinyl, 3,4-dihydro-2H-1,4-thiazyl, 1,2,3,4-tetrahydropyrazyl.

"Optional" or "optionally" means that the subsequently described event or circumstance may but need not occur, and that the description includes instances where the event or circumstance occurs and instances in which it does not. For example, "aryl group optionally substituted with an alkyl group" means that the alkyl may but need not be present, and the description includes situations where the aryl group is substituted with an alkyl group and situations where the aryl group is not substituted with the alkyl group.

The terms "individual" or "subject" refer to a mammal. Mammals include, but are not limited to, domesticated animals (e.g., cows, sheep, cats, dogs, and horses), primates (e.g., humans and non-human primates such as monkeys), rabbits, and rodents (e.g., mice and rats). In certain embodiments, the individual or subject is a human.

The terms "compound(s) of this invention" and "compound(s) of the present invention" refer to compounds as disclosed herein and stereoisomers, tautomers, solvates, and salts (e.g., pharmaceutically acceptable salts) thereof.

When the compounds of the invention are solids, it is understood by those skilled in the art that these compounds, and their solvates and salts, may exist in different solid forms, particularly different crystal forms, all of which are intended to be within the scope of the present invention and specified formulae.

The term "pharmaceutically acceptable salts" denotes salts which are not biologically or otherwise undesirable. Pharmaceutically acceptable salts include both acid and base addition salts.

The term "pharmaceutically acceptable acid addition salt" denotes those pharmaceutically acceptable salts formed with inorganic acids such as hydrochloric acid, hydrobromic acid, sulfuric acid, nitric acid, carbonic acid, phosphoric acid, and organic acids selected from aliphatic, cycloaliphatic, aromatic, araliphatic, heterocyclic, carboxylic, and sulfonic classes of organic acids such as formic acid, acetic acid, propionic acid, glycolic acid, gluconic acid, lactic acid, pyruvic acid, oxalic acid, malic acid, maleic acid, maloneic acid, succinic acid, fumaric acid, tartaric acid, citric acid, aspartic acid, ascorbic acid, glutamic acid, anthranilic acid, benzoic acid, cinnamic acid, mandelic acid, embonic acid, phenylacetic acid, methanesulfonic acid, ethanesulfonic acid, p-toluenesulfonic acid, and salicyclic acid.

The term "pharmaceutically acceptable base addition salt" denotes those pharmaceutically acceptable salts formed with an organic or inorganic base. Examples of acceptable inorganic bases include sodium, potassium, ammonium, calcium, magnesium, iron, zinc, copper, manganese, and aluminum salts. Salts derived from pharmaceutically acceptable organic nontoxic bases includes salts of primary, secondary, and tertiary amines, substituted amines including naturally occurring substituted amines, cyclic amines and basic ion exchange resins, such as isopropylamine, trimethylamine, diethylamine, triethylamine, tripropylamine, ethanolamine, 2-diethylaminoethanol, trimethamine, dicyclohexylamine, lysine, arginine, histidine, caffeine, procaine, hydrabamine, choline, betaine, ethylenediamine, glucosamine, methylglucamine, theobromine, purines, piperizine, piperidine, N-ethylpiperidine, and polyamine resins.

The term "active pharmaceutical ingredient" (or "API") denotes the compound or molecule in a pharmaceutical composition that has a particular biological activity.

The terms "pharmaceutical composition" and "pharmaceutical formulation" (or "formulation") are used interchangeably and denote a mixture or solution comprising a therapeutically effective amount of an active pharmaceutical ingredient together with pharmaceutically acceptable excipients to be administered to a mammal, e.g., a human in need thereof.

The terms "pharmaceutically acceptable excipient", "pharmaceutically acceptable carrier" and "therapeutically inert excipient" can be used interchangeably and denote any pharmaceutically acceptable ingredient in a pharmaceutical composition having no therapeutic activity and being non-toxic to the subject administered, such as disintegrators, binders, fillers, solvents, buffers, tonicity agents, stabilizers, antioxidants, surfactants, carriers, diluents or lubricants used in formulating pharmaceutical products.

The terms "treating" or "treatment" of a disease state include inhibiting the disease state, i.e., arresting the development of the disease state or its clinical symptoms, or relieving the disease state, i.e., causing temporary or permanent regression of the disease state or its clinical symptoms.

Compounds that have the same molecular formula but differ in the nature or sequence of bonding of their atoms or the arrangement of their atoms in space are termed "isomers." Isomers that differ in the arrangement of their atoms in space are termed "stereoisomers". Stereoisomers that are not mirror images of one another are termed "diastereomers" and those that are non-superimposable mirror images of each other are termed "enantiomers". When a compound has an asymmetric center, for example, if a carbon atom is bonded to four different groups, a pair of enantiomers is possible. An enantiomer can be characterized by the absolute configuration of its asymmetric center and is described by the R- and S-sequencing rules of Cahn, Ingold and Prelog, or by the manner in which the molecule rotates the plane of polarized light and designated as dextrorotatory or levorotatory (i.e., as (+) or (−)-isomers respectively). A chiral compound can exist as either individual enantiomer or as a mixture thereof. A mixture containing equal proportions of the enantiomers is called a "racemic mixture".

The compounds of formula I, Ia, Ib or Ic can possess one or more asymmetric centers or axes. Unless indicated otherwise, the description or naming of a particular compound in the specification and claims is intended to include both individual enantiomers, atropisomers and mixtures, racemic or otherwise, thereof, as well as individual epimers, atropisomers and mixtures thereof. The methods for the determination of stereochemistry and the separation of stereoisomers are well-known in the art (see discussion in Chapter 4 of "Advanced Organic Chemistry", 4th edition J. March, John Wiley and Sons, New York, 1992).

Certain compounds may exhibit tautomerism. Tautomeric compounds can exist as two or more interconvertible species. Prototropic tautomers result from the migration of a covalently bonded hydrogen atom between two atoms. Tautomers generally exist in equilibrium and attempts to isolate an individual tautomers usually produce a mixture whose chemical and physical properties are consistent with a mixture of compounds. The position of the equilibrium is dependent on chemical features within the molecule. For example, in many aliphatic aldehydes and ketones, such as acetaldehyde, the keto form predominates while; in phenols, the enol form predominates. Common prototropic tautomers include keto/enol (—C(=O)—CH—⇌—C(—OH)=CH—), amide/imidic acid (—C(=O)—NH—⇌—C(—OH)=N—) and amidine (—C(=NR)—NH—⇌—C(—NHR)=N—) tautomers. The latter two are particularly common in heteroaryl and heterocyclic rings and the present invention encompasses all tautomeric forms of the compounds.

Now it has been found that the present compounds of formula formula I, Ia, Ib or Ic are isoform selective inhibitors of HCN1 and as such may be of therapeutic use for the treatment of CNS disorders including psychiatric, neurological, neurodevelopmental, neurodegenerative, mood, motivational, metabolic, cardiovascular, renal, ophthalmic, endocrine, and/or other disorders described herein including schizophrenia (e.g., cognitive impairment and negative symptoms in schizophrenia), cognitive impairment associated with D2 antagonist therapy, ADHD, impulsivity, autism spectrum disorder, mild cognitive impairment (MCI), age-related cognitive decline, Alzheimer's dementia, Parkinson's disease, Huntington's chorea, depression, anxiety, treatment-resistant depression (TRD), bipolar disorder, chronic apathy, anhedonia, chronic fatigue, post-traumatic stress disorder, seasonal affective disorder, social anxiety disorder, postpartum depression, serotonin syndrome, substance abuse and drug dependence, Tourette's syndrome, tardive dyskinesia, drowsiness, sexual dysfunction, migraine, systemic lupus erythematosus (SLE), hyperglycemia, dislipidemia, obesity, diabetes, sepsis, post-ischemic tubular necrosis, renal failure, resistant edema, narcolepsy, hypertension, congestive heart failure, postoperative ocular hypotonia, sleep disorders, pain, cognitive impairments associated with schizophrenia (CIAS), early infantile epileptic encephalopathies (EIEE), epilepsy, mood disorders (e.g. depression), neuropathic pain, and autism (sensory sensitivity), more particularly cognitive impairments associated with schizophrenia (CIAS), early infantile epileptic encephalopathies (EIEE), epilepsy, mood disorders (e.g. depression), neuropathic pain, and autism (sensory sensitivity), most particularly cognitive impairments associated with schizophrenia (CIAS).

These compounds are potent inhibitors of the hyperpolarization-activated and cyclic nucleotide-gated (HCN) channel isoform 1 (HCN1). The mammalian HCN channel family, which is highly conserved across species, currently comprises of 4 identified genes (HCN1-4). Expression of HCN1 in the brain increases during early postnatal development and remains high across life. The highest levels of HCN1 mRNA are found in regions that support cognitive and executive function, including; cortex, hippocampus, and cerebellum. Depolarizing current produced by HCN channels, known as $I_h$ or $I_f$, promotes cell excitability and rhythmic activity in excitable tissues (DiFrancesco and DiFrancesco 2015). HCN1 channels are functionally expressed in a proximal to distal increasing gradient on dendrites of projecting neurons of the hippocampus and cortex where their activation promotes shunting of distal synaptic currents, thereby limiting synaptic integration onto these neurons (Magee, 1998). Inhibiting HCN1 channels will thereby increase synaptic integration and facilitate information transfer via projecting neurons in these brain regions.

The HCN ion channels are members of the voltage-gated potassium channel superfamily but in contrast to potassium channels, they are activated by hyperpolarization. Additionally, intracellular levels of cyclic nucleotides, most notably cAMP, promote their gating. Thus, HCN channels act as coincident detectors, detecting the intracellular cAMP status as well as the polarization state of neurons. Through their activity in neurons, HCN channels play roles in determining resting membrane potential, defining dendritic integration, setting action potential firing frequency and pacemaking, as well as establishing the action potential threshold (DiFrancesco and DiFrancesco, 2015).

Large genome-wide association studies (GWAS) show that single nucleotide polymorphisms (SNPs) in the HCN1 genomic locus are significantly associated with schizophrenia (SZ). This has been demonstrated in multiple experimental cohorts and confirmed by meta-analysis across these populations (Schizophrenia working group of the Psychiatric Genomics Consortium, 2014; Pardinas et al., 2018). Furthermore, recent studies investigating the genetic architecture of heritable, neurocognitive endophenotypes within SZ populations, identified HCN1 as a gene of interest by genome-wide significant association with performance in distinct cognitive tasks (Swerdlow et al., 2018). This provides hope for patient screening in support of a personalized health care approach in treating CIAS endophenotypes in the CIAS patient population through modulation of HCN1. Expression quantitative trait loci (eQTL) analysis of SNPs in HCN1 revealed no significant change in mRNA expression in post mortem tissue, however control vs. SZ comparison shows a trend to increased HCN1 expression in patients.

CIAS include deficits in episodic and working memory (WM) which evoke hippocampal and prefrontal cortical circuits, respectively. Forebrain-restricted deletion of HCN1 in rodents improves hippocampal based learning and memory and enhances synaptic long term potentiation (LTP) (Nolan et al., 2004). Inhibition of HCN1, using a non-brain permeable and non-selective HCN antagonist (via iontophoretic application) increases related neuronal activity in prefrontal cortex of non-human primates (NHPs) as well as in rodents (PFC infusion) (Wang et al., 2007). The non-selective HCN inhibitor (ZD7288) infused into the prelimbic cortex of Sprague Dawley rats improved percent correct responses in the delayed alternation task in the Y-maze. Moreover, knockdown of HCN1 in the prelimbic cortex of rats improved performance in the same task on days 11-19 after viral infusion, which is consistent with the time course of suppressed gene expression. In non-human primates, iontophoresis of ZD7288 in area 46 of the DLPFC enhanced action potential responses in delay-related neurons encoding for the preferred visual direction during an oculomotor delayed response task of WM (Wang et al., 2007).

*Cannabis* use is a common factor in the development of psychotic disorders including SZ and also positively correlated with earlier age of first symptom manifestation (Manseau and Goff, 2015). Cannabinoids activate endogenous cannabinoid receptors, including cannabinoid type-1 receptor (CB1R). Activation of CB1R results in disruption of short- and long-term synaptic plasticity as well as memory formation in rodents (Castillo et al., 2012; Sotesz et al., 2015). Downstream of CB1R activation in hippocampus results in changes in HCN-mediated $I_h$ current and genetic removal of HCN1 in rodents can recover deficits induced in spatial memory formation in response to exogenous challenge by endocanabinoids as measured by object location memory test in mice. Additionally, the modulation of LTP by CB1R agonism is absent in HCN1 KO animal brain slices (Maroso et al., 2016).

The EIEEs represent a class of severe childhood onset disorders resembling the spectrum of Dravet syndrome, previously identified to be due to mutation in SCN1a an dPCDH19 (Depienne et al., 2009). The EIEEs are characterized by seizures developing typically within the first three months of life, and resistance to standard anti-epileptic treatments. The main clinical features of the EIEEs are 1) refractory seizures, 2) severe EEG abnormalities, and 3) developmental delay/regression or intellectual disability. Next generation sequencing has identified a number of causal genetic mutations in EIEE including genes encoding ion channels and synaptic proteins. Exome sequencing studies now provide estimation that approximately 3% of non-Dravet type early infantile epileptic encephalopathies (EIEEs) are due to mutation in HCN1 (EIEE #24) (Nava et al., 2014; Marini et al., 2018).

The related HCN4 gene is highly, and nearly exclusively, expressed in the heart (GTEx database). Consistent with this global HCN4 KO mice suffer from a severe cardiac phenotype and embryonic lethality (Stieber et al., 2003). Additionally, HCN2 KO mice exhibit spontaneous absence seizures, cardiac sinus dysrhythmia (Ludwig et al., 2003). The absence of isoform-selective drugs is severely limiting the possibility of using commercially available HCN blockers such as Ivabradine. Thus, generating brain permeable and HCN1 selective compounds (over HCN2 and HCN4) would provide strong potential for development of precognitive drugs for treatment in EIEE and SZ.

Several documents describe the current knowledge on HCN channel inhibition, for example the following publications, including literature cited therein:

Cerbai et al., Canadian Journal of Physiology and Pharmacology, 96 (2018), 977-984
Postea & Biel, Nature Reviews Drug Discovery, 10 (2011), 903-914
Wickenden et al., Current Pharmaceutical Design, 15 (2009), 2149-2168
Romanelli et al., Current Topics in Medicinal Chemistry 16 (2016), 1764-1791
Clure et al., Bioorganic & Medicinal Chemistry Letters 21 (2011), 5197-5201
Romanelli et al., J. Med. Chem. 53 (2010), 6773-6777
He et al., Reviews in the Neurosciences (Berlin, Germany), 30 (2019), 639-649

Objects of the present invention are compounds of formula I, Ia, Ib or Ic, the use of such compounds for the preparation of medicaments for the treatment, prevention and/or delay of progression of psychiatric, neurological, neurodevelopmental, neurodegenerative, mood, motivational, metabolic, cardiovascular, renal, ophthalmic, endocrine, and/or other disorders described herein including schizophrenia (e.g., cognitive impairment and negative symptoms in schizophrenia), cognitive impairment associated with D2 antagonist therapy, ADHD, impulsivity, autism spectrum disorder, mild cognitive impairment (MCI), age-related cognitive decline, Alzheimer's dementia, Parkinson's disease, Huntington's chorea, depression, anxiety, treatment-resistant depression (TRD), bipolar disorder, chronic apathy, anhedonia, chronic fatigue, post-traumatic stress disorder, seasonal affective disorder, social anxiety disorder, postpartum depression, serotonin syndrome, substance abuse and drug dependence, Tourette's syndrome, tardive dyskinesia, drowsiness, sexual dysfunction, migraine, systemic lupus erythematosus (SLE), hyperglycemia, dislipidemia, obesity, diabetes, sepsis, post-ischemic tubular necrosis, renal failure, resistant edema, narcolepsy, hypertension, congestive heart failure, postoperative ocular hypotonia, sleep disorders, pain, and other disorders in a mammal, more particularly for the treatment of CNS disorders including cognitive impairments associated with schizophrenia (CIAS), early infantile epileptic encephalopathies (EIEE), epilepsy, mood disorders (e.g. depression), neuropathic pain, and autism (sensory sensitivity), their manufacture and medicaments based on a compound of formula I in accordance with the invention.

Further objects of the present invention are all forms of optically pure enantiomers, racemates or diastereomeric mixtures for compounds of formula I, Ia, Ib or Ic.

In another embodiment the present invention relates to compounds of formula Ia

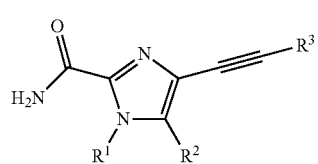

Ia wherein
  $R^1$ is phenyl, N-heteroaryl, wherein said N-heteroaryl comprises 1, 2 or 3 nitrogen ring atoms and wherein said phenyl or said N-heteroaryl are optionally substituted with 1, 2, 3 or 4 substituents selected from $R^4$;
  $R^2$ is hydrogen or $C_1$-$C_6$ alkyl;
  $R^3$ is a heteroaryl or a phenyl, wherein said heteroaryl or said phenyl are optionally substituted with 1, 2, 3 or 4 substituents selected from $R^5$;
  $R^4$ is independently selected from halogen, $C_1$-$C_6$ alkyl, $C_1$-$C_6$ alkoxy, cyano, halo$C_1$-$C_6$ alkyl and halo$C_1$-$C_6$ alkoxy; and
  $R^5$ is independently selected from hydroxy, halogen, cyano, $C_1$-$C_6$ alkyl, $C_1$-$C_6$ alkoxy, halo$C_1$-$C_6$ alkyl and halo$C_1$-$C_6$ alkoxy, or
  where two vicinal $R^5$ groups form a five-membered or six-membered heterocyclyl fused ring, where the heterocyclyl fused ring is optionally substituted with one or more groups independently selected from—hydroxy, halogen, $C_1$-$C_6$ alkyl, $C_1$-$C_6$ alkoxy, halo$C_1$-$C_6$ alkyl and halo$C_1$-$C_6$ alkoxy; or pharmaceutically acceptable salts thereof.

In another embodiment, the present invention provides a compound of formula Ib,

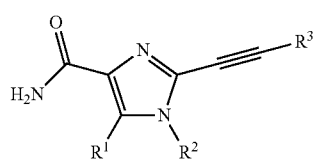

Ib wherein
- $R^1$ is phenyl, N-heteroaryl, wherein said N-heteroaryl comprises 1, 2 or 3 nitrogen ring atoms and wherein said phenyl or said N-heteroaryl are optionally substituted with 1, 2, 3 or 4 substituents selected from $R^4$;
- $R^2$ is $C_1$-$C_6$ alkyl;
- $R^3$ is a heteroaryl or a phenyl, wherein said heteroaryl or said phenyl are optionally substituted with 1, 2, 3 or 4 substituents selected from $R^5$;
- $R^4$ is independently selected from halogen, $C_1$-$C_6$ alkyl, $C_1$-$C_6$ alkoxy, cyano, halo$C_1$-$C_6$ alkyl and halo$C_1$-$C_6$ alkoxy; and
- $R^5$ is independently selected from hydroxy, halogen, cyano, $C_1$-$C_6$ alkyl, $C_1$-$C_6$ alkoxy, halo$C_1$-$C_6$ alkyl and halo$C_1$-$C_6$ alkoxy, or
- where two vicinal $R^5$ groups form a five-membered or six-membered heterocyclyl fused ring, where the heterocyclyl fused ring is optionally substituted with one or more groups independently selected from—hydroxy, halogen, $C_1$-$C_6$ alkyl, $C_1$-$C_6$ alkoxy, halo$C_1$-$C_6$ alkyl and halo$C_1$-$C_6$ alkoxy; or
- pharmaceutically acceptable salts thereof.

In another embodiment the present invention relates to compounds of formula Ic

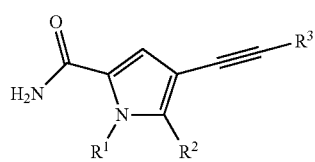

Ic wherein
- $R^1$ is phenyl, N-heteroaryl, wherein said N-heteroaryl comprises 1, 2 or 3 nitrogen ring atoms and wherein said phenyl or said N-heteroaryl are optionally substituted with 1, 2, 3 or 4 substituents selected from $R^4$;
- $R^2$ is hydrogen or $C_1$-$C_6$ alkyl;
- $R^3$ is a heteroaryl or a phenyl, wherein said heteroaryl or said phenyl are optionally substituted with 1, 2, 3 or 4 substituents selected from $R^5$;
- $R^4$ is independently selected from halogen, $C_1$-$C_6$ alkyl, $C_1$-$C_6$ alkoxy, cyano, halo$C_1$-$C_6$ alkyl and halo$C_1$-$C_6$ alkoxy; and
- $R^5$ is independently selected from hydroxy, halogen, cyano, $C_1$-$C_6$ alkyl, $C_1$-$C_6$ alkoxy, halo$C_1$-$C_6$ alkyl and halo$C_1$-$C_6$ alkoxy, or
- where two vicinal $R^5$ groups form a five-membered or six-membered heterocyclyl fused ring, where the heterocyclyl fused ring is optionally substituted with one or more groups independently selected from—hydroxy, halogen, $C_1$-$C_6$ alkyl, $C_1$-$C_6$ alkoxy, halo$C_1$-$C_6$ alkyl and halo$C_1$-$C_6$ alkoxy; or
- pharmaceutically acceptable salts thereof.

Further, it is to be understood that every embodiment relating to a specific $X^1$, $X^2$, $X^3$, $R^1$, $R^2$, $R^3$, $R^4$ or $R^5$ as disclosed herein may be combined with any other embodiment relating to another $X^1$, $X^2$, $X^3$, $R^1$, $R^2$, $R^3$, $R^4$ or $R^5$ as disclosed herein.

A particular embodiment of the present invention relates to compound of formula I, Ia, Ib or Ic wherein $R^1$ is phenyl, pyrazinyl, pyridazinyl, pyrimidinyl or pyridinyl wherein said phenyl, said pyrazinyl, said pyridazinyl, said pyrimidinyl or said pyridinyl are optionally substituted with 1, 2, 3 or 4 substituents selected from $R^4$, more particularly substituted with 0, 1, 2 or 3 substituents selected from $R^4$, most particularly with substituted with 0, 1 or 2 substituents selected from $R^4$.

A more particular embodiment of the present invention relates to compound of formula I, Ia, Ib or Ic wherein $R^1$ is phenyl, pyridazinyl or pyridinyl wherein said phenyl, said pyridazinyl or said pyridinyl are optionally substituted with 1, 2, 3 or 4 substituents selected from $R^4$, more particularly substituted with 0, 1, 2 or 3 substituents selected from $R^4$, most particularly with substituted with 0, 1 or 2 substituents selected from $R^4$.

An even more particular embodiment of the present invention relates to compound of formula I, Ia, Ib or Ic wherein $R^1$ is phenyl, pyrazinyl, pyridazinyl, pyrimidinyl or pyridinyl, more particularly $R^1$ is phenyl, pyrazinyl, pyridazinyl or pyridinyl.

A particular embodiment of the present invention relates to compound of formula I, Ia, Ib or Ic wherein $R^2$ is $C_1$-$C_6$ alkyl, more particularly methyl.

A particular embodiment of the present invention relates to compound of formula I, Ia, Ib or Ic wherein $R^3$ is a phenyl, pyridinyl, or thiophenyl, wherein said phenyl, said pyridinyl, or said thiophenyl are optionally substituted with 1, 2, 3 or 4 substituents selected from $R^5$, more particularly substituted with 1, 2 or 3 substituents selected from $R^5$, most particularly with substituted with 1 or 2 substituents selected from $R^5$.

A more particular embodiment of the present invention relates to compound of formula I, Ia, Ib or Ic wherein $R^3$ is a phenyl or pyridinyl, wherein said phenyl, said pyridinyl are optionally substituted with 1 or 2 substituents selected from $R^5$.

A particular embodiment of the present invention relates to a compound of formula I, Ia, Ib or Ic wherein from $R^4$ is independently selected from halogen, $C_1$-$C_6$ alkyl and $C_1$-$C_6$ alkoxy, more particularly $R^4$ is independently selected from halogen, methyl and methoxy, most particularly $R^4$ is independently selected from fluoro, chloro, methyl and methoxy.

A particular embodiment of the present invention relates to a compound of formula I, Ia, Ib or Ic wherein from $R^5$ is independently selected from halogen, cyano, $C_1$-$C_6$ alkyl, halo$C_1$-$C_6$ alkyl and $C_1$-$C_6$ alkoxy, or where two vicinal $R^5$ groups form a five-membered or six-membered heterocyclyl fused ring, where the heterocyclyl fused ring is optionally substituted with one or more groups independently selected from hydroxy, halogen, $C_1$-$C_6$ alkyl, $C_1$-$C_6$ alkoxy, halo$C_1$-$C_6$ alkyl and halo$C_1$-$C_6$ alkoxy.

A more particular embodiment of the present invention relates to a compound of formula I, Ia, Ib or Ic wherein from $R^5$ is independently selected from halogen, cyano, methyl, trifluoromethyl and methoxy, or where two vicinal $R^5$ groups form dioxolanyl.

Particular compounds of formula I of the present invention are those selected from the group consisting of:

4-((2-Chloro-3-methylpyridin-4-yl)ethynyl)-5-methyl-1-(6-methylpyridin-3-yl)-1H-imidazole-2-carboxamide
4-((2-Chloro-3-fluoropyridin-4-yl)ethynyl)-5-methyl-1-(6-methylpyridin-3-yl)-1H-imidazole-2-carboxamide
4-[2-(5-Chlorothiophen-3-yl)ethynyl]-5-methyl-1-(6-methylpyridin-3-yl)imidazole-2-carboxamide
4-[2-(3-Chlorophenyl)ethynyl]-5-methyl-1-(6-methyl-3-pyridyl)imidazole-2-carboxamide
4-((3-Cyanophenyl)ethynyl)-5-methyl-1-(6-methylpyridin-3-yl)-1H-imidazole-2-carboxamide
4-(2-Chloro-pyridin-4-ylethynyl)-5-methyl-1-(6-methylpyridin-3-yl)-1H-imidazole-2-carboxylic acid amide
4-((2-Chloro-5-fluoropyridin-4-yl)ethynyl)-5-methyl-1-(6-methylpyridin-3-yl)-1H-imidazole-2-carboxamide
4-((3-Methoxyphenyl)ethynyl)-5-methyl-1-(6-methylpyridin-3-yl)-1H-imidazole-2-carboxamide
4-[2-(4-Chlorophenyl)ethynyl]-5-methyl-1-(6-methyl-3-pyridyl)imidazole-2-carboxamide
5-Methyl-1-(6-methylpyridin-3-yl)-4-(m-tolylethynyl)-1H-imidazole-2-carboxamide
5-Methyl-1-(6-methylpyridin-3-yl)-4-((2-(trifluoromethyl)pyridin-4-yl)ethynyl)-1H-imidazole-2-carboxamide
4-[2-(2-Fluoro-4-pyridyl)ethynyl]-5-methyl-1-(6-methyl-3-pyridyl)imidazole-2-carboxamide
4-(Benzo[d][1,3]dioxol-4-ylethynyl)-5-methyl-1-(6-methylpyridin-3-yl)-1H-imidazole-2-carboxamide
4-((6-Chloropyridin-2-yl)ethynyl)-5-methyl-1-(6-methylpyridin-3-yl)-1H-imidazole-2-carboxamide
4-((2-Chloropyrimidin-4-yl)ethynyl)-5-methyl-1-(6-methylpyridin-3-yl)-1H-imidazole-2-carboxamide
4-((3-Fluoropyridin-4-yl)ethynyl)-5-methyl-1-(6-methylpyridin-3-yl)-1H-imidazole-2-carboxamide
4-[2-(5-Chloro-3-pyridyl)ethynyl]-5-methyl-1-(6-methyl-3-pyridyl)imidazole-2-carboxamide
4-((4-Chloropyridin-2-yl)ethynyl)-5-methyl-1-(6-methylpyridin-3-yl)-1H-imidazole-2-carboxamide
4-((6-Chloropyrimidin-4-yl)ethynyl)-5-methyl-1-(6-methylpyridin-3-yl)-1H-imidazole-2-carboxamide
5-Methyl-1-(6-methyl-3-pyridyl)-4-[2-(3-pyridyl)ethynyl]imidazole-2-carboxamide
5-Methyl-1-(6-methyl-3-pyridyl)-4-[2-(4-pyridyl)ethynyl]imidazole-2-carboxamide
5-Methyl-1-(6-methylpyridin-3-yl)-4-((2-methylpyridin-4-yl)ethynyl)-1H-imidazole-2-carboxamide
4-[2-(2-Chloro-3-methyl-4-pyridyl)ethynyl]-5-methyl-1-(5-methylpyrazin-2-yl)imidazole-2-carboxamide
4-[2-(2-Chloro-3-methyl-4-pyridyl)ethynyl]-5-methyl-1-(6-methylpyridazin-3-yl)imidazole-2-carboxamide
4-[2-(2-Chloro-3-methyl-4-pyridyl)ethynyl]-5-methyl-1-(5-methyl-3-pyridyl)imidazole-2-carboxamide
4-[2-(2-Chloro-3-methyl-4-pyridyl)ethynyl]-1-(6-chloro-3-pyridyl)-5-methyl-imidazole-2-carboxamide
4-[2-(2-Chloro-3-methyl-4-pyridyl)ethynyl]-1-(6-methoxy-3-pyridyl)-5-methyl-imidazole-2-carboxamide
4-[2-(2-Chloro-3-methyl-4-pyridyl)ethynyl]-5-methyl-1-(5-methyl-2-pyridyl)imidazole-2-carboxamide
4-[2-(2-Chloro-3-methyl-4-pyridyl)ethynyl]-5-methyl-1-(3-pyridyl)imidazole-2-carboxamide
4-[2-(3-Chloro-2-methyl-phenyl)ethynyl]-5-methyl-1-(3-pyridyl)imidazole-2-carboxamide
4-[2-(2-Chloro-4-pyridyl)ethynyl]-5-methyl-1-(6-methyl-3-pyridyl)pyrrole-2-carboxamide
2-[2-(2-Chloro-4-pyridyl)ethynyl]-1-methyl-5-(6-methyl-3-pyridyl)imidazole-4-carboxamide
2-[2-(3-Chloro-2-methyl-phenyl)ethynyl]-1-methyl-5-(6-methyl-3-pyridyl)imidazole-4-carboxamide
2-[2-(3-Chlorophenyl)ethynyl]-1-methyl-5-(6-methyl-3-pyridyl)imidazole-4-carboxamide
2-[2-(3-Chloro-2-methyl-phenyl)ethynyl]-1-methyl-5-(3-pyridyl)imidazole-4-carboxamide formic acid salt
2-[2-(2-Chloro-3-methyl-4-pyridyl)ethynyl]-1-methyl-5-(3-pyridyl)imidazole-4-carboxamide formic acid salt
5-Methyl-4-(phenylethynyl)-1-(p-tolyl)-1H-imidazole-2-carboxamide
4-[2-(2-Chloro-4-pyridyl)ethynyl]-5-methyl-1-(p-tolyl)imidazole-2-carboxamide
1-(4-Chlorophenyl)-4-((2-chloropyridin-4-yl)ethynyl)-5-methyl-1H-imidazole-2-carboxamide
1-(3-Chlorophenyl)-4-((2-chloropyridin-4-yl)ethynyl)-5-methyl-1H-imidazole-2-carboxamide
4-(2-Chloro-pyridin-4-ylethynyl)-1-(2,4-difluoro-phenyl)-5-methyl-1H-imidazole-2-carboxylic acid amide
4-(2-Chloro-pyridin-4-ylethynyl)-1-(4-fluoro-phenyl)-1H-imidazole-2-carboxylic acid amide
4-((2-Chloropyridin-4-yl)ethynyl)-1-(6-methylpyridin-3-yl)-1H-imidazole-2-carboxamide
2-[2-(3-Chloro-2-methyl-phenyl)ethynyl]-1-methyl-5-(6-methyl-3-pyridyl)imidazole-4-carboxamide;
and pharmaceutically acceptable salts thereof.

Particular compounds of formula I of the present invention are those selected from the group consisting of:

4-((2-Chloro-3-methylpyridin-4-yl)ethynyl)-5-methyl-1-(6-methylpyridin-3-yl)-1H-imidazole-2-carboxamide 4-((2-Chloro-3-fluoropyridin-4-yl)ethynyl)-5-methyl-1-(6-methylpyridin-3-yl)-1H-imidazole-2-carboxamide
4-[2-(5-Chlorothiophen-3-yl)ethynyl]-5-methyl-1-(6-methylpyridin-3-yl)imidazole-2-carboxamide
4-[2-(3-Chlorophenyl)ethynyl]-5-methyl-1-(6-methyl-3-pyridyl)imidazole-2-carboxamide
4-[2-(2-Chloro-3-methyl-4-pyridyl)ethynyl]-5-methyl-1-(6-methylpyridazin-3-yl)imidazole-2-carboxamide
4-[2-(2-Chloro-3-methyl-4-pyridyl)ethynyl]-5-methyl-1-(5-methyl-3-pyridyl)imidazole-2-carboxamide
4-[2-(2-Chloro-3-methyl-4-pyridyl)ethynyl]-1-(6-methoxy-3-pyridyl)-5-methyl-imidazole-2-carboxamide
4-[2-(2-Chloro-3-methyl-4-pyridyl)ethynyl]-5-methyl-1-(5-methyl-2-pyridyl)imidazole-2-carboxamide
4-[2-(2-Chloro-3-methyl-4-pyridyl)ethynyl]-5-methyl-1-(3-pyridyl)imidazole-2-carboxamide
4-[2-(3-Chloro-2-methyl-phenyl)ethynyl]-5-methyl-1-(3-pyridyl)imidazole-2-carboxamide
4-[2-(2-Chloro-4-pyridyl)ethynyl]-5-methyl-1-(6-methyl-3-pyridyl)pyrrole-2-carboxamide
2-[2-(3-Chlorophenyl)ethynyl]-1-methyl-5-(6-methyl-3-pyridyl)imidazole-4-carboxamide
2-[2-(3-Chloro-2-methyl-phenyl)ethynyl]-1-methyl-5-(3-pyridyl)imidazole-4-carboxamide formic acid salt
2-[2-(2-Chloro-3-methyl-4-pyridyl)ethynyl]-1-methyl-5-(3-pyridyl)imidazole-4-carboxamide formic acid salt
2-[2-(3-Chloro-2-methyl-phenyl)ethynyl]-1-methyl-5-(6-methyl-3-pyridyl)imidazole-4-carboxamide;
and pharmaceutically acceptable salts thereof.

Compounds of formula II, III or IV are suitable as intermediates in the manufacture of compounds of formula I.

Another embodiment of the invention relates to compounds of formula II:

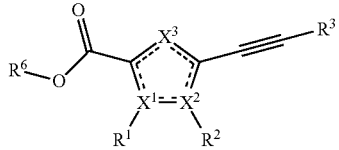

wherein
$X^1$ is either N or C
$X^2$ is either N or C
$X^3$ is either N or C
provided that at least one of $X^1$, $X^2$ and $X^3$ is N and that no more than two of $X^1$, $X^2$ and $X^3$ represent N and that if $X^1$ is N then $X^2$ can not be N;
the dotted lines represent a single or double bond, to enable the five membered rings to be aromatic;
$R^1$ is phenyl, N-heteroaryl, wherein said N-heteroaryl comprises 1, 2 or 3 nitrogen ring atoms and wherein said phenyl or said N-heteroaryl are optionally substituted with 1, 2, 3 or 4 substituents selected from $R^4$;
$R^2$ is hydrogen or $C_1$-$C_6$ alkyl, with the proviso that if $X^2$ is N then $R^2$ is not hydrogen;
$R^3$ is a heteroaryl or a phenyl, wherein said heteroaryl or said phenyl are optionally substituted with 1, 2, 3 or 4 substituents selected from $R^5$;
$R^4$ is independently selected from halogen, $C_1$-$C_6$ alkyl, $C_1$-$C_6$ alkoxy, cyano, halo$C_1$-$C_6$ alkyl and halo$C_1$-$C_6$ alkoxy;
$R^5$ is independently selected from hydroxy, halogen, cyano, $C_1$-$C_6$ alkyl, $C_1$-$C_6$ alkoxy, halo$C_1$-$C_6$ alkyl and halo$C_1$-$C_6$ alkoxy, or
where two vicinal $R^5$ groups form a five-membered or six-membered heterocyclyl fused ring, where the heterocyclyl fused ring is optionally substituted with one or more groups independently selected from—hydroxy, halogen, $C_1$-$C_6$ alkyl, $C_1$-$C_6$ alkoxy, halo$C_1$-$C_6$ alkyl and halo$C_1$-$C_6$ alkoxy; and
$R^6$ is hydrogen or $C_1$-$C_6$ alkyl.

Another embodiment of the invention relates to compounds of formula III:

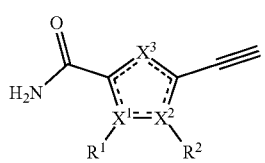

wherein
$X^1$ is either N or C
$X^2$ is either N or C
$X^3$ is either N or C
provided that at least one of $X^1$, $X^2$ and $X^3$ is N and that no more than two of $X^1$, $X^2$ and $X^3$ represent N and that if $X^1$ is N then $X^2$ can not be N;
the dotted lines represent a single or double bond, to enable the five membered rings to be aromatic;
$R^1$ is phenyl, N-heteroaryl, wherein said N-heteroaryl comprises 1, 2 or 3 nitrogen ring atoms and wherein said phenyl or said N-heteroaryl are optionally substituted with 1, 2, 3 or 4 substituents selected from $R^4$;
$R^2$ is hydrogen or $C_1$-$C_6$ alkyl, with the proviso that if $X^2$ is N then $R^2$ is not hydrogen;
$R^3$ is a heteroaryl or a phenyl, wherein said heteroaryl or said phenyl are optionally substituted with 1, 2, 3 or 4 substituents selected from $R^5$;
$R^4$ is independently selected from halogen, $C_1$-$C_6$ alkyl, $C_1$-$C_6$ alkoxy, cyano, halo$C_1$-$C_6$ alkyl and halo$C_1$-$C_6$ alkoxy; and
$R^5$ is independently selected from hydroxy, halogen, cyano, $C_1$-$C_6$ alkyl, $C_1$-$C_6$ alkoxy, halo$C_1$-$C_6$ alkyl and halo$C_1$-$C_6$ alkoxy, or
where two vicinal $R^5$ groups form a five-membered or six-membered heterocyclyl fused ring, where the heterocyclyl fused ring is optionally substituted with one or more groups independently selected from—hydroxy, halogen, $C_1$-$C_6$ alkyl, $C_1$-$C_6$ alkoxy, halo$C_1$-$C_6$ alkyl and halo$C_1$-$C_6$ alkoxy.

Another embodiment of the invention relates to compounds of formula IV:

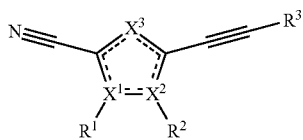

wherein
$X^1$ is either N or C
$X^2$ is either N or C
$X^3$ is either N or C
provided that at least one of $X^1$, $X^2$ and $X^3$ is N and that no more than two of $X^1$, $X^2$ and $X^3$ represent N and that if $X^1$ is N then $X^2$ can not be N;
the dotted lines represent a single or double bond, to enable the five membered rings to be aromatic;
$R^1$ is phenyl, N-heteroaryl, wherein said N-heteroaryl comprises 1, 2 or 3 nitrogen ring atoms and wherein said phenyl or said N-heteroaryl are optionally substituted with 1, 2, 3 or 4 substituents selected from $R^4$;
$R^2$ is hydrogen or $C_1$-$C_6$ alkyl, with the proviso that if $X^2$ is N then $R^2$ is not hydrogen; and
$R^4$ is independently selected from halogen, $C_1$-$C_6$ alkyl, $C_1$-$C_6$ alkoxy, cyano, halo$C_1$-$C_6$ alkyl and halo$C_1$-$C_6$ alkoxy.

The present compounds of formula I and their pharmaceutically acceptable salts can be prepared by methods known in the art, for example by processes described below, which processes comprise
a) reacting a compound of formula II

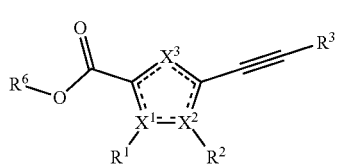

wherein $X^1$, $X^2$, $X^3$, $R^1$, $R^2$, $R^3$ and $R^6$ are as defined herein with ammonia ($NH_3$)

to obtain a compound of formula I

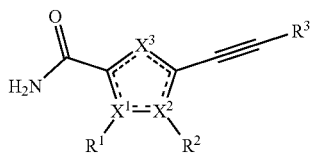

wherein $X^1$, $X^2$, $X^3$, $R^1$, $R^2$ and $R^3$ are as defined herein and, if desired, converting the compounds obtained into pharmaceutically acceptable salts;

or b) reacting a compound of formula III

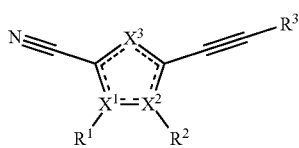

wherein $X^1$, $X^2$, $X^3$, $R^1$, $R^2$ and $R^3$ are as defined herein under acidic conditions, such as sulfuric acid, to obtain a compound of formula I

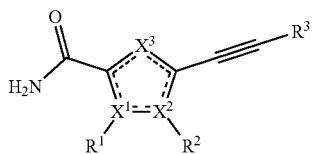

wherein $X^1$, $X^2$, $X^3$, $R^1$, $R^2$ and $R^3$ are as defined herein, or if desired converting the compounds obtained into pharmaceutically acceptable salts;

or c) reacting a compound of formula IV

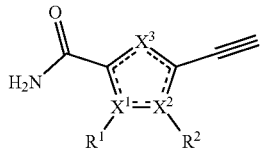

wherein $X^1$, $X^2$, $X^3$, $R^1$ and $R^2$ are as defined herein with a compound of formula IV$_a$ $$R^3\text{—}X \qquad IV_a$$

wherein X is halo, particularly Iodo or Bromo and $R^3$ is as defined herein to obtain a compound of formula I

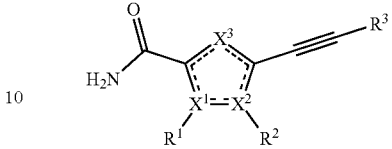

wherein $X^1$, $X^2$, $X^3$, $R^1$, $R^2$ and $R^3$ are as defined herein or if desired converting the compounds obtained into pharmaceutically salts.

In another embodiment, the present invention provides a compound according to formula I, Ia, Ib or Ic as described herein for use as a therapeutically active substance.

In yet another embodiment, the present invention provides a compound according to formula I, Ia, Ib or Ic as described herein for the treatment, prevention and/or delay of progression of, more particularly for the treatment of CNS disorders in particular psychiatric, neurological, neurodevelopmental, neurodegenerative, mood, motivational, metabolic, cardiovascular, renal, ophthalmic, endocrine, and/or other disorders described herein including schizophrenia (e.g., cognitive impairment and negative symptoms in schizophrenia), cognitive impairment associated with D2 antagonist therapy, ADHD, impulsivity, autism spectrum disorder, mild cognitive impairment (MCI), age-related cognitive decline, Alzheimer's dementia, Parkinson's disease, Huntington's chorea, depression, anxiety, treatment-resistant depression (TRD), bipolar disorder, chronic apathy, anhedonia, chronic fatigue, post-traumatic stress disorder, seasonal affective disorder, social anxiety disorder, postpartum depression, serotonin syndrome, substance abuse and drug dependence, Tourette's syndrome, tardive dyskinesia, drowsiness, sexual dysfunction, migraine, systemic lupus erythematosus (SLE), hyperglycemia, dislipidemia, obesity, diabetes, sepsis, post-ischemic tubular necrosis, renal failure, resistant edema, narcolepsy, hypertension, congestive heart failure, postoperative ocular hypotonia, sleep disorders, pain, cognitive impairments associated with schizophrenia (CIAS), early infantile epileptic encephalopathies (EIEE), epilepsy, mood disorders (e.g. depression), neuropathic pain, and autism (sensory sensitivity), more particularly cognitive impairments associated with schizophrenia (CIAS), early infantile epileptic encephalopathies (EIEE), epilepsy, mood disorders (e.g. depression), neuropathic pain, and autism (sensory sensitivity).

In another embodiment, the present invention provides the use of a compound according to formula I, Ia, Ib or Ic as described herein for the preparation of a medicament for the treatment, prevention and/or delay of progression of, more particularly for the treatment of, CNS disorders, in particular psychiatric, neurological, neurodevelopmental, neurodegenerative, mood, motivational, metabolic, cardiovascular, renal, ophthalmic, endocrine, and/or other disorders described herein including schizophrenia (e.g., cognitive impairment and negative symptoms in schizophrenia), cognitive impairment associated with D2 antagonist therapy, ADHD, impulsivity, autism spectrum disorder, mild cognitive impairment (MCI), age-related cognitive decline, Alzheimer's dementia, Parkinson's disease, Huntington's chorea, depression, anxiety, treatment-resistant depression (TRD), bipolar disorder, chronic apathy, anhedonia, chronic fatigue, post-traumatic stress disorder, seasonal affective disorder, social anxiety disorder, postpartum depression, serotonin syndrome, substance abuse and drug dependence, Tourette's syndrome, tardive dyskinesia, drowsiness, sexual dysfunction, migraine, systemic lupus erythematosus (SLE), hyperglycemia, dislipidemia, obesity, diabetes, sepsis, post-ischemic tubular necrosis, renal failure, resistant edema, narcolepsy, hypertension, congestive heart failure, postoperative ocular hypotonia, sleep disorders, pain, cognitive impairments associated with schizophrenia (CIAS), early infantile epileptic encephalopathies (EIEE), epilepsy, mood disorders (e.g. depression), neuropathic pain, and autism (sensory sensitivity), more particularly cognitive impairments associated with schizophrenia (CIAS), early infantile epileptic encephalopathies (EIEE), epilepsy, mood disorders (e.g. depression), neuropathic pain, and autism (sensory sensitivity).

In one aspect, the application provides a method of treating a HCN1 disorder in a subject having HCN1 related disorders, said method comprising administering to a subject in need thereof a therapeutically effective amount of any of the above compounds.

In another embodiment, the present invention provides a method of the treatment, prevention and/or delay of progression of, more particularly of the treatment of, CNS disorders, in particular psychiatric, neurological, neurodevelopmental, neurodegenerative, mood, motivational, metabolic, cardiovascular, renal, ophthalmic, endocrine, and/or other disorders described herein including schizophrenia (e.g., cognitive impairment and negative symptoms in schizophrenia), cognitive impairment associated with D2 antagonist therapy, ADHD, impulsivity, autism spectrum disorder, mild cognitive impairment (MCI), age-related cognitive decline, Alzheimer's dementia, Parkinson's disease, Huntington's chorea, depression, anxiety, treatment-resistant depression (TRD), bipolar disorder, chronic apathy, anhedonia, chronic fatigue, post-traumatic stress disorder, seasonal affective disorder, social anxiety disorder, postpartum depression, serotonin syndrome, substance abuse and drug dependence, Tourette's syndrome, tardive dyskinesia, drowsiness, sexual dysfunction, migraine, systemic lupus erythematosus (SLE), hyperglycemia, dislipidemia, obesity, diabetes, sepsis, post-ischemic tubular necrosis, renal failure, resistant edema, narcolepsy, hypertension, congestive heart failure, postoperative ocular hypotonia, sleep disorders, pain, cognitive impairments associated with schizophrenia (CIAS), early infantile epileptic encephalopathies (EIEE), epilepsy, mood disorders (e.g. depression), neuropathic pain, and autism (sensory sensitivity), more particularly cognitive impairments associated with schizophrenia (CIAS), early infantile epileptic encephalopathies (EIEE), epilepsy, mood disorders (e.g. depression), neuropathic pain, and autism (sensory sensitivity), which comprises administering an effective amount of a compound according to formula I as described herein.

In particular embodiment, the present invention provides a method of treatment, prevention and/or delay of progression of, more particularly of the treatment of, CNS disorders, in particular psychiatric, neurological, neurodevelopmental, neurodegenerative, mood, motivational, metabolic, cardiovascular, renal, ophthalmic, endocrine, and/or other disorders described herein including schizophrenia (e.g., cognitive impairment and negative symptoms in schizophrenia), cognitive impairment associated with D2 antagonist therapy, ADHD, impulsivity, autism spectrum disorder, mild cognitive impairment (MCI), age-related cognitive decline, Alzheimer's dementia, Parkinson's disease, Huntington's chorea, depression, anxiety, treatment-resistant depression (TRD), bipolar disorder, chronic apathy, anhedonia, chronic fatigue, post-traumatic stress disorder, seasonal affective disorder, social anxiety disorder, postpartum depression, serotonin syndrome, substance abuse and drug dependence, Tourette's syndrome, tardive dyskinesia, drowsiness, sexual dysfunction, migraine, systemic lupus erythematosus (SLE), hyperglycemia, dislipidemia, obesity, diabetes, sepsis, post-ischemic tubular necrosis, renal failure, resistant edema, narcolepsy, hypertension, congestive heart failure, postoperative ocular hypotonia, sleep disorders, pain, cognitive impairments associated with schizophrenia (CIAS), early infantile epileptic encephalopathies (EIEE), epilepsy, mood disorders (e.g. depression), neuropathic pain, and autism (sensory sensitivity), more particularly cognitive impairments associated with schizophrenia (CIAS), early infantile epileptic encephalopathies (EIEE), epilepsy, mood disorders (e.g. depression), neuropathic pain, and autism (sensory sensitivity), which comprises administering an effective amount of a compound according to formula I, Ia, Ib or Ic as described herein.

In particular, HCN1 disorders or HCN1 related diseases are CNS disorders in particular psychiatric, neurological, neurodevelopmental, neurodegenerative, mood, motivational, metabolic, cardiovascular, renal, ophthalmic, endocrine, and/or other disorders described herein including schizophrenia (e.g., cognitive impairment and negative symptoms in schizophrenia), cognitive impairment associated with D2 antagonist therapy, ADHD, impulsivity, autism spectrum disorder, mild cognitive impairment (MCI), age-related cognitive decline, Alzheimer's dementia, Parkinson's disease, Huntington's chorea, depression, anxiety, treatment-resistant depression (TRD), bipolar disorder, chronic apathy, anhedonia, chronic fatigue, post-traumatic stress disorder, seasonal affective disorder, social anxiety disorder, postpartum depression, serotonin syndrome, substance abuse and drug dependence, Tourette's syndrome, tardive dyskinesia, drowsiness, sexual dysfunction, migraine, systemic lupus erythematosus (SLE), hyperglycemia, dislipidemia, obesity, diabetes, sepsis, post-ischemic tubular necrosis, renal failure, resistant edema, narcolepsy, hypertension, congestive heart failure, postoperative ocular hypotonia, sleep disorders, pain, cognitive impairments associated with schizophrenia (CIAS), early infantile epileptic encephalopathies (EIEE), epilepsy, mood disorders (e.g. depression), neuropathic pain, and autism (sensory sensitivity), more particularly cognitive impairments associated with schizophrenia (CIAS), early infantile epileptic encephalopathies (EIEE), epilepsy, mood disorders (e.g. depression), neuropathic pain, and autism (sensory sensitivity), most particularly cognitive impairments associated with schizophrenia.

In one aspect, the application provides a pharmaceutical composition comprising the compound of any one of the above embodiments, admixed with at least one pharmaceutically acceptable carrier, such as excipient or diluent.

In another embodiment, the present invention provides a use of a compound of formula I, Ia, Ib or Ic in the preparation of a medicament for the treatment, prevention and/or delay of progression of, more particularly for the treatment of, diseases associated with HCN1.

In yet another embodiment, the present invention provides a medicaments containing a compound of formula I, Ia, Ib or Ic as defined herein or a pharmaceutically acceptable salt thereof and a therapeutically inert carrier are also an object of the present invention, as is a process for their production, which comprises bringing one or more compounds of formula I and/or pharmaceutically acceptable acid addition salts and, if desired, one or more other therapeutically valuable substances into a galenical administration form together with one or more therapeutically inert carriers.

Another embodiment provides pharmaceutical compositions or medicaments comprising the compounds of the invention and a therapeutically inert carrier, diluent or pharmaceutically acceptable excipient, as well as methods of using the compounds of the invention to prepare such compositions and medicaments.

Compositions are formulated, dosed, and administered in a fashion consistent with good medical practice. Factors for consideration in this context include the particular disorder being treated, the particular mammal being treated, the clinical condition of the individual patient, the cause of the disorder, the site of delivery of the agent, the method of administration, the scheduling of administration, and other factors known to medical practitioners. For example, such amount may be below the amount that is toxic to normal cells, or the mammal as a whole.

The compounds of the invention may be administered by any suitable means, including oral, topical (including buccal and sublingual), rectal, vaginal, transdermal, parenteral, subcutaneous, intraperitoneal, intrapulmonary, intradermal, intrathecal and epidural and intranasal, and, if desired for local treatment, intralesional administration. Parenteral infusions include intramuscular, intravenous, intraarterial, intraperitoneal, or subcutaneous administration.

The compounds of the present invention may be administered in any convenient administrative form, e.g., tablets, coated tablets, dragées, powders, capsules (hard and soft gelatine capsules), solutions (i.e. injection solutions), dispersions, suspensions, syrups, sprays, suppositories, gels, emulsions, patches, eye drops, ear drops etc. Such compositions may contain components conventional in pharmaceutical preparations, e.g., diluents, carriers, pH modifiers, sweeteners, bulking agents, and further active agents.

A typical formulation is prepared by mixing a compound of the present invention and pharmaceutically acceptable carrier or excipient. Suitable pharmaceutically acceptable carriers and excipients are well known to those skilled in the art and are described in detail in, e.g., Ansel, Howard C., et al., *Ansel's Pharmaceutical Dosage Forms and Drug Delivery Systems*. Philadelphia: Lippincott, Williams & Wilkins, 2004; Gennaro, Alfonso R., et al. *Remington: The Science and Practice of Pharmacy*. Philadelphia: Lippincott, Williams & Wilkins, 2000; and Rowe, Raymond C. *Handbook of Pharmaceutical Excipients*. Chicago, Pharmaceutical Press, 2005. The pharmaceutically acceptable carriers may be either solid or liquid. Solid form preparations include powders, tablets, pills, capsules, cachets, suppositories, and dispersible granules. A solid carrier may be one or more substances which may also act as diluents, flavoring agents, solubilizers, lubricants, suspending agents, binders, preservatives, tablet disintegrating agents, or an encapsulating material. In powders, the carrier generally is a finely divided solid which is a mixture with the finely divided active component. In tablets, the active component generally is mixed with the carrier having the necessary binding capacity in suitable proportions and compacted in the shape and size desired. The powders and tablets preferably contain from about one (1) to about seventy (70) percent of the active compound. Suitable carriers include but are not limited to magnesium carbonate, magnesium stearate, talc, sugar, lactose, pectin, dextrin, starch, gelatin, tragacanth, methylcellulose, sodium carboxy-methyl-cellulose, a low melting wax, cocoa butter, and the like.

The dosage at which compounds of the invention can be administered can vary within wide limits and will, of course, be fitted to the individual requirements in each particular case. In general, in the case of oral administration a daily dosage of about 0.01 to 1000 mg per person of a compound of general formula (I) should be appropriate, although the above upper limit can also be exceeded when necessary.

An example of a suitable oral dosage form is a tablet comprising about 100 mg to 500 mg of the compound of the invention compounded with about 30 to 90 mg anhydrous lactose, about 5 to 40 mg sodium croscarmellose, about 5 to 30 mg polyvinylpyrrolidone (PVP) K30, and about 1 to 10 mg magnesium stearate. The powdered ingredients are first mixed together and then mixed with a solution of the PVP. The resulting composition can be dried, granulated, mixed with the magnesium stearate and compressed to tablet form using conventional equipment.

An example of an aerosol formulation can be prepared by dissolving the compound, for example 10 to 100 mg, of the invention in a suitable buffer solution, e.g. a phosphate buffer, adding a tonicifier, e.g. a salt such as sodium chloride, if desired. The solution may be filtered, e.g., using a 0.2 μm filter, to remove impurities and contaminants.

An embodiment, therefore, includes a pharmaceutical composition comprising a compound according to the invention herein described, or a stereoisomer thereof. In a further embodiment includes a pharmaceutical composition comprising a compound according to the invention herein described, or a stereoisomer thereof, together with a pharmaceutically acceptable carrier or excipient.

The compounds of the present invention can be used, either alone or in combination with other drugs, for the treatment, prevention and/or delay of progression of HNC1 related diseases, in particular psychiatric, neurological, neurodevelopmental, neurodegenerative, mood, motivational, metabolic, cardiovascular, renal, ophthalmic, endocrine, and/or other disorders described herein including schizophrenia (e.g., cognitive impairment and negative symptoms in schizophrenia), cognitive impairment associated with D2 antagonist therapy, ADHD, impulsivity, autism spectrum disorder, mild cognitive impairment (MCI), age-related cognitive decline, Alzheimer's dementia, Parkinson's disease, Huntington's chorea, depression, anxiety, treatment-resistant depression (TRD), bipolar disorder, chronic apathy, anhedonia, chronic fatigue, post-traumatic stress disorder, seasonal affective disorder, social anxiety disorder, postpartum depression, serotonin syndrome, substance abuse and drug dependence, Tourette's syndrome, tardive dyskinesia, drowsiness, sexual dysfunction, migraine, systemic lupus erythematosus (SLE), hyperglycemia, dislipidemia, obesity, diabetes, sepsis, post-ischemic tubular necrosis, renal failure, resistant edema, narcolepsy, hypertension, congestive heart failure, postoperative ocular hypotonia, sleep disorders, pain, cognitive impairments associated with schizophrenia (CIAS), early infantile epileptic encephalopathies (EIEE), epilepsy, mood disorders (e.g. depression), neuropathic pain, and autism (sensory sensitivity), more particularly cognitive impairments associated with schizophrenia (CIAS), early infantile epileptic encephalopathies (EIEE), epilepsy, mood disorders (e.g. depression), neuropathic pain, and autism (sensory sensitivity), most particularly cognitive impairments associated with schizophrenia.

A particular embodiment of the present invention relates to pharmaceutical compositions comprising compounds of formula (I) or their pharmaceutically acceptable salts as defined above and one or more pharmaceutically acceptable excipients for use in the treatment, prevention and/or delay of progression of cognitive impairments associated with psychiatric, neurological, neurodevelopmental, neurodegenerative, mood, motivational, metabolic, cardiovascular, renal, ophthalmic, endocrine, and/or other disorders described herein including schizophrenia (e.g., cognitive impairment and negative symptoms in schizophrenia), cognitive impairment associated with D2 antagonist therapy, ADHD, impulsivity, autism spectrum disorder, mild cognitive impairment (MCI), age-related cognitive decline, Alzheimer's dementia, Parkinson's disease, Huntington's chorea, depression, anxiety, treatment-resistant depression (TRD), bipolar disorder, chronic apathy, anhedonia, chronic fatigue, post-traumatic stress disorder, seasonal affective disorder, social anxiety disorder, postpartum depression, serotonin syndrome, substance abuse and drug dependence, Tourette's syndrome, tardive dyskinesia, drowsiness, sexual dysfunction, migraine, systemic lupus erythematosus (SLE), hyperglycemia, dislipidemia, obesity, diabetes, sepsis, post-ischemic tubular necrosis, renal failure, resistant edema, narcolepsy, hypertension, congestive heart failure, postoperative ocular hypotonia, sleep disorders, pain, cognitive impairments associated with schizophrenia (CIAS), early infantile epileptic encephalopathies (EIEE), epilepsy, mood disorders (e.g. depression), neuropathic pain, and autism (sensory sensitivity), more particularly cognitive impairments associated with schizophrenia (CIAS), early infantile epileptic encephalopathies (EIEE), epilepsy, mood disorders (e.g. depression), neuropathic pain, and autism (sensory sensitivity), most particularly cognitive impairments associated with schizophrenia.

Another embodiment includes a pharmaceutical composition comprising a compound according to the invention herein described for use in the treatment, prevention and/or delay of progression of, more particularly in the treatment of a HCN1 related diseases. Another embodiment includes a pharmaceutical composition comprising a compound according to the invention herein described for use in the treatment, prevention and/or delay of progression of, more particularly in the treatment of HCN1 related diseases.

In another embodiment the present invention provides the manufacture of compounds of formula I, Ia, Ib or Ic as described herein.

The preparation of compounds of formula I, Ia, Ib or Ic of the present invention may be carried out in sequential or convergent synthetic routes. Syntheses of the invention are shown in the following general scheme. The skills required for carrying out the reaction and purification of the resulting products are known to those persons skilled in the art. In case a mixture of enantiomers or diastereoisomers is produced during a reaction, these enantiomers or diastereoisomers can be separated by methods described herein or known to the man skilled in the art such as e.g. chiral chromatography or crystallization.

Furthermore the compounds of the present invention can be prepared from commercially available starting materials or by the use of general synthetic techniques and procedures that are known to those skilled in the art. Outlined below are reaction schemes suitable for the preparation of such compounds. The substituents and indices used in the following description of the processes have the significance given herein. Further exemplification can be found in the specific examples detailed below.

In more detail, compounds of formula I and their intermediates may be prepared by schemes 1-5 and by the description of the specific examples.

A subgroup of compounds of formula I, wherein $X^1$ is N, $X^2$ is C and $X^3$ is N, can be prepared as outlined in schemes 1-3 below.

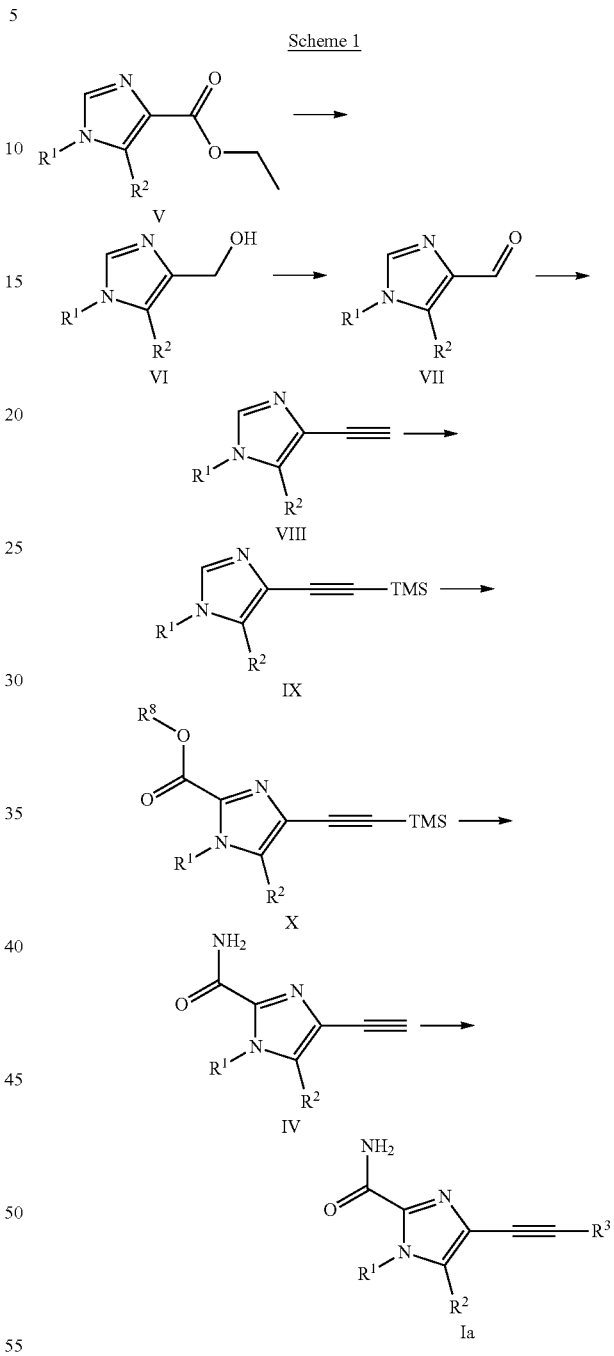

An intermediate of formula V, wherein $R^1$ and $R^2$ are as defined above, and which can be synthesized as known in the art or as exemplified in the specific examples, is reacted with a suitable reducing agent, e.g. lithium aluminium hydride, to the corresponding alcohol of formula VI (Scheme 1). Next, it can be oxidized to the aldehyde of formula VII using a suitable oxidizing agent, such as manganese dioxide. The aldehyde of formula VII can be transformed into an alkyne of formula VIII by reaction with a suitable diazo-phosphonate reagent, e.g. the Bestmann-Ohira reagent, dimethyl (1-diazo-2-oxopropyl)phosphonate, in the presence of a suitable base, e.g. potassium carbonate, or sodium carbonate. Prior to further functionalisation of the imidazole ring, the alkyne of formula VIII needs to be protected by a suitable protective group, e.g. trimethylsilyl (TMS), by reaction with a suitable reagent, e.g. trimethylsilyl chloride, in the presence of a strong, non-nucleophilic base, such as lithium hexamethyldisilazide, or lithium diisopropylamide. The resulting compound of formula IX can be carboxylated to form a compound of formula X, wherein $R^8$ is methyl or ethyl, by reaction with the corresponding chloroformic acid ester $ClC(O)OR^8$, after deprotonation using a strong base, e.g. n-butyl lithium, or lithium diisopropylamide. A combined deprotection-amide formation can be achieved by reacting the compound of formula X with an excess of ammonia, optionally with addition of catalytic or stoichiometric amounts of sodium cyanide, in a suitable polar or protic solvent, such as methanol, at elevated temperature of 40° C. to 80° C., preferably in a pressure vial. Alternatively, the deprotection-amidation sequence can be carried out in a stepwise fashion. In the last step, the central building block of formula IV is coupled with a suitable reagent of formula $R^3$—Y, wherein $R^3$ is as defined above, and wherein Y is halogen, preferably bromine or iodine, more preferably iodine, in a Sonogashira reaction using catalytic or stoichiometric amounts of a suitable transition metal complex, e.g. bis(triphenylphosphine)palladium(II) dichloride, or 1,1'-bis(diphenylphosphino) ferrocene-palladium(II)dichloride, optionally as a solvent adduct, in the presence of stoichiometric amounts of a suitable base, e.g. triethyl amine or cesium carbonate, optionally in the presence of catalytic or stoichiometric amounts of a suitable co-catalyst, e.g. copper(I) iodide, in an appropriate solvent, such as dimethylformamide or acetonitrile.

A particular embodiment of the invention relates to a process for the preparation of compounds of formula (Ia) and pharmaceutically acceptable salts thereof as defined above, comprising a reaction between a compound of formula (IV) as described above with a compound of formula $R^3$—Y wherein $R^3$ and Y are as defined above, in the presence of either using catalytic or stoichiometric amounts of a suitable transition metal complex, such as bis(triphenylphosphine)palladium(II) dichloride, or 1,1'-bis(diphenylphosphino) ferrocene-palladium(II)dichloride, in the presence of stoichiometric amounts of a suitable base, such as. triethyl amine or cesium carbonate, and optionally in the presence of catalytic or stoichiometric amounts of a suitable co-catalyst, e.g. copper(I) iodide.

Scheme 2

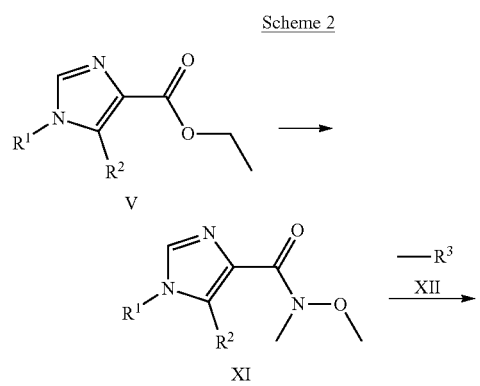

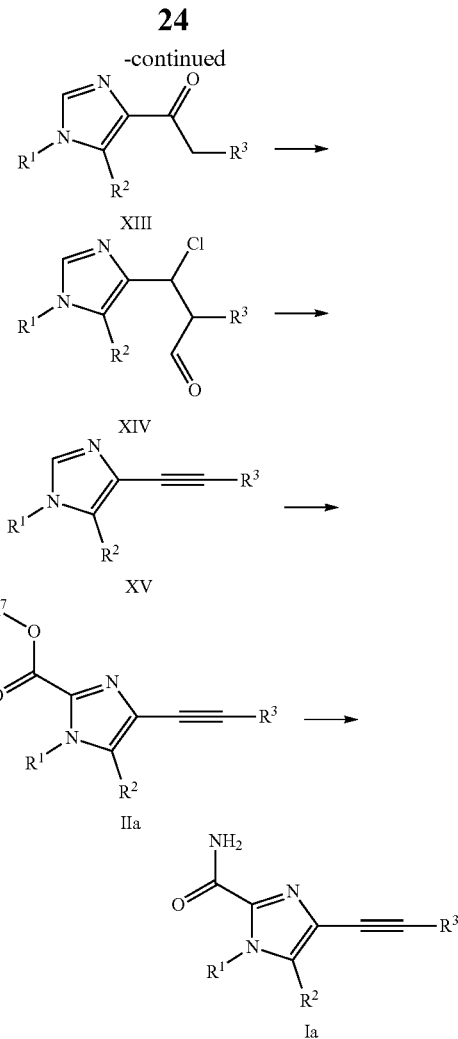

Alternatively, compounds of formula Ia, wherein $R^1$, $R^2$ and $R^3$ are as defined above, can be accessed as outlined in Scheme 2. An intermediate of formula V, wherein $R^1$ and $R^2$ are as defined above, is transformed into the corresponding Weinreb amide of formula XI by reaction with N,O-dimethylhydroxylamine, in the presence of a suitable Lewis acid, e.g. trimethyl aluminium. Alternatively, this transformation can be achieved by a two step process consisting of ester hydrolysis followed by amide formation using standard conditions known in the art. Next, the Weinreb amide of formula XI can be reacted with a suitable methyl substituted heteroaromatic compound of formula XII, after deprotonation thereof using a strong, non-nucleophilic lithium base, e.g. lithium diisopropylamide, to a ketone of formula XIII. The intermediate of formula XIII is then further transformed into an alkyne of formula XV via an intermediate of formula XIV by reaction with N-(chloromethylene)-N-methylmethanaminium chloride, followed by reaction with a non-nucleophilic base, such as potassium tert-butoxide. The resulting compound of formula XV can be carboxylated to form a compound of formula IIa, wherein $R^7$ is methyl or ethyl, by reaction with the corresponding chloroformic acid ester $ClC(O)OR^7$, after deprotonation using a strong base, e.g. n-butyl lithium, or lithium diisopropylamide. Finally, a compound of formula I can be synthesized by reaction of an intermediate of formula IIa with an excess of ammonia in a suitable solvent, such as methanol, at elevated temperatures of 70° C. to 100° C., preferably in a closed pressure vial.

Alternatively, a compound of formula XV can be carboxylated to form a compound of formula IIa, wherein $R^7$ is hydrogen, by reaction with carbondioxide, after deprotonation using a strong base, e.g. n-butyl lithium, or lithium diisopropylamide. The final step, amide formation to access compounds of formula Ia, can be achieved using methods known in the scientific literature, e.g. using stoichiometric amounts of N,N'-carbonyldiimidazole and ammonia.

Alternatively, compounds of formula IX, wherein $R^1$ and $R^2$ are as defined above, can be synthesized using the sequence depicted in Scheme 3.

Scheme 3

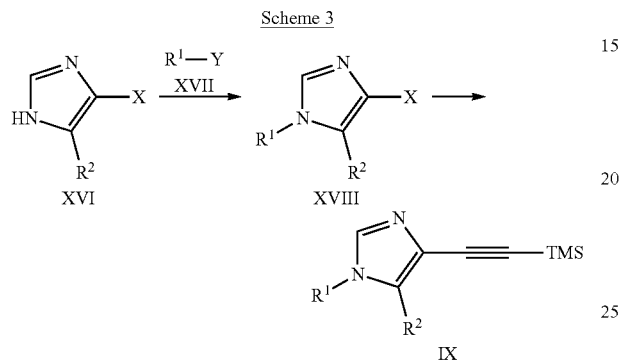

A compound of formula XVI, wherein $R^2$ is as defined above, and X is halogen, preferably iodine, and that can be accessed using methods known in the art, can be reacted with a compound of formula XVII, wherein $R^1$ is as defined above, and Y is halogen or $B(OR^9)_2$, wherein $R^9$ is hydrogen, methyl, or $B(OR^9)_2$ is pinacolboronyl, optionally in the presence of a suitable transition metal catalyst, such as a Palladium- or Copper-containing complex, optionally in the presence of a suitable base, e.g. cesium carbonate or potassium phosphate. In the case of a Cham Lam coupling (Y is $B(OR^9)_2$), the presence of an oxidative agent, such as oxygen, is also required. The compound of formula XVIII can be transformed into a compound of formula IX by reaction with trimethylsilylacetylene under standard Sonogashira coupling conditions, using catalytic or stoichiometric amounts of a suitable transition metal complex, e.g. bis(triphenylphosphine)palladium(II) dichloride, or 1,1'-bis (diphenylphosphino) ferrocene-palladium(II)dichloride, optionally as a solvent adduct, in the presence of stoichiometric amounts of a suitable base, e.g. triethyl amine or cesium carbonate, optionally in the presence of catalytic or stoichiometric amounts of a suitable co-catalyst, e.g. copper (I) iodide, in an appropriate solvent, such as dimethylformamide or acetonitrile.

Another subgroup of compounds of formula I, wherein $X^1$ is C, $X^2$ is N and $X^3$ is N, can be prepared as outlined in scheme 4.

Scheme 4

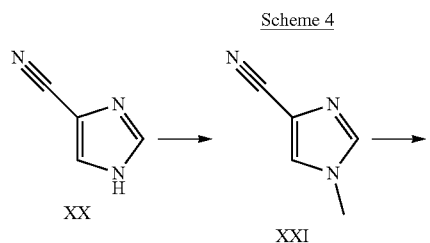

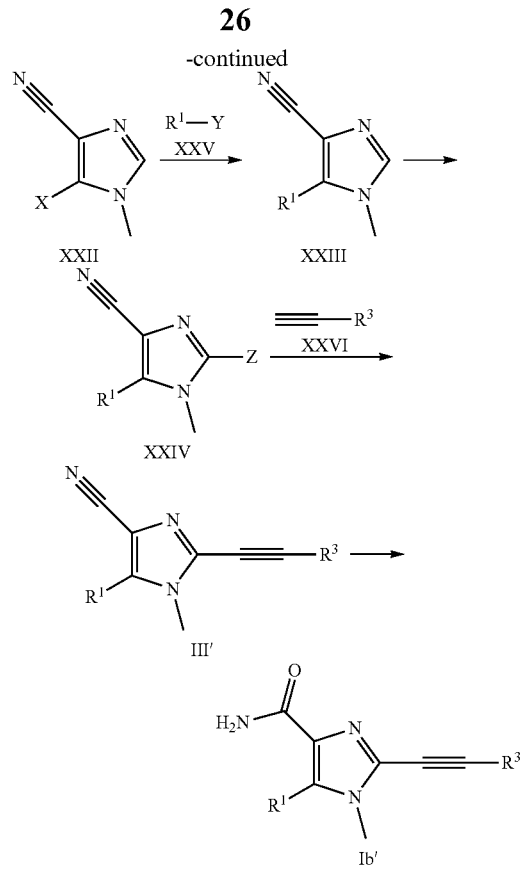

Commercially available starting material of formula XX can be selectively methylated under standard conditions, for example using sodium hydride as base and methyl iodide or dimethyl sulfate as methylating agents. The resulting compound of formula XXI can be selectively transformed into a compound of formula XXII, wherein X is halogen, preferably bromine or iodine, by reaction with an appropriate halogenating agent, e.g. N-bromosuccinimide, N-iodosuccinimide, or bromine. Next, the substituent $R^1$ can be introduced by reaction with a reagent of formula XXV, wherein $R^1$ is as defined above, and Y is $B(OR^9)_2$, wherein $R^9$ is hydrogen, methyl, or $B(OR^9)_2$ is pinacolboronyl, e.g. under standard Suzuki-Miyaura reaction conditions. The intermediate of formula XXIII can again be selectively halogenated to an intermediate of formula XXIV, wherein Z is bromine or iodine, preferably iodine, by reaction with an appropriate halogenating agent, such as N-iodosuccinimide (in case Z=I). In the following step, the substituent $R^3$ can be introduced by reaction with the corresponding alkyne of formula XXVI, wherein $R^3$ is as defined above and which is commercially available or can be synthesized by methods known in the art, using standard Sonogashira reaction conditions, e.g. using catalytic or stoichiometric amounts of a suitable transition metal complex, e.g. bis(triphenylphosphine)palladium(II) dichloride, or 1,1'-bis(diphenylphosphino) ferrocene-palladium(II)dichloride, optionally as a solvent adduct, in the presence of stoichiometric amounts of a suitable base, e.g. triethyl amine or cesium carbonate, optionally in the presence of catalytic or stoichiometric amounts of a suitable co-catalyst, e.g. copper(I) iodide, in an appropriate solvent, such as dimethylformamide or acetonitrile. In the last step, the cyano group is hydrolysed to a carboxamide using methods known in the art, e.g. by reaction with sulfuric acid.

Another subgroup of compounds of formula I, wherein $X^1$ is N, $X^2$ is C and $X^3$ is C, can be prepared via a sequence shown in scheme 5.

Scheme 5

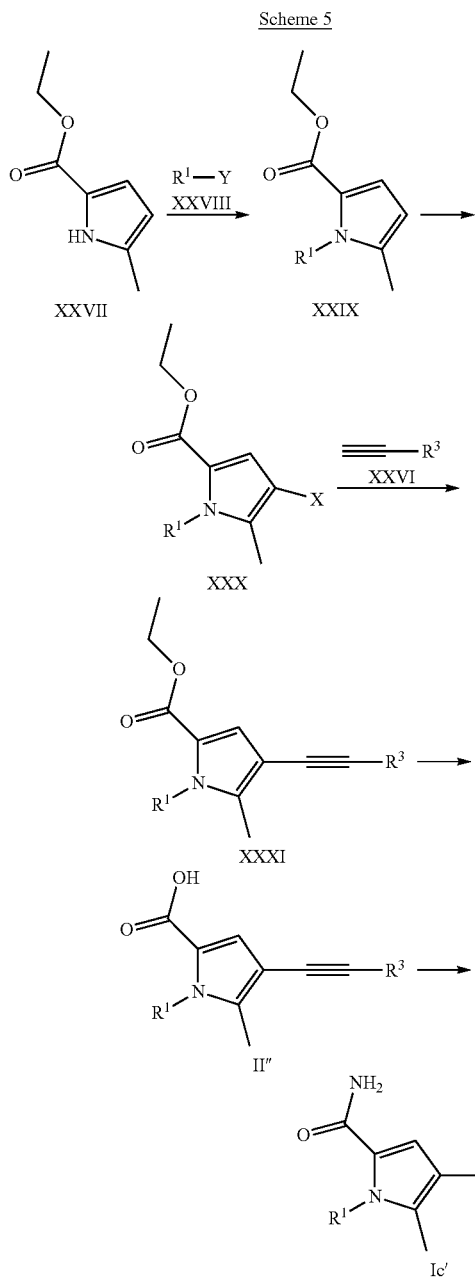

Commercially available compound of formula XXVII can be reacted with an appropriate reagent of formula XXVIII, wherein $R^1$ is as defined above and Y is halogen, preferably bromine or iodine, in the presence of catalytic or stoichiometric amounts of a suitable transition metal complex, e.g. copper(I) iodide, and, respectively, catalytic or stoichiometric amounts of a suitable ligand, e.g. N,N'-dimethylcyclohexane-1,2-diamine, and, furthermore, in the presence of a suitable base, e.g. potassium phosphate. The resulting intermediate of formula XXIX can then be halogenated using an appropriate halogenating agent, such as N-iodo succinimide, or N-bromo succinimide, to generate a compound of formula XXX, wherein X is bromine or iodine, preferably iodine. In the following step, the substituent $R^3$ can be introduced by reaction with the corresponding alkyne of formula XXVI, wherein $R^3$ is as defined above and which is commercially available or can be synthesized by methods known in the art, using standard Sonogashira reaction conditions, e.g. using catalytic or stoichiometric amounts of a suitable transition metal complex, e.g. bis(triphenylphosphine)palladium(II) dichloride, or 1,1'-bis(diphenylphosphino) ferrocene-palladium(II)dichloride, optionally as a solvent adduct, in the presence of stoichiometric amounts of a suitable base, e.g. triethyl amine or cesium carbonate, optionally in the presence of catalytic or stoichiometric amounts of a suitable co-catalyst, e.g. copper(I) iodide, in an appropriate solvent, such as dimethylformamide or acetonitrile. The resulting intermediate of formula XXXI can be transformed into the desired compound of formula I either by direct reaction with ammonia at elevated temperatures, optionally in a closed vial, or via intermediate II'', as depicted in scheme 5. Hydrolysis can by achieved by standard methods known in the art, e.g. by reaction with an alkali hydroxide, such as lithium hydroxide, in an appropriate solvent, such as tetrahydrofurane or water, or mixtures thereof. The final step, amide formation to access compounds of formula I, can again be achieved using methods known in the scientific literature, e.g. using stoichiometric amounts of N,N'-carbonyldiimidazole and ammonia.

A particular embodiment of the invention relates to a process for the preparation of compounds of formula (I) and pharmaceutically acceptable salts thereof as defined in accordance with the present invention, comprising a reaction between a compound of formula (IVa) wherein $R^1$, $R^2$, $R^3$, $X^1$, $X^2$ and $X^3$ are as defined herein, with a compound of formula $R^3$—Y wherein Y are as defined above, in the presence of either catalytic or stoichiometric amounts of a suitable transition metal complex, such as bis(triphenylphosphine)palladium(II) dichloride, or 1,1'-bis(diphenylphosphino) ferrocene-palladium(II)dichloride, in the presence of stoichiometric amounts of a suitable base, such as. triethyl amine or cesium carbonate, and optionally in the presence of catalytic or stoichiometric amounts of a suitable co-catalyst, e.g. copper(I) iodide as shown in scheme 6.

Scheme 6

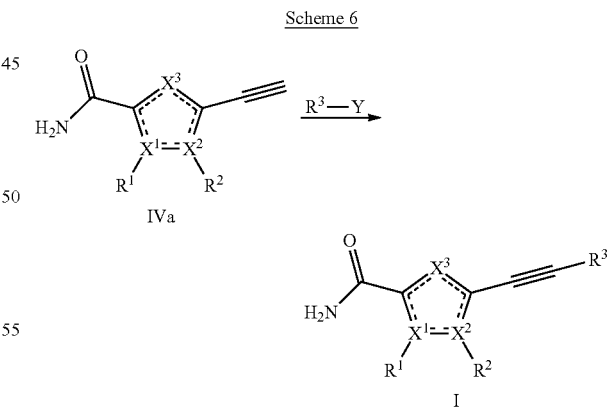

The compounds were investigated in accordance with the test given hereinafter.

Description of HCN1, HCN2, HCN3 and HCN4 Assay

In vitro, high-throughput cellular electrophysiology was employed to detect voltage- and use-dependence of compounds in single concentration screening and IC50 determination for library and medicinal chemistry profiling compounds in 384 well plates.

HEK-293 cell lines stably expressing coding DNA for HCN1, 2, 3 or 4 were validated on automated patch clamp (APC) platform, Ionworks Barracuda. Cell cultures were maintained in DMEM/F12 cell growth media containing FBS and appropriate antibiotics at 37° C., 5% $CO_2$ for a maximum of 20 passages. At a time point of 40-72 hours prior to assay, the expression of HCN protein in the cells is induced by addition of tetracyclin. Cells may be incubated at 27° C. for 2-24 hours of induction. Intra- (w. glucose) and extracellular HEPES buffers containing various divalent cations were adjusted to pH 7.2 and 7.4, respectively. Cells were harvested at 80% confluency and resuspended in extracellular buffer and added to wells. A freshly prepared Escin solution was added to intracellular buffer and applied to establish whole cell recording via perforated patch clampling by APC.

Currents through activated channels were measured directly by APC by employing hyperpolarizing voltage steps. The activation window was increased and stabilized by the addition of cell permeable Br-cAMP. Baselines were established for both use- and voltage-dependence protocols using a −30 mV holding potential and multiple test pulses at −100 mV or by 20 mV steps from −120 to 0 mV, respectively. Test compounds were added after baseline recordings followed by a 10 min incubation, voltage-dependency protocol recording, and use-dependency recording. Data was corrected for baseline and rundown (well based) and normalized for % inhibition (plate based). Five previously reported HCN inhibitors of varying potencies and selectivities and zatebradine were used for run to run and plate to plate quality controls. A non-selective and potent inhibitor was used as a positive control. Percent inhibition was analysed at −80, −100, −120 mV of the voltage-dependency protocol and at pulse 0 and 50 of the use-dependency protocols. Selectivity was assessed against HCN2, HCN3, and HCN4 overexpressing cell lines using similar methods. As HCN4 has a slower activation than the other HCN channels, activation was extended to achieve steady state activation.

The table below shows the data for selected compounds for the current inhibition during a hyperpolarizing pulse of −100 mV:

| Example No. | HCN1 IC50 (uM) | HCN2 IC50 (uM) | HCN3 IC50 (uM) | HCN4 IC50 (uM) |
|---|---|---|---|---|
| 1 | 0.159 | >40 | >40 | >40 |
| 2 | 0.173 | >40 | >40 | >40 |
| 3 | 0.100 | >40 | 25.7 | >40 |
| 4 | 0.225 | 30.6 | 32.8 | >40 |
| 5 | 0.240 | >40 | >40 | >40 |
| 6 | 0.260 | >40 | >40 | >40 |
| 7 | 0.297 | >40 | | >40 |
| 8 | 0.460 | >40 | 36.4 | >40 |
| 9 | 0.518 | >40 | | >40 |
| 10 | 0.579 | >40 | >40 | >40 |
| 11 | 0.833 | >40 | | >40 |
| 12 | 1.009 | >40 | | >40 |
| 13 | 0.903 | | >40 | |
| 14 | 1.941 | | >40 | |
| 15 | 2.390 | >40 | | >40 |
| 16 | 2.403 | >40 | | >40 |
| 17 | 3.016 | >40 | | >40 |
| 18 | 4.098 | | >40 | |
| 19 | 6.466 | | | >40 |
| 20 | 8.592 | >40 | | >40 |
| 21 | 11.233 | | >40 | |
| 22 | 6.032 | >40 | | >40 |
| 23 | 0.303 | >40 | 2.4 | >40 |
| 24 | 0.150 | >40 | | >40 |
| 25 | 0.125 | | 20.5 | >40 |
| 26 | 0.241 | >40 | >40 | >40 |
| 27 | 0.051 | >40 | 38.4 | >40 |
| 28 | 0.192 | >40 | >40 | >40 |
| 29 | 0.046 | 14.3 | 4.6 | 13.9 |
| 30 | 0.087 | | | >40 |
| 31 | 0.231 | >40 | 23.5 | >40 |
| 32 | 0.429 | >40 | >40 | >40 |
| 33 | 0.947 | | >40 | >40 |
| 34 | 0.099 | | 4.9 | >40 |
| 37 | 3.119 | | >40 | |
| 38 | 0.232 | >40 | >40 | >40 |
| 39 | 0.383 | >40 | >40 | >40 |
| 40 | 3.162 | >40 | | >40 |
| 41 | 17.405 | | >40 | |
| 42 | 2.523 | >40 | >40 | >40 |
| 43 | 2.524 | | >40 | |
| 44 | 0.229 | | >40 | >40 |

EXPERIMENTAL PART

The following examples are provided for illustration of the invention. They should not be considered as limiting the scope of the invention, but merely as being representative thereof.

General

Analytical Methods

HPLC (method LCMS_fastgradient)

Column: Agilent Zorbax Eclipse Plus C18, Rapid Resolution HT, 2.1×30 mm, 1.8 μm, Part. no. 959731-902

Solvent A: Water 0.01% Formic Acid; Solvent B: acetonitrile (MeCN)

Gradients:

| Time [min] | Flow Rate [ml/min] | % A | % B |
|---|---|---|---|
| Initial | 0.8 | 97 | 3 |
| 0.2 | 1.0 | 97 | 3 |
| 1.7 | 1.0 | 3 | 97 |
| 2.0 | 1.0 | 3 | 97 |
| 2.1 | 1.0 | 97 | 3 |

Abbreviations

The following abbreviations were used in the experimental part:

THF=tetrahydrofuran;

MTBE=methyl-tert-butylether;

DMF=dimethylformamide;

TLC=thin layer chromatography;

rt=room temperature, 20-25° C.

Starting Materials

Basic chemicals and solvents were purchased and used as is without further purification. Intermediates Int-1, Int-2, Int-13-Int-15, Int-35-Int-43, Int-50, Int-51, Int-57, Int-58, Int-67-Int-71, Int-78, Int-81, Int-84, Int-91-Int-96 are commercially available, or they can be synthesized using methods known in the art.

INTERMEDIATES

Intermediate 9

4-Ethynyl-5-methyl-1-(6-methylpyridin-3-yl)-1H-imidazole-2-carboxamide

General Procedure A

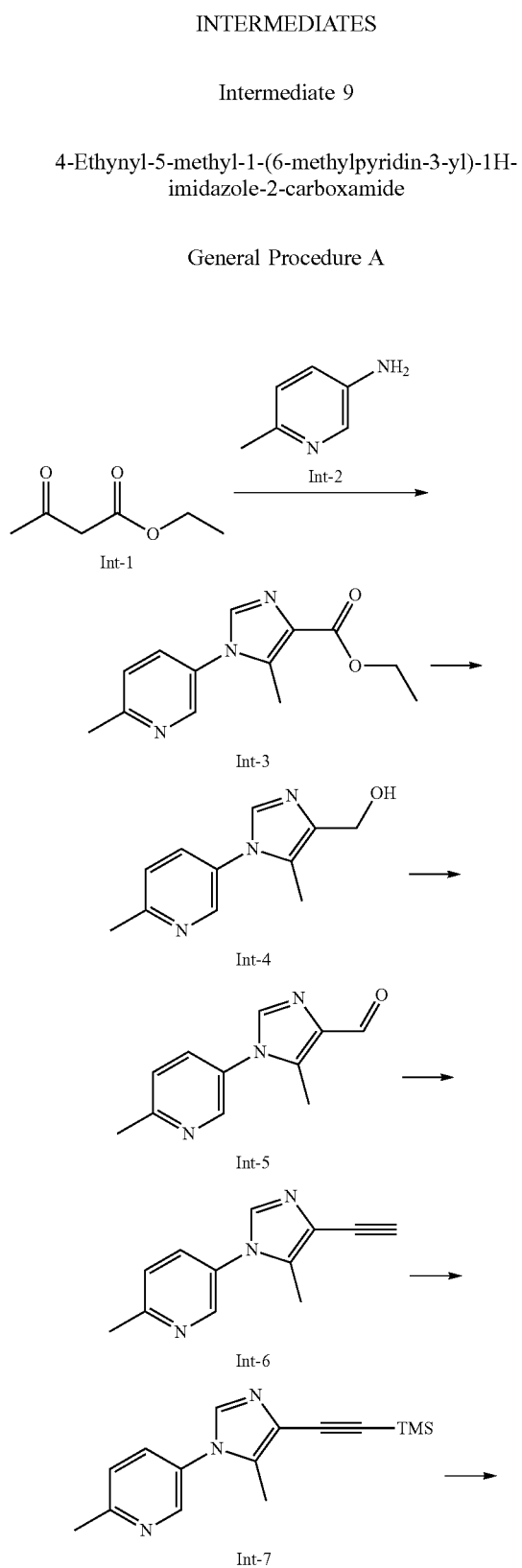

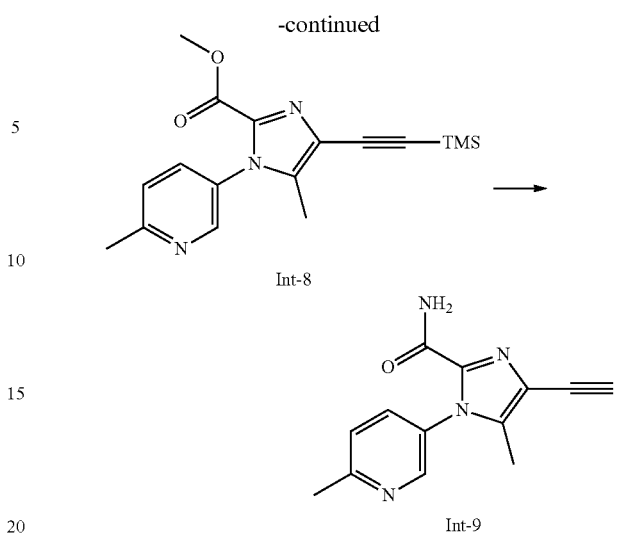

Step 1: Ethyl 5-methyl-1-(6-methylpyridin-3-yl)-1H-imidazole-4-carboxylate (Int-3)

Ethyl 3-oxobutanoate (Int-1) (5.17 g, 5.03 mL, 39.7 mmol) was dissolved in acetic acid (9 mL) at 0° C., and a solution of sodium nitrite (3.01 g, 43.7 mmol) in water (13 mL) was added dropwise. The mixture was stirred for 2 hours at 5-10° C. Then, it was diluted with tert-butylmethyl ether (100 mL), the organic layer was washed with saturated aqueous solution of sodium hydrogenphosphate (50 mL) and water (2×50 mL), dried over sodium sulfate and concentrated under reduced pressure to obtain the crude ethyl (Z)-2-(hydroxyimino)-3-oxobutanoate (6.2 g, 39 mmol, 98% yield) as a colourless oil. No further purification.

The crude ethyl (Z)-2-(hydroxyimino)-3-oxobutanoate (6.2 g, 39 mmol) was dissolved in toluene (80 mL) and 6-methylpyridin-3-amine (Int-2) (4.42 g, 40.9 mmol) followed by pyridinium p-toluenesulfonate (196 mg, 779 µmol) were added sequentially. The dark reaction mixture was stirred in a Dean-Stark apparatus at reflux for 12 hours. After cooling, triethoxymethane (21.2 g, 23.5 mL, 143 mmol), p-toluenesulfonic acid monohydrate (148 mg, 779 µmol) and Pd/C 10% (829 mg, 779 µmol) were added under argon. The resulting black reaction mixture was stirred under hydrogen atmosphere for 24 h. As the reaction did not show full conversion, fresh Pd/C 10% (829 mg, 779 µmol) and scandium(III) trifluoromethanesulfonate (192 mg, 390 µmol) were added and stirring continued under hydrogen atmosphere for another 24 h. Then, the black reaction mixture was filtered and the filtrate concentrated in vacuo. The crude product was adsorbed on isolute HM-N and purified by column chromatography (80 g, silica gel, methanol/dichloromethane, gradient 0:100 to 10:90 (v/v)) to give the title compound as a light brown solid (5.3 g, 21.6 mmol, 55% yield). HPLC (method LCMS_fastgradient) $t_R$=0.79 min. MS (ES+) m/z 246.0 [M+H].

Step 2: (5-Methyl-1-(6-methylpyridin-3-yl)-1H-imidazol-4-yl)methanol (Int-4)

In a 100 ml four necked flask, ethyl 5-methyl-1-(6-methylpyridin-3-yl)-1H-imidazole-4-carboxylate (Int-3) (2.1 g, 8.58 mmol) was dissolved in THF (50 mL). The brown solution was cooled to 0° C. Then, lithium aluminum hydride (1M in THF) (11.3 mL, 11.3 mmol) was added dropwise. The reaction mixture was stirred for 1 hour at 0° C. After that, water (0.44 mL), 1M aqueous sodium hydroxide (0.44 mL), and water (1.32 mL) were added subsequently and the mixture stirred for 1 h at room temperature. Sodium sulfate (30 g) was added, the slurry was filtered, washed with THF (50 mL) and the filtrate was concentrated in vacuo to obtain the title compound as a yellow solid (1.35 g, 6.64 mmol, 77% yield). HPLC (method LCMS_fastgradient) $t_R$=0.23 min. MS (ES+) m/z 204.1 [M+H].

Step 3: 5-Methyl-1-(6-methylpyridin-3-yl)-1H-imidazole-4-carbaldehyde (Int-5)

(5-Methyl-1-(6-methylpyridin-3-yl)-1H-imidazol-4-yl)methanol (Int-4) (1.35 g, 6.64 mmol) was suspended in dichloromethane (70 mL) and manganese dioxide (11.5 g, 133 mmol) was added. The black mixture was stirred for 1 h at room temperature. Then, it was filtered, washed with dichloromethane (20 mL) and the filtrate was concentrated in vacuo to give the title compound as a yellow solid (0.97 g, 4.82 mmol, 73% yield). HPLC (method LCMS_fastgradient) $t_R$=0.62 min. MS (ES+) m/z 202.1 [M+H].

Step 4: 5-(4-Ethynyl-5-methyl-1H-imidazol-1-yl)-2-methylpyridine (Int-6)

5-Methyl-1-(6-methylpyridin-3-yl)-1H-imidazole-4-carbaldehyde (Int-5) (0.97 g, 4.82 mmol) was dissolved in methanol (40 mL) and dimethyl (1-diazo-2-oxopropyl)phosphonate (1.3 g, 1.01 mL, 6.75 mmol) as well as potassium carbonate (1.33 g, 9.64 mmol) were added. The reaction was stirred 18 h at room temperature. After that, it was poured onto saturated aqueous sodium hydrogencarbonate solution (100 mL), and extracted with dichloromethane (2×80 mL). The combined organic layers were dried over sodium sulfate, filtered, and the filtrate concentrated in vacuo. The residue was adsorbed on isolute HM-N and purified by column chromatography (40 g, silica gel, methanol/dichloromethane, gradient 0:100 to 5:95 (v/v)) to afford the title compound as a yellow oil (570 mg, 2.89 mmol, 60% yield). HPLC (method LCMS_fastgradient) $t_R$=0.71 min. MS (ES+) m/z 198.1 [M+H].

Step 5: 2-Methyl-5-(5-methyl-4-((trimethylsilyl)ethynyl)-1H-imidazol-1-yl)pyridine (Int-7)

5-(4-Ethynyl-5-methyl-1H-imidazol-1-yl)-2-methylpyridine (Int-6) (1.27 g, 6.45 mmol) was dissolved in THF (70 mL), solution was cooled to −60° C. and LHMDS (1M in THF/ethylbenzene, 6.45 mL, 6.45 mmol) was added dropwise. The reaction was stirred at −60° C. for 1 h. Then, trimethylchlorosilane (701 mg, 825 µL, 6.45 mmol) was added at −60° C. and the reaction mixture was stirred for another 2 h at −60° C. Then, saturated aqueous ammonium chloride solution (30 mL) was added, followed by ethyl acetate (50 mL). After phase separation, the aqueous layer was extracted with ethyl acetate (50 mL), the combined organic layers were washed with water (50 mL) and brine (50 mL), dried over sodium sulfate, filtered and the filtrate was concentrated in vacuo to yield the title compound as a brown solid (1.74 g), that was used in the next step without further purification. HPLC (method LCMS_fastgradient) $t_R$=1.18 min. MS (ES+) m/z 270.3 [M+H].

Step 6: Methyl 5-methyl-1-(6-methylpyridin-3-yl)-4-((trimethylsilyl)ethynyl)-1H-imidazole-2-carboxylate (Int-8)

2-Methyl-5-(5-methyl-4-((trimethylsilyl)ethynyl)-1H-imidazol-1-yl)pyridine (Int-7, crude from preceeding step) (1.74 g, 6.46 mmol) was dissolved in THF (50 mL) and the solution was cooled to −60° C. n-Butyl lithium (1.6 M in hexane, 4.4 mL, 7.1 mmol) was added in one portion at −60° C. The resulting brown solution was stirred at −60° C. for 10 min. Then, methyl chloroformate (1.04 g, 850 µL, 11 mmol) was added at −60° C. in one portion. The reaction mixture was stirred for one hour at −60° C. Then, saturated aqueous ammonium chloride solution (20 mL) was added, followed by ethyl acetate (20 mL). After phase separation, the aqueous layer was extracted with ethyl acetate (2×20 mL), the combined organic layers were washed with water (30 mL) and brine (30 mL), dried over sodium sulfate, filtered and the filtrate was concentrated in vacuo. The residue was adsorbed on isolute HM-N and purified by column chromatography (40 g, silica gel, ethyl acetate/n-heptane, gradient 0:100 to 80:20 (v/v)) to afford the title compound as a white solid (940 mg, 2.87 mmol, 44% yield over 2 steps). HPLC (method LCMS_fastgradient) $t_R$=1.28 min. MS (ES+) m/z 328.2 [M+H].

Step 7: 4-Ethynyl-5-methyl-1-(6-methylpyridin-3-yl)-1H-imidazole-2-carboxamide (Int-9)

A solution of methyl 5-methyl-1-(6-methylpyridin-3-yl)-4-((trimethylsilyl)ethynyl)-1H-imidazole-2-carboxylate (Int-8) (426 mg, 1.3 mmol) and sodium cyanide (8.93 mg, 182 µmol) in ammonia (7 N in methanol) (11.2 mL, 78.1 mmol) was stirred in a pressure tube for 1.5 h at 50° C. After cooling, the reaction mixture was concentrated in vacuo. The residue was adsorbed on isolute HM-N and purified by column chromatography (40 g, silica gel, methanol/dichloromethane, gradient 0:100 to 10:90 (v/v)) to yield the title compound as an off-white solid (273 mg, 1.14 mmol, 87% yield). HPLC (method LCMS_fastgradient) $t_R$=0.72 min. MS (ES+) m/z 241.2 [M+H].

In analogy to the synthesis of Int-9, the following intermediates can be synthesized using procedures outlined in General Procedure A, and replacing reagent Int-2 by reagents listed in the following table:

| Intermediate | Structure | Name | Int-2 replacement | MS (ES+) m/z |
| --- | --- | --- | --- | --- |
| Int-10 | ![structure] | 4-ethynyl-5-methyl-1-(p-tolyl)imidazole-2-carboxamide | 4-methylaniline (Int-13) | 240.3 [M + H] |

| Intermediate | Structure | Name | Int-2 replacement | MS (ES+) m/z |
|---|---|---|---|---|
| Int-11 | | 1-(4-chlorophenyl)-4-ethynyl-5-methyl-imidazole-2-carboxamide | 4-chloroaniline (Int-14) | 260.1 262.1 [M + H, Cl isotopes] |

Intermediate 22

4-Ethynyl-1-(6-methyl-3-pyridyl)imidazole-2-carboxamide

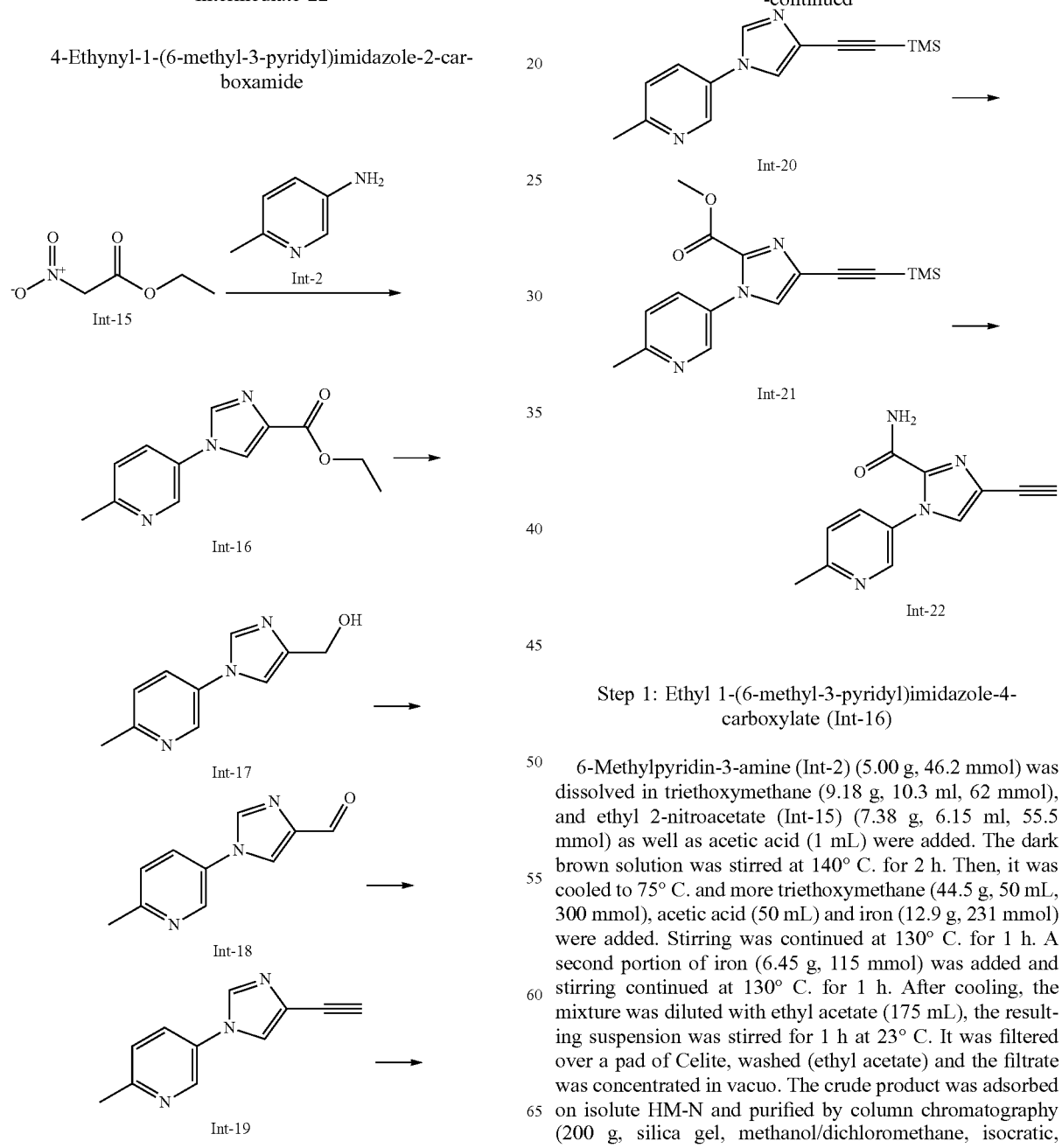

Step 1: Ethyl 1-(6-methyl-3-pyridyl)imidazole-4-carboxylate (Int-16)

6-Methylpyridin-3-amine (Int-2) (5.00 g, 46.2 mmol) was dissolved in triethoxymethane (9.18 g, 10.3 ml, 62 mmol), and ethyl 2-nitroacetate (Int-15) (7.38 g, 6.15 ml, 55.5 mmol) as well as acetic acid (1 mL) were added. The dark brown solution was stirred at 140° C. for 2 h. Then, it was cooled to 75° C. and more triethoxymethane (44.5 g, 50 mL, 300 mmol), acetic acid (50 mL) and iron (12.9 g, 231 mmol) were added. Stirring was continued at 130° C. for 1 h. A second portion of iron (6.45 g, 115 mmol) was added and stirring continued at 130° C. for 1 h. After cooling, the mixture was diluted with ethyl acetate (175 mL), the resulting suspension was stirred for 1 h at 23° C. It was filtered over a pad of Celite, washed (ethyl acetate) and the filtrate was concentrated in vacuo. The crude product was adsorbed on isolute HM-N and purified by column chromatography (200 g, silica gel, methanol/dichloromethane, isocratic, 10:90 (v/v)), followed by crystallization from dichloromethane/tertbutyl methylether to give the title compound as a light brown solid (3.2 g, 13.8 mmol, 30% yield). HPLC (method LCMS_fastgradient) $t_R$=0.76 min. MS (ES+) m/z 232.2 [M+H].

The following steps 2-7 were carried out in analogy to protocols described in General procedure A, steps 2-7, respectively.

Step 7: Ethyl 1-(6-methyl-3-pyridyl)imidazole-4-carboxylate (Int-22)

HPLC (method LCMS_fastgradient) $t_R$=0.64 min. MS (ES+) m/z 227.2 [M+H].

Intermediate 28

Methyl 4-[2-(2-chloro-3-fluoro-4-pyridyl)ethynyl]-5-methyl-1-(6-methyl-3-pyridyl)imidazole-2-carboxylate (General Procedure B)

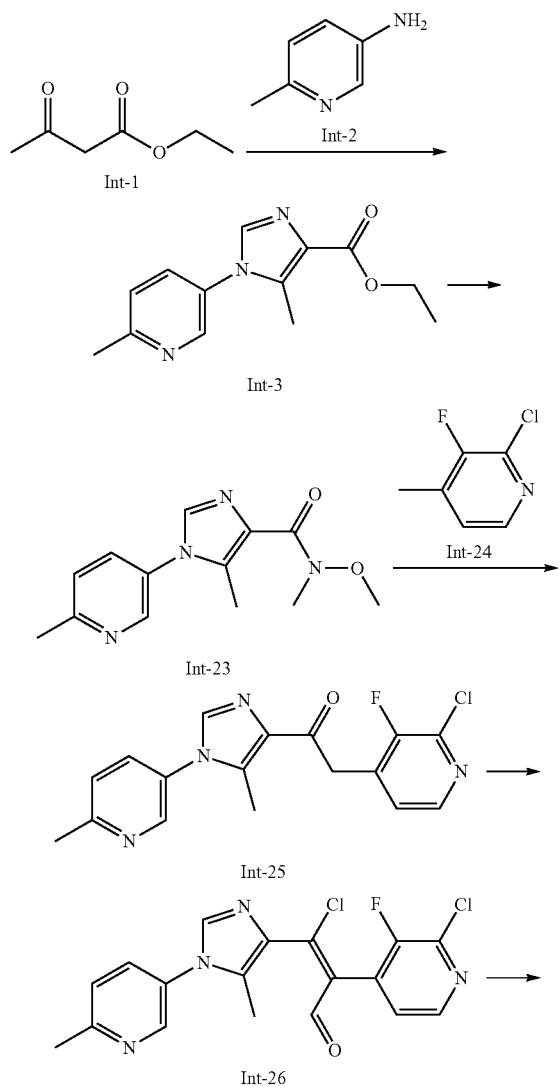

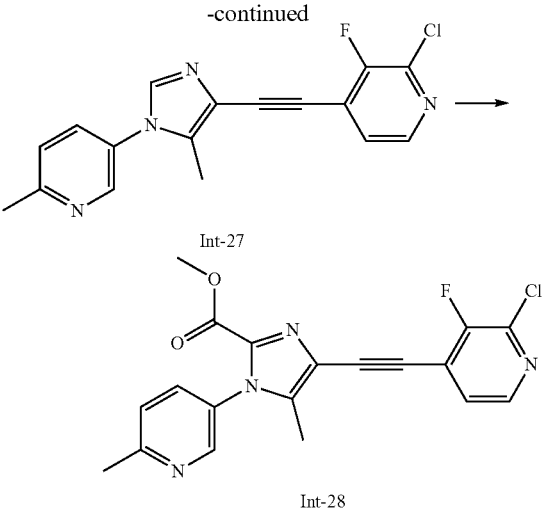

Step 1: Ethyl 5-methyl-1-(6-methyl-3-pyridyl)imidazole-4-carboxylate (Int-3)

A solution of sodium nitrite (3.01 g, 43.7 mmol) in water (13 ml) was added dropwise to a solution of ethyl 3-oxobutanoate (Int-1) (5.17 g, 5.03 ml, 39.7 mmol) in acetic acid (8 ml) at 0° C. The reaction mixture was stirred for 2 h at 5-10° C. The resulting reaction mixture was diluted with tertbutyl methylether (100 mL), and the organic layer was washed with a saturated solution of disodium phosphate (2×50 mL), dried (sodium sulfate), filtered and concentrated in vacuo to give ethyl (Z)-2-(hydroxyimino)-3-oxobutanoate (6.204 g, 39 mmol, 98% yield) as a colourless oil which was used without further purification. HPLC (method LCMS_fastgradient) $t_R$=0.72 min. MS (ES+) m/z 160.1 [M+H].

To a solution of ethyl (Z)-2-(hydroxyimino)-3-oxobutanoate (6.2 g, 39 mmol) in toluene (78 ml) were sequentially added 6-methylpyridin-3-amine (Int-2) (4.42 g, 40.9 mmol) and pyridinium p-toluenesulfonate (196 mg, 779 μmol). The dark reaction mixture was stirred with a Dean-Stark apparatus at reflux for 12 h (desired intermediate ethyl (2Z,3E)-2-hydroxyimino-3-[(6-methyl-3-pyridyl)imino]butanoate, HPLC (method LCMS_fastgradient) $t_R$=0.61 min. MS (ES+) m/z 250.2 [M+H]). After cooling, triethoxymethane (21.2 g, 23.5 ml, 143 mmol), p-toluenesulfonic acid monohydrate (148 mg, 779 μmol) and Pd/C 10% (829 mg, 779 μmol) were sequentially added under argon to this solution at room temperature. The resulting black reaction mixture was stirred under hydrogen atmosphere for 24 h. Fresh Pd/C 10% (829 mg, 779 μmol) and scandium trifluoromethanesulfonate (192 mg, 390 μmol) were added and stirring continued under hydrogen for 24 h. The black reaction mixture was filtered off and evaporated to dryness in vacuo. The residue was adsorbed on isolute HM-N and purified by column chromatography (80 g, silica gel, methanol/dichloromethane, gradient 0:100 to 10:90) to give the title compound as a light brown solid (5.3 g, 21.6 mmol, 56% yield). HPLC (method LCMS_fastgradient) $t_R$=0.79 min. MS (ES+) m/z 246.0 [M+H].

Step 2: N-Methoxy-N,5-dimethyl-1-(6-methyl-3-pyridyl)imidazole-4-carboxamide (Int-23)

In a 100 mL three-necked flask, N,O-dimethylhydroxylamine hydrochloride (2.68 g, 27.5 mmol) was combined with dioxane (15 mL) to give a white suspension. Trimethylaluminum (2M in toluene) (13.7 mL, 27.5 mmol) was added dropwise at 5° C. The reaction mixture was stirred at room temperature for 45 min then a solution of ethyl 5-methyl-1-(6-methylpyridin-3-yl)-1H-imidazole-4-carboxylate (Int-3) (2.246 g, 9.16 mmol) in 15 mL of dioxane was added at 10° C. The reaction mixture allowed to reach room temperature and stirred for 20 h. Then, the reaction mixture was cooled to 0° C. and water (10 mL) was added slowly (exothermic!!). The obtained orange slurry was filtered through a pad of Celite, and washed several times with water (3×20 mL) and EtOAc (3×20 mL). The layers of the filtrate were separated and the organic phase was washed with brine (20 mL), dried (sodium sulfate), filtered and concentrated in vacuo. The crude product was adsorbed on isolute HM-N and purified by column chromatography (70 g, silica gel, methanol/dichloromethane, gradient 0:100 to 10:90) to give the title compound as a light brown solid (1.27 g, 4.85 mmol, 53% yield). HPLC (method LCMS_fastgradient) $t_R$=0.66 min. MS (ES+) m/z 261.3 [M+H].

Step 3: 2-(2-Chloro-3-fluoro-4-pyridyl)-1-[5-methyl-1-(6-methyl-3-pyridyl)imidazol-4-yl]ethanone (Int-25)

Diisopropylamine (816 mg, 1.14 ml, 8.07 mmol) was dissolved in THF (5 mL) in a dry Schlenk tube under Ar. The solution is cooled to 0° C. A solution of n-butyllithium (1.6 M in hexanes) (4.92 mL, 7.88 mmol) was added dropwise and the mixture was stirred at 0° C. for 15 min. The reaction mixture was cooled to −78° C., followed by the dropwise addition of a solution of 2-chloro-3-fluoro-4-methylpyridine (Int-24) (1.2 g, 8.26 mmol) in THF (2 mL). The mixture was stirred at −78° C. for 15 min (the mixture became an orange suspension). A solution of N-methoxy-N,5-dimethyl-1-(6-methylpyridin-3-yl)-1H-imidazole-4-carboxamide (Int-23) (500 mg, 1.92 mmol) in THF (3 mL) was added dropwise and the mixture was stirred at −78° C. for 1 h. The reaction was quenched by addition of a saturated aqueous solution of ammonium chloride (10 mL) and allowed to reach room temperature. The reaction mixture was diluted with ethyl acetate (50 mL) and water (20 mL). The organic layer was washed with a saturated aqueous solution of ammonium chloride (20 mL) and brine (20 mL), dried (sodium sulfate), filtered and concentrated. The crude product was adsorbed on isolute HM-N and purified by column chromatography (20 g, silica gel, methanol/dichloromethane, gradient 0:100 to 10:90) to give the title compound as a white powder (612 mg, 1.78 mmol, 92% yield). HPLC (method LCMS_fastgradient) $t_R$=1.01 min. MS (ES+) m/z 345.3, 347.3 [M+H, Cl isotopes].

Step 4: (E)-3-Chloro-2-(2-chloro-3-fluoro-4-pyridyl)-3-[5-methyl-1-(6-methyl-3-pyridyl)imidazol-4-yl]prop-2-enal (Int-26)

N-(Chloromethylene)-N-methylmethanaminium chloride (500 mg, 3.91 mmol) was suspended in dichloromethane (5 mL) under Ar and the suspension was cooled to 0° C. A solution of 2-(2-chloro-3-fluoropyridin-4-yl)-1-(5-methyl-1-(6-methylpyridin-3-yl)-1H-imidazol-4-yl)ethan-1-one (Int-25) (612 mg, 1.78 mmol) in dichloromethane (5 mL) was added dropwise at 0° C. and the reaction mixture was allowed to reach room temperature. The reaction mixture was stirred at room temperature for 2 h. Then, it was diluted with dichloromethane (50 mL) and quenched by addition of a saturated aqueous solution of sodium hydrogenocarbonate (30 mL). The aqueous layer was extracted with dichloromethane (2×20 mL) and the combined organic layers were washed with water (2×20 mL) and brine (20 mL), dried (sodium sulfate) and concentrated in vacuo to give the title compound as a yellow solid (543 mg, 1.39 mmol, 78% yield). HPLC (method LCMS_fastgradient) $t_R$=1.10 min. MS (ES+) m/z 391.2, 393.2 [M+H, Cl isotopes].

Step 5: 2-Chloro-3-fluoro-4-[2-[5-methyl-1-(6-methyl-3-pyridyl)imidazol-4-yl]ethynyl]pyridine (Int-27)

A solution of (E)-3-chloro-2-(2-chloro-3-fluoro-4-pyridyl)-3-[5-methyl-1-(6-methyl-3-pyridyl)imidazol-4-yl]prop-2-enal (Int-26) (650 mg, 1.66 mmol) in THF (25 mL) and water (0.04 mL) was cooled to −25° C. (acetone/dry ice) and potassium tert-butoxide (410 mg, 3.66 mmol) was added in 5 portions (one every 2 minutes). The mixture was stirred at −25° C. for 1 h. A solution of saturated aqueous solution of ammonium chloride (25 mL) and dichloromethane (40 mL) were added at −25° C. and the mixture was allowed to reach room temperature. The aqueous layer was extracted with dichloromethane (2×20 mL). The combined organic phases were dried (sodium sulfate), filtered and concentrated in vacuo. The crude product was adsorbed on isolute HM-N and purified by column chromatography (20 g, silica gel, methanol/dichloromethane, gradient 0:100 to 5:95) to afford the title compound as an off-white solid (340 mg, 1.04 mmol, 63% yield). HPLC (method LCMS_fastgradient) $t_R$=1.10 min. MS (ES+) m/z 327.3, 329.2 [M+H, Cl isotopes].

Step 6: Methyl 4-[2-(2-chloro-3-fluoro-4-pyridyl)ethynyl]-5-methyl-1-(6-methyl-3-pyridyl)imidazole-2-carboxylate (Int-28)

A solution of 2-chloro-3-fluoro-4-((5-methyl-1-(6-methylpyridin-3-yl)-1H-imidazol-4-yl)ethynyl)pyridine (Int-27) (160 mg, 490 µmol) in THF (5 mL) under Ar was cooled to −78° C.

A solution of n-butyllithium (1.6 M in hexane) (367 µl, 588 µmol) was added dropwise over 5 min and the mixture was stirred at −78° C. for 30 min. Methylchloroformate (46.3 mg, 490 µmol) was added in one portion and the mixture was stirred at −78° C. for 1 h, then allowed to reach room temperature and stirred for 1 h. The mixture was cooled again to −78° C. and saturated aqeuous solution of ammonium chloride (10 mL) was added. The mixture was allowed to reach room temperature, extracted with ethyl acetate (50 mL) and water (20 mL). The aqueous layer was extracted with ethyl acetate (2×20 mL). The combined organic layers were washed with brine (20 mL), dried (sodium sulfate), filtered and concentrated in vacuo. The crude product was adsorbed on isolute HM-N and purified by column chromatography (12 g, silica gel, methanol/dichloromethane, gradient 0:100 to 5:95) to yield the title compound as alight brown solid (102 mg, 265 µmol, 54% yield). HPLC (method LCMS_fastgradient) $t_R$=1.17 min. MS (ES+) m/z 385.2, 387.1 [M+H, Cl isotopes].

In analogy to the synthesis of Int-28, the following intermediates can be synthesized using procedures outlined in General Procedure B, and replacing reagents Int-2 and Int-24 by reagents listed in the following table:

| Intermediate | Structure, Name | Int-2 replacement | Int-24 replacement | MS (ES+) m/z |
|---|---|---|---|---|
| Int-29 | 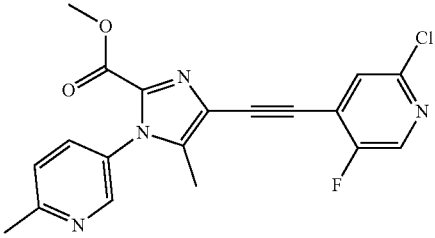 [SMILES: COC(=O)c1nc(C#Cc2cc(Cl)ncc2F)c(C)n1-c1ccc(C)nc1]<br>methyl 4-[2-(2-chloro-5-fluoro-4-pyridyl)ethynyl]-5-methyl-1-(6-methyl-3-pyridyl)imidazole-2-carboxylate | — | 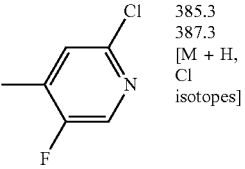<br>2-chloro-5-fluoro-4-methyl-pyridine (Int-37) | 385.3 387.3 [M + H, Cl isotopes] |
| Int-30 | 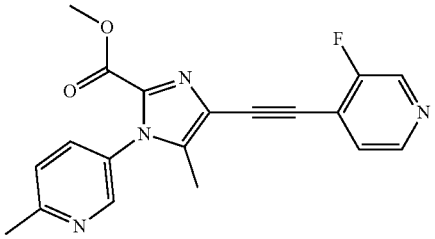 [SMILES: COC(=O)c1nc(C#Cc2ccncc2F)c(C)n1-c1ccc(C)nc1]<br>methyl 4-[2-(3-fluoro-4-pyridyl)ethynyl]-5-methyl-1-(6-methyl-3-pyridyl)imidazole-2-carboxylate | — | 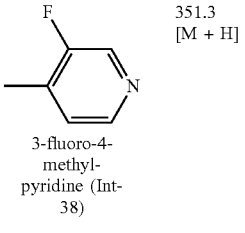<br>3-fluoro-4-methyl-pyridine (Int-38) | 351.3 [M + H] |
| Int-31 | 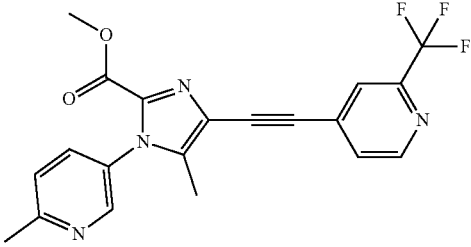 [SMILES: COC(=O)c1nc(C#Cc2ccnc(C(F)(F)F)c2)c(C)n1-c1ccc(C)nc1]<br>methyl 5-methyl-1-(6-methyl-3-pyridyl)-4-[2-[2-(trifluoromethyl)-4-pyridyl]ethynyl]imidazole-2-carboxylate | — | 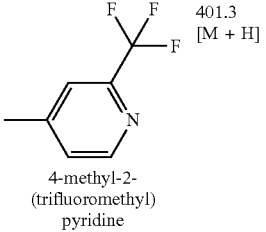<br>4-methyl-2-(trifluoromethyl) pyridine (Int-39) | 401.3 [M + H] |
| Int-32 | 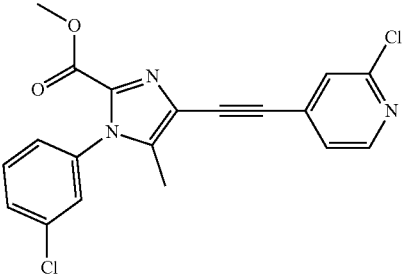 [SMILES: COC(=O)c1nc(C#Cc2ccnc(Cl)c2)c(C)n1-c1cccc(Cl)c1]<br>methyl 1-(3-chlorophenyl)-4-[2-(2-chloro-4-pyridyl)ethynyl]-5-methyl-imidazole-2-carboxylate | 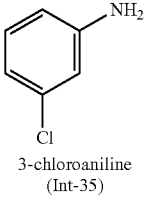<br>3-chloroaniline (Int-35) | 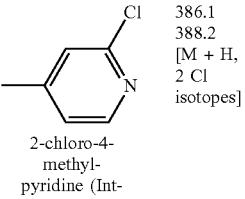<br>2-chloro-4-methyl-pyridine (Int-40) | 386.1 388.2 [M + H, 2 Cl isotopes] |

-continued

| Intermediate | Structure, Name | Int-2 replacement | Int-24 replacement | MS (ES+) m/z |
|---|---|---|---|---|
| Int-33 | 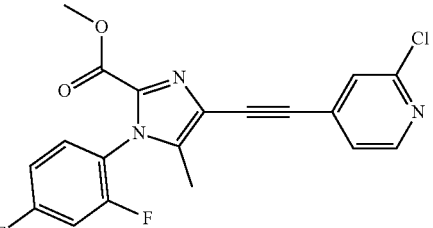<br>methyl 4-[2-(2-chloro-4-pyridyl)ethynyl]-1-(2,4-difluorophenyl)-5-methyl-imidazole-2-carboxylate | 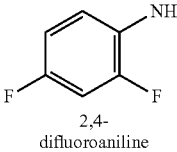<br>2,4-difluoroaniline (Int-36) | 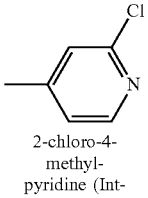<br>2-chloro-4-methyl-pyridine (Int-41) | 388.2 390.2 [M + H, Cl isotopes] |
| Int-34 | 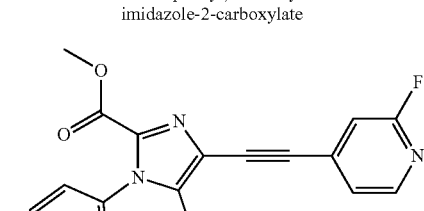<br>methyl 4-[2-(2-fluoro-4-pyridyl)ethynyl]-5-methyl-1-(6-methyl-3-pyridyl)imidazole-2-carboxylate | — | 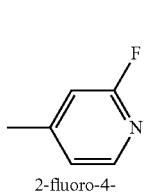<br>2-fluoro-4-methyl-pyridine (Int-42) | 351.2 [M + H] |

Intermediate 49

Methyl 4-[2-(2-chloro-4-pyridyl)ethynyl]-1-(4-fluorophenyl)imidazole-2-carboxylate

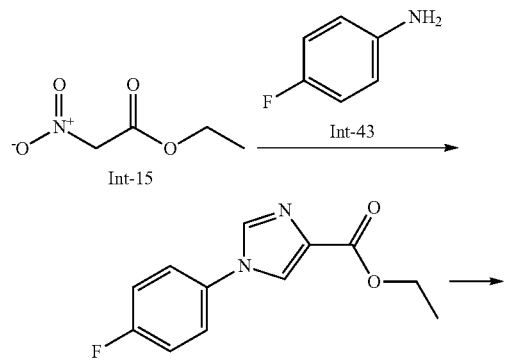

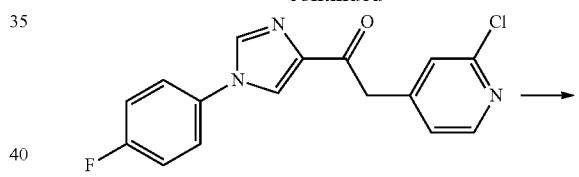

Int-46

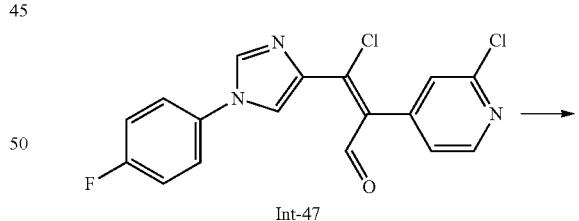

Int-47

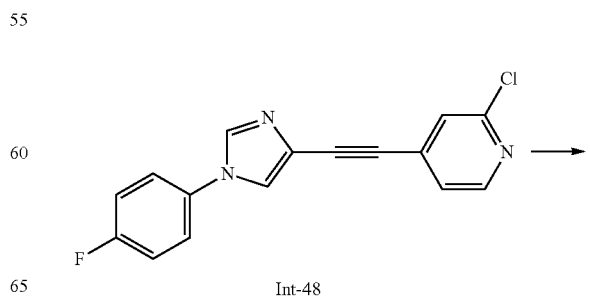

Int-48

45

-continued

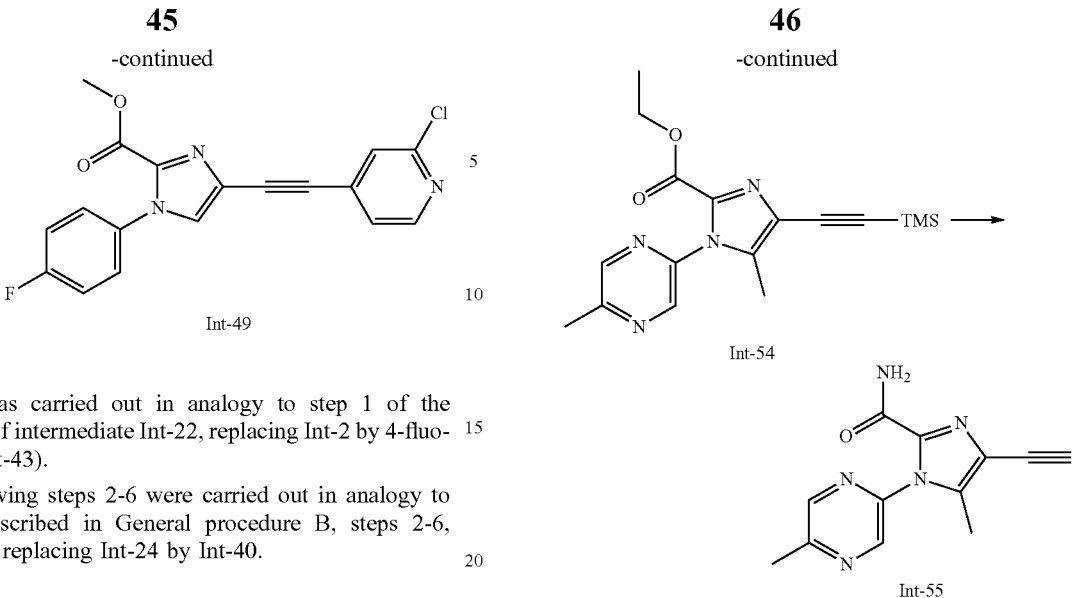

Int-49

Step 1 was carried out in analogy to step 1 of the preparation of intermediate Int-22, replacing Int-2 by 4-fluoroaniline (Int-43).

The following steps 2-6 were carried out in analogy to protocols described in General procedure B, steps 2-6, respectively, replacing Int-24 by Int-40.

Step 6: Methyl 4-[2-(2-chloro-4-pyridyl)ethynyl]-1-(4-fluorophenyl)imidazole-2-carboxylate (Int-49)

MS (ES+) m/z 356.2, 358.2 [M+H, Cl isotopes].

Intermediate 55

4-Ethynyl-5-methyl-1-(5-methylpyrazin-2-yl)-1H-imidazole-2-carboxamide

General Procedure C

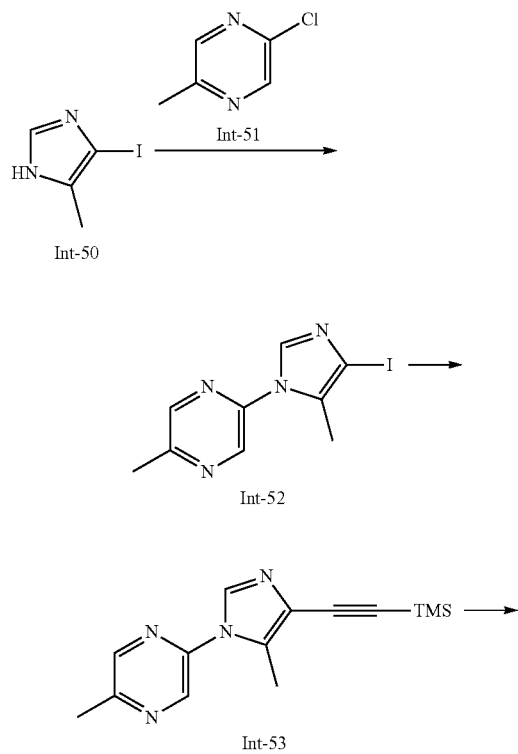

46

-continued

Int-54

Int-55

Step 1: 2-(4-Iodo-5-methyl-1H-imidazol-1-yl)-5-methylpyrazine (Int-52)

To a solution of 2-chloro-5-methyl pyrazine (Int-51) (980 mg, 7.62 mmol, 1 eq) in DMF (15 mL) was added 4-iodo-5-methyl-1H-imidazole (Int-50) (1.90 g, 9.15 mmol, 1.2 eq) and cesium carbonate (4.97 g, 15.25 mmol, 2 eq). The mixture was stirred at 100° C. for 14 h. Then, the reaction was stopped by addition of water (50 mL) and extracted with dichloromethane/methanol (10:1 (v/v), 3×50 mL). The combined organic layers were concentrated in vacuo, and the crude product was purified by preparative HPLC (Shimpack C18, 150×25 mm×10 μm, eluting with acetonitrile/(water+0.225% formic acid), linear, optimized for substrate between 70:30 to 10:90 v/v), followed by lyophilization to yield the title compound as a white solid (830 mg, 2.77 mmol, 36% yield). MS (ES+) m/z 301.0 [M+H].

Step 2: 2-Methyl-5-(5-methyl-4-((trimethylsilyl)ethynyl)-1H-imidazol-1-yl)pyrazine (Int-53)

To a solution of 2-(4-iodo-5-methyl-imidazol-1-yl)-5-methyl-pyrazine (Int-52) (780 mg, 2.6 mmol) in DMF (4 mL) was added triethylamine (1.09 mL, 7.8 mmol), 1,1'-bis(diphenylphosphino)ferrocenepalladium(II)dichloride dichloromethane complex (106 mg, 0.13 mmol) and copper(I) iodide (14.8 mg, 78 μmol). The mixture was stirred at 70° C. for 1 h. Then, trimethylsilylacetylene (766 mg, 7.8 mmol) was added. The mixture was stirred at 70° C. for another 2 h. Then, it was concentrated in vacuo and purified by column chromatography (80 g, silica gel, n-heptane/(ethyl acetate+30% ethanol), gradient 95:5 to 50:50 (v/v)) to afford the title compound as a yellow solid (700 mg, 2.59 mmol, 99% yield). MS (ES+) m/z 271.1 [M+H].

Step 3: Ethyl 5-methyl-1-(5-methylpyrazin-2-yl)-4-((trimethylsilyl)ethynyl)-1H-imidazole-2-carboxylate (Int-54)

2-Methyl-5-(5-methyl-4-((trimethylsilyl)ethynyl)-1H-imidazol-1-yl)pyrazine (Int-53) (400 mg, 1.48 mmol) was dissolved in THF (10 mL) and the solution was cooled to −78° C. A solution of lithium diisopropylamide (2M in THF, 1.1 mL, 2.2 mmol) was added and the resulting brown solution was stirred for 30 min at −78° C. Then, ethyl chloroformate (0.79 mL, 8.9 mmol) was added and the mixture was stirred at −78° C. for 1 h. The mixture was concentrated in vacuo and purified by column chromatography (40 g, silica gel, n-heptane/ethyl acetate, gradient 90:10 to 75:25 (v/v)) to yield the title compound as a yellow oil (290 mg, 0.850 mmol, 57% yield). MS (ES+) m/z 343.1 [M+H].

Step 4: 4-Ethynyl-5-methyl-1-(5-methylpyrazin-2-yl)-1H-imidazole-2-carboxamide (Int-55)

Methyl 5-methyl-1-(5-methylpyrazin-2-yl)-4-(2-trimethylsilylethynyl) imidazole-2-carboxylate (Int-54) (280 mg, 0.850 mmol) was dissolved in methanol (2 mL) in a pressure tube and conc. ammonium hydroxide solution (5.0 mL, 25-28% in water) was added. The resulting mixture was stirred at 50° C. for 14 h. After cooling, the mixture was concentrated in vacuo to give the title compound as yellow solid (165 mg, 0.68 mmol, 80% yield). MS (ES+) m/z 242.1 [M+H].

In analogy to the synthesis of Int-55, the following intermediate can be synthesized using procedures outlined in General Procedure C, and replacing reagent Int-51 by reagents listed in the following table:

| Intermediate | Structure | Name | Int-51 replacement | MS (ES+) m/z |
|---|---|---|---|---|
| Int-56 | (structure shown) | 4-Ethynyl-5-methyl-1-(6-methylpyridazin-3-yl)-1H-imidazole-2-carboxamide | 3-chloro-6-methylpyridazine (Int-57) | 242.1 [M + H] |

Intermediate 62

4-Ethynyl-5-methyl-1-(5-methylpyridin-3-yl)-1H-imidazole-2-carboxamide

General Procedure D

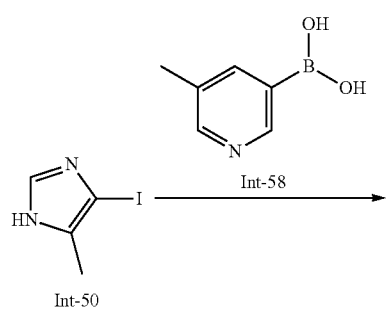

Int-50

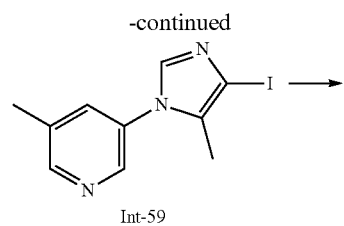

Int-59

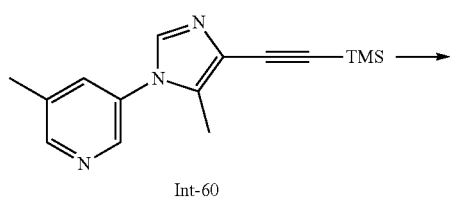

Int-60

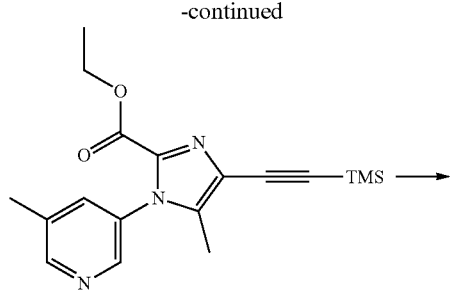

Int-61

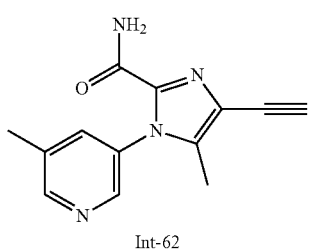

Int-62

Step 1: 3-(4-Iodo-5-methyl-1H-imidazol-1-yl)-5-methylpyridine (Int-59)

5-Methylpyridine-3-boronic acid (Int-58) (1.50 g, 11.0 mmol) was dissolved in DMF (30 mL), 4-iodo-5-methyl-1H-imidazole (Int-50) (2.73 g, 13.1 mmol) and di-μ-hydroxo-bis(N,N,N',N'-tetramethylethylenediamine)copper (II)] chloride (1.017 g, 2.19 mmol) were added and the mixture was stirred at 50° C. for 16 h under an oxygen atmosphere. Then, the reaction mixture was filtered and the filtrate was concentrated. The residue was purified by preparative HPLC (Shim-pack C18, 150×25 mm×10 μm, eluting with acetonitrile/(water+0.225% formic acid), linear, optimized for substrate between 70:30 to 10:90 v/v), followed by lyophilization to obtain the title compound as a white solid (800 mg, 2.67 mmol, 2400 yield). $^1$H NMR (CDCl$_3$, 400 MHz): δ 2.19 (s, 3H), 2.47 (s, 3H), 7.44 (s, 1H), 7.58 (s, 1H), 8.47 (br s, 1H), 8.61 (br s, 1H). MS (ES+) m/z 300.1 [M+H].

Step 2 to step 4 were carried out in analogy to General Procedure C, step 2 to step 4, respectively.

In analogy to the synthesis of Int-62, the following intermediates can be synthesized using procedures outlined in General Procedure D, and replacing reagent Int-58 by reagents listed in the following table:

Intermediate 77

4-Ethynyl-5-methyl-1-(5-methylpyridin-2-yl)-1H-imidazole-2-carboxamide

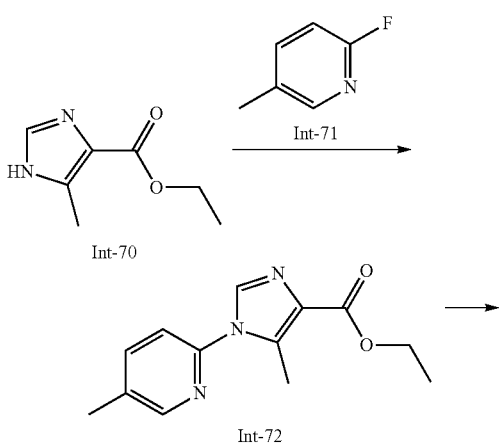

| Intermediate | Structure | Name | Int-58 replacement | MS (ES+) m/z |
|---|---|---|---|---|
| Int-62 | | 4-Ethynyl-5-methyl-1-(5-methylpyridin-3-yl)-1H-imidazole-2-carboxamide | — | 241.1 [M + H] |
| Int-64 | | 1-(6-Chloropyridin-3-yl)-4-ethynyl-5-methyl-1H-imidazole-2-carboxamide | 2-chloropyridine-5-boronic acid (Int-67) | 261.1 263.1 [M + H, Cl isotopes] |
| Int-65 | | 4-Ethynyl-1-(6-methoxypyridin-3-yl)-5-methyl-1H-imidazole-2-carboxamide | 2-methoxy-5-pyridineboronic acid (Int-68) | 257.0 [M + H] |
| Int-66 | | 4-Ethynyl-5-methyl-1-(pyridin-3-yl)-1H-imidazole-2-carboxamide | pyridine-3-boronic acid (Int-69) | 226.8 [M + H] |

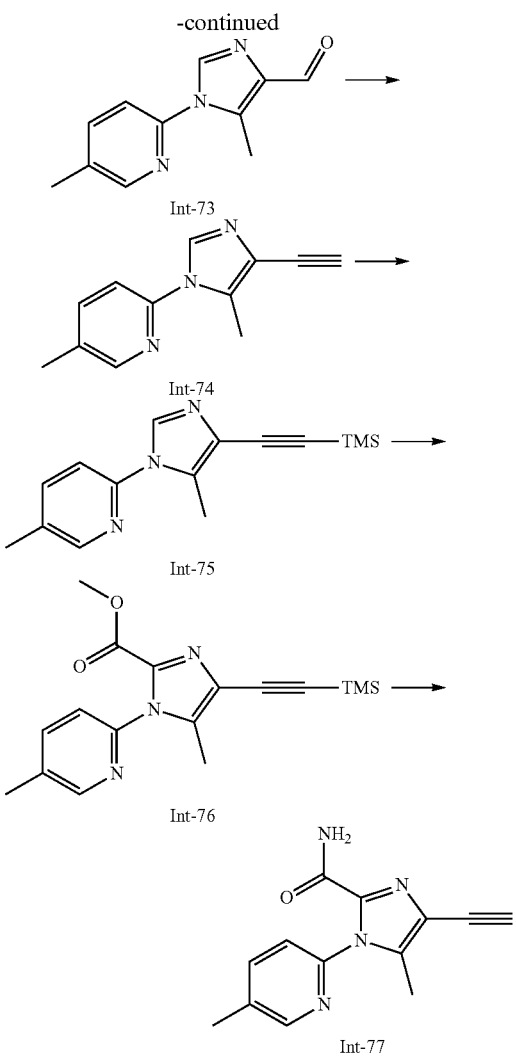

1-(5-methyl-2-pyridyl) imidazol-4-yl] methanol (350 mg, 1.72 mmol, 84% yield) as yellow oil. This material was dissolved in THF (15 mL), manganese(IV) oxide (449 mg, 5.17 mmol) was added and the mixture was stirred at 30° C. for 10 h. Then, the mixture was filtered and concentrated in vacuo to obtain crude title compound as yellow oil (240 mg, 1.19 mmol, 69% yield). The crude product was used in the next step without further purification. MS (ES+) m/z 202.1 [M+H].

Step 3: 2-(4-Ethynyl-5-methyl-1H-imidazol-1-yl)-5-methylpyridine (Int-74)

5-Methyl-1-(5-methyl-2-pyridyl)imidazole-4-carbaldehyde (Int-73) (240 mg, 1.19 mmol) was dissolved in methanol (8 mL), 1-diazo-1-dimethoxyphosphoryl-propan-2-one (275 mg, 1.43 mmol) and potassium carbonate (198 mg, 1.43 mmol) were added and the mixture was stirred at 25° C. for 24 h. Then, the mixture was poured into water (20 mL) and extracted with ethyl acetate (2×30 mL). The combined organic phases were dried (sodium sulfate) and concentrated in vacuo to give the crude title compound as yellow oil (170 mg, 0.860 mmol, 72% yield), which was used in the next step without further purification. MS (ES+) m/z 198.1 [M+H].

Step 4: 5-Methyl-2-(5-methyl-4-((trimethylsilyl)ethynyl)-1H-imidazol-1-yl)pyridine (Int-75)

2-(4-Ethynyl-5-methyl-imidazol-1-yl)-5-methyl-pyridine (Int-74) (150 mg, 0.76 mmol) was dissolved in THF (3 mL), the solution was cooled to −78° C. and lithium hexamethyldisilazide (LiHDMS) (1M in THF, 1.14 mL, 1.14 mmol) was added at −78° C. The mixture was stirred for 1 h at this temperature. Then, trimethylchlorosilane (91 mg, 0.84 mmol) was added. The mixture was allowed to warm to 25° C. and stirred for 3 h. The reaction was cooled to −78° C., stopped by addition of water (20 mL). After warming to room temperature, it was extracted with ethyl acetate (2×20 mL), the combined organic layers washed with brine (20 mL) and concentrated in vacuo to afford crude title compound as a yellow oil (150 mg, 0.56 mmol, 68% yield), which was used in the next step without further purification. MS (ES+) m/z 270.1 [M+H].

Step 5: Methyl 5-methyl-1-(5-methylpyridin-2-yl)-4-((trimethylsilyl)ethynyl)-1H-imidazole-2-carboxylate (Int-76)

5-Methyl-2-(5-methyl-4-((trimethylsilyl)ethynyl)-1H-imidazol-1-yl)pyridine (Int-75) (150 mg, 0.56 mmol) was dissolved in THF (3 mL), the solution was cooled to −78° C., and lithium diisopropylamide (2M in THF, 0.42 mL, 0.84 mmol) was added at −78° C. The resulting brown solution was stirred for 30 min. Then, ethyl chloroformate (0.15 mL, 1.67 mmol) was added and the mixture was stirred at −78° C. for 1.5 h. After warming to room temperature, the reaction was stopped by addition of sodium sulfate decahydrate (10 g), the resulting slurry stirred for 30 min, filtered, and the filtrate was concentrated in vacuo. The crude product was purified by column chromatography (12 g, silica gel, petroleum ether/ethyl acetate, gradient, 91:9 to 75:25 (v/v)) to yield the title compound as a yellow solid (70 mg, 0.200 mmol, 37% yield). MS (ES+) m/z 342.1 [M+H].

Step 6: 4-Ethynyl-5-methyl-1-(5-methylpyridin-2-yl)-1H-imidazole-2-carboxamide (Int-77)

Methyl 5-methyl-1-(5-methylpyridin-2-yl)-4-((trimethylsilyl)ethynyl)-1H-imidazole-2-carboxylate (Int-76) (60 mg, Step 1: Ethyl 5-methyl-1-(5-methylpyridin-2-yl)-1H-imidazole-4-carboxylate (Int-72)

2-Fluoro-5-methylpyridine (Int-71) (1.9 g, 17.1 mmol) was dissolved in DMA (38 mL) and ethyl 4-methyl-1H-imidazole-5-carboxylate (Int-70) (2.64 g, 17.1 mmol), followed by cesium carbonate (11.14 g, 34.2 mmol) were added. The mixture was stirred for 12 h at 120° C. After cooling, the mixture was filtered and concentrated in vacuo. The residue was purified by column chromatography (40 g, silica gel, petroleum ether/ethyl acetate, isocratic 50:50 (v/v)) to afford the title compound as a yellow solid (1.3 g, 5.3 mmol, 31% yield). MS (ES+) m/z 246.1 [M+H].

Step 2: 5-Methyl-1-(5-methylpyridin-2-yl)-1H-imidazole-4-carbaldehyde (Int-73)

Ethyl 5-methyl-1-(5-methyl-2-pyridyl) imidazole-4-carboxylate (Int-72) (500 mg, 2.0 mmol) was dissolved in THF (12.5 mL), diisobutylaluminum hydride (1M in toluene, 6.12 mL, 6.12 mmol) was added at 25° C. and the mixture was stirred at 25° C. for 4 h. After that, sodium sulfate decahydrate (3 g) was added, and the resulting slurry stirred for 0.5 h. It was filtered, washed with THF (10 mL), and the filtrate was concentrated in vacuo to give crude [5-methyl- 0.18 mmol) was dissolved in methanol (1 mL) in a pressure tube and concentrated aqueous ammonia (1.0 mL) was added. The mixture was stirred in the closed pressure tube at 50° C. for 4 h. After cooling, the mixture was concentrated in vacuo the yield the title compound as brown solid (50 mg, 0.21 mmol, 89% yield), which was used in the next step without further purification. MS (ES+) m/z 241.1 [M+H].

Intermediate 85

2-((2-Chloropyridin-4-yl)ethynyl)-1-methyl-5-(6-methylpyridin-3-yl)-1H-imidazole-4-carbonitrile General Procedure E

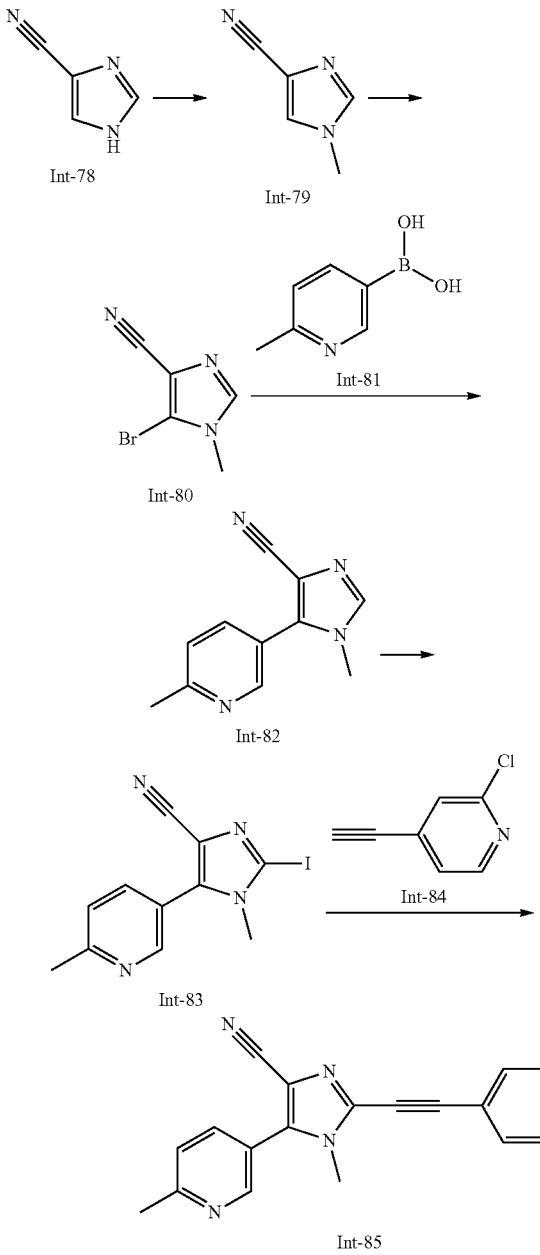

Step 1: 1-Methylimidazole-4-carbonitrile (Int-79)

1H-Imidazole-4-carbonitrile (Int-78) (4.000 g, 43 mmol) was dissolved in DMF (80 mL), the solution was cooled to 0° C., and sodium hydride (60% dispersion in mineral oil, 1.89 g, 47.3 mmol) was added at 0° C. The mixture was stirred at 25° C. for 1 h. Then, iodomethane (9.30 g, 65.5 mmol) was added. The mixture was stirred at 25° C. for 2 h. After that, water (100 mL) was added, the mixture was extracted with dichloromethane/methanol (10:1 (v/v), 3×100 mL), the combined organic layers were concentrated in vacuo. The crude product was purified by column chromatography (240 g, silica gel, petroleum ether/ethyl acetate, gradient, 91:9 to 33:66 (v/v)) to give the title compound as a white solid (3.95 g, 36.9 mmol, 86% yield).

Step 2: 5-Bromo-1-methyl-imidazole-4-carbonitrile (Int-80)

A solution of 1-methylimidazole-4-carbonitrile (Int-79) (4.000 g, 37.3 mmol) and N-bromosuccinimide (7.976 g, 44.8 mmol) in DMF (15 mL) was stirred at 25° C. for 14 h. Then, water (80 mL) was added and the mixture was stirred at 25° C. for 1 h. A precipitate was formed, which was filtered off and dried in vacuo to afford the title compound as a white solid (6.00 g, 32.3 mmol, 86% yield). MS (ES+) m/z 186.0, 188.0 [M+H, Br isotopes].

Step 3: 1-Methyl-5-(6-methyl-3-pyridyl)imidazole-4-carbonitrile (Int-82)

5-Bromo-1-methyl-imidazole-4-carbonitrile (Int-80) (3.000 g, 16.1 mmol) was dissolved in 1,4-dioxane (45 mL), 6-methylpyridine-3-boronic acid (Int-81) (2.21 g, 16.1 mmol), 1,1'-bis(diphenylphosphino)ferrocene-palladium(II) dichloride dichloromethane complex (1.316 g, 1.61 mmol), and cesium carbonate (10.51 g, 32.3 mmol) were added under argon and the mixture was stirred at 110° C. for 14 h. After cooling, the mixture was filtered, the filtrate was concentrated in vacuo. The crude product was purified by column chromatography (240 g, silica gel, petroleum ether/ethyl acetate, gradient, 85:15 to 0:100 (v/v)) to obtain the title compound as a grey solid (3.00 g, 15.1 mmol, 70% yield). MS (ES+) m/z 199.1 [M+H].

Step 4: 2-Iodo-1-methyl-5-(6-methyl-3-pyridyl)imidazole-4-carbonitrile (Int-83)

1-Methyl-5-(6-methyl-3-pyridyl)imidazole-4-carbonitrile (Int-82) (3.00 g, 15.1 mmol) was dissolved in THF (35 mL), the solution was cooled to −78° C., and lithium diisopropyl amide (2 M in THF, 11.35 mL, 22.7 mmol) was added. The mixture was stirred at −78° C. for 0.5 h. Then, a solution of iodine (7.68 g, 30.3 mmol) in THF (15 mL) was added. The resulting mixture was stirred at −78° C. for 1.5 h. After that, the reaction was stopped by addition of an aqueous solution of sodium sulfite (2 M, 100 mL) and extracted with ethyl acetate (3×100 mL). The combined organic layers were concentrated in vacuo and the crude product was purified by column chromatography (40 g, silica gel, petroleum ether/ (ethyl acetate+30% ethanol), gradient, 91:9 to 33:66 (v/v)) to yield the title compound as a light yellow solid (350 mg, 1.08 mmol, 7% yield). MS (ES+) m/z 325.0 [M+H].

Step 5: 2-[2-(2-Chloro-4-pyridyl)ethynyl]-1-methyl-5-(6-methyl-3-pyridyl)imidazole-4-carbonitrile (Int-85)

2-Iodo-1-methyl-5-(6-methyl-3-pyridyl)imidazole-4-carbonitrile (Int-83) (350 mg, 1.08 mmol) was dissolved in DMF (5 mL), 1,1'-bis(diphenylphosphino)ferrocene-palladium(II)dichloride dichloromethane complex (44 mg, 0.05 mmol), copper(I) iodide (6.2 mg, 0.03 mmol) and triethylamine (0.45 mL, 3.24 mmol) were added under argon. The mixture was stirred at 70° C. for 1 h. Then, 2-chloro-4-ethynyl-pyridine (Int-84) (297 mg, 2.2 mmol) was added. The mixture was stirred at 70° C. for another 2 h. After cooling, the mixture was filtered and the filtrate was concentrated in vacuo. The crude product was purified by column chromatography (24 g, silica gel, petroleum ether/(ethyl acetate+300 ethanol), gradient, 91:9 to 50:50 (v/v)) to obtain the title compound as a light yellow solid (210 mg, 0.63 mmol, 58% yield). MS (ES+) m/z 334.0, 336.1 [M+H, Cl isotopes].

In analogy to the synthesis of Int-85, the following intermediates can be synthesized using procedures outlined in General Procedure E, and replacing reagents Int-81 and Int-84 by reagents listed in the following table:

| Intermediate | Structure, Name | Int-81 replacement | Int-84 replacement | MS (ES+) m/z |
|---|---|---|---|---|
| Int-86 | 2-[2-(2-chloro-3-methyl-4-pyridyl)ethynyl]-1-methyl-5-(6-methyl-3-pyridyl)imidazole-4-carbonitrile | — | 2-chloro-4-ethynyl-3-methyl-pyridine (Int-92) | 347.8 349.8 [M + H, Cl isotopes] |
| Int-87 | 2-[2-(3-chlorophenyl)ethynyl]-1-methyl-5-(6-methyl-3-pyridyl)imidazole-4-carbonitrile | — | 1-chloro-3-ethynyl-benzene (Int-93) | 332.8 334.8 [M + H, Cl isotopes] |
| Int-88 | 2-[2-(3-chloro-2-methyl-phenyl)ethynyl]-1-methyl-5-(3 pyridyl)imidazole-4-carbonitrile | pyridine-3-boronic acid (Int-91) | 1-chloro-3-ethynyl-2-methyl-benzene (Int-94) | 332.8 334.8 [M + H, Cl isotopes] |
| Int-89 | 2-[2-(2-chloro-3-methyl-4-pyridyl)ethynyl]-1-methyl-5-(3-pyridyl)imidazole-4-carbonitrile | pyridine-3-boronic acid (Int-91) | 2-chloro-4-ethynyl-3-methyl-pyridine (Int-92) | 333.8 335.8 [M + H, Cl isotopes] |

| Intermediate | Structure, Name | Int-81 replacement | Int-84 replacement | MS (ES+) m/z |
|---|---|---|---|---|
| Int-90 | 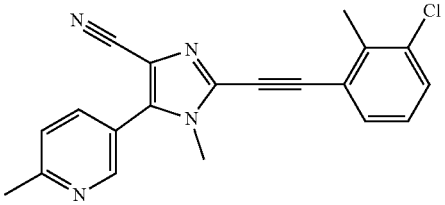 [SMILES: Cc1ccc(-c2c(C#N)nc(C#Cc3cccc(Cl)c3C)n2C)cn1]<br>2-[2-(3-chloro-2-methyl-phenyl)ethynyl]-1-methyl-5-(6-methyl-3-pyridyl)imidazole-4-carbonitrile | — | 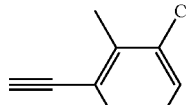<br>1-chloro-3-ethynyl-2-methyl-benzene (Int-94) | 346.8 348.8 [M + H, Cl isotopes] |

Intermediate 100

4-[2-(2-Chloro-4-pyridyl)ethynyl]-5-methyl-1-(6-methyl-3-pyridyl)pyrrole-2-carboxylic acid

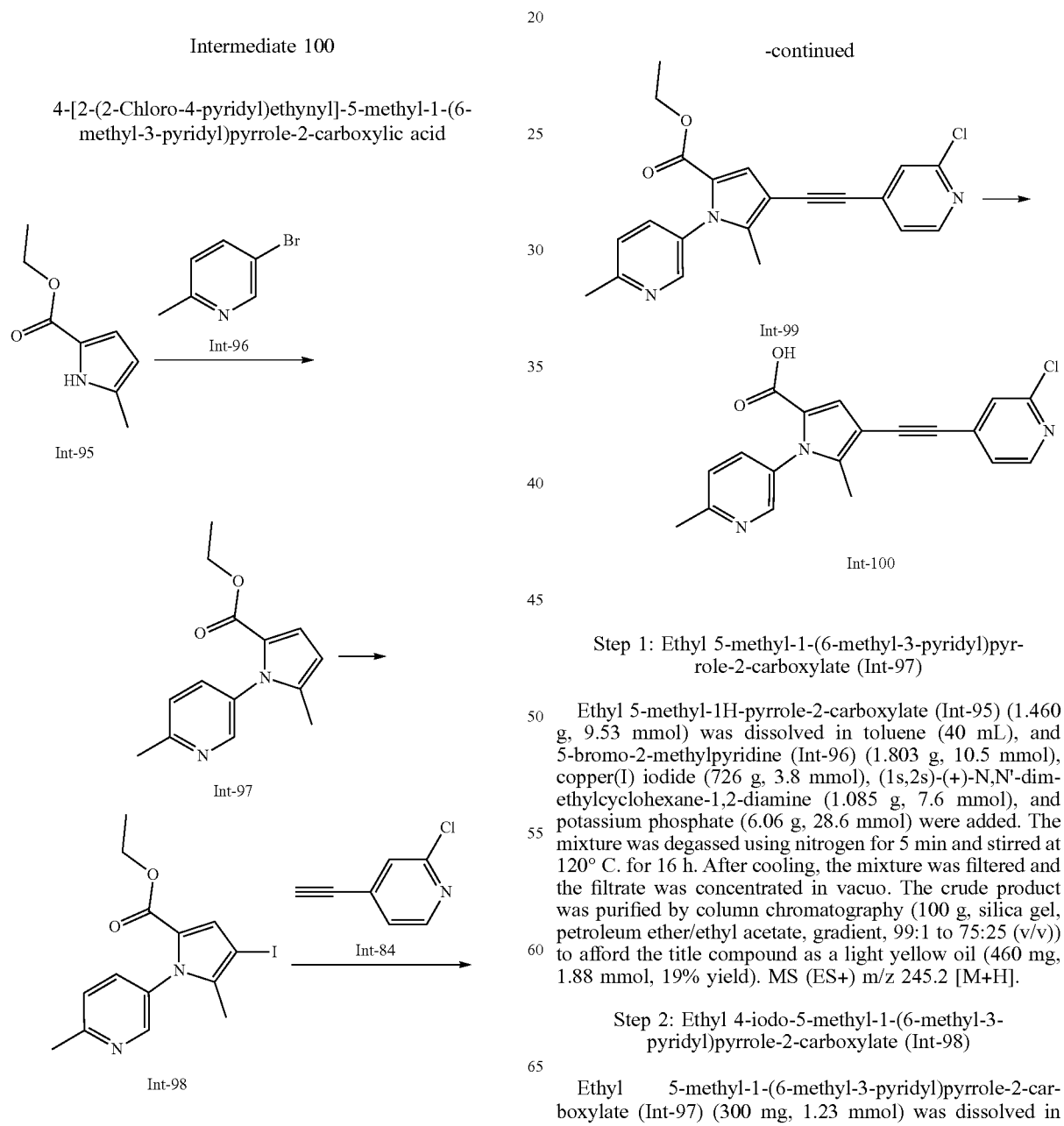

Step 1: Ethyl 5-methyl-1-(6-methyl-3-pyridyl)pyrrole-2-carboxylate (Int-97)

Ethyl 5-methyl-1H-pyrrole-2-carboxylate (Int-95) (1.460 g, 9.53 mmol) was dissolved in toluene (40 mL), and 5-bromo-2-methylpyridine (Int-96) (1.803 g, 10.5 mmol), copper(I) iodide (726 g, 3.8 mmol), (1s,2s)-(+)-N,N'-dimethylcyclohexane-1,2-diamine (1.085 g, 7.6 mmol), and potassium phosphate (6.06 g, 28.6 mmol) were added. The mixture was degassed using nitrogen for 5 min and stirred at 120° C. for 16 h. After cooling, the mixture was filtered and the filtrate was concentrated in vacuo. The crude product was purified by column chromatography (100 g, silica gel, petroleum ether/ethyl acetate, gradient, 99:1 to 75:25 (v/v)) to afford the title compound as a light yellow oil (460 mg, 1.88 mmol, 19% yield). MS (ES+) m/z 245.2 [M+H].

Step 2: Ethyl 4-iodo-5-methyl-1-(6-methyl-3-pyridyl)pyrrole-2-carboxylate (Int-98)

Ethyl 5-methyl-1-(6-methyl-3-pyridyl)pyrrole-2-carboxylate (Int-97) (300 mg, 1.23 mmol) was dissolved in dichloromethane (5 mL), the solution was cooled to -10° C. and N-iodosuccinimide (553 mg, 2.46 mmol) was added in portions. The mixture was stirred at -10° C. for 2 h, followed by 2 h at 25° C. After that, water (15 mL) was added, after phase separation the aqueous phase was extracted with dichloromethane (3×15 mL), the combined organic layers were dried (sodium sulfate), filtered and concentrated in vacuo to give crude title compound (520 mg) as dark brown oil, that was used in the next step without further purification. MS (ES+) m/z 371.0 [M+H].

Step 3: Ethyl 4-[2-(2-chloro-4-pyridyl)ethynyl]-5-methyl-1-(6-methyl-3-pyridyl)pyrrole-2-carboxylate (Int-99)

Ethyl 4-iodo-5-methyl-1-(6-methyl-3-pyridyl)pyrrole-2-carboxylate (Int-98) (300 mg, 0.81 mmol) was dissolved in DMF (5 mL) and 1,1'-bis(diphenylphosphino)ferrocene-palladium(II)dichloride dichloromethane complex (33 mg, 0.04 mmol), copper(I) iodide (4.6 mg, 24 µmol) and triethylamine (0.34 mL, 2.43 mmol) were added. The mixture was degassed and stirred at 80° C. for 1 h. Then, 2-chloro-4-ethynyl-pyridine (Int-84) (167 mg, 1.22 mmol) was added and the mixture stirred at 80° C. for another 2 h. After cooling, the mixture was filtered and the filtrate concentrated in vacuo. The crude product was purified by column chromatography (50 g, silica gel, petroleum ether/ethyl acetate, gradient, 91:9 to 50:50 (v/v)) to yield the title compound as a light yellow oil (157 mg, 0.41 mmol, 51% yield). MS (ES+) m/z 380.2 [M+H].

Step 4: 4-[2-(2-Chloro-4-pyridyl)ethynyl]-5-methyl-1-(6-methyl-3-pyridyl)pyrrole-2-carboxylic acid (Int-100)

Ethyl 4-[2-(2-chloro-4-pyridyl)ethynyl]-5-methyl-1-(6-methyl-3-pyridyl) pyrrole-2-carboxylate (Int-99) (157 mg, 0.41 mmol) was dissolved in THF (2 mL) and lithium hydroxide (2 M in water, 2.0 mL, 4 mmol) was added. The mixture was stirred at 25° C. for 16 h. Then, water (5 mL) was added, the organic solvent was removed under vacuum. The resulting mixture was acidified to pH 5 by addition of 2 N aqueous hydrochloric acid, extracted with ethyl acetate (5×20 mL), the combined organic layers were dried (sodium sulfate), filtered and concentrated in vacuo. The crude product, a yellow solid (85 mg, 0.24 mmol, 59% yield) was used in the next step without further purification. MS (ES+) m/z 352.0 [M+H].

EXAMPLES

Example 1

4-((2-Chloro-3-methylpyridin-4-yl)ethynyl)-5-methyl-1-(6-methylpyridin-3-yl)-1H-imidazole-2-carboxamide

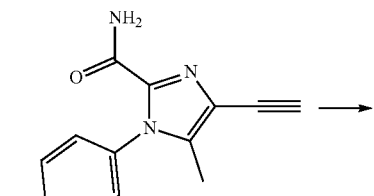

Int-9

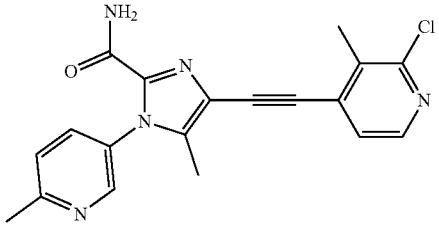

1

4-Ethynyl-5-methyl-1-(6-methylpyridin-3-yl)-1H-imidazole-2-carboxamide (Int-9) (141 mg, 587 µmol) and 2-chloro-4-iodo-3-methylpyridine (164 mg, 646 µmol) were dissolved in DMF (6 mL) and triethylamine (178 mg, 245 µL, 1.76 mmol) as well as bis(triphenylphosphine)palladium (II) dichloride (33 mg, 46.9 µmol) were added under argon at 0° C. The flask was evacuated and purged with argon. Then, copper (I) iodide (4.5 mg, 23.5 µmol) was added resulting in a light brown solution. The resulting mixture was stirred at 0° C. for 3 h, then it was allowed to warm to room temperature within 1 h. The reaction mixture was extracted with water (30 mL) and dichloromethane (30 mL), the aqueous layer was backextracted with dichloromethane (30 mL). The combined organic layers were washed with water (80 mL) and brine (80 mL), dried (sodium sulfate), filtered, and the filtrate concentrated in vacuo. The crude product was adsorbed on isolute HM-N and purified by column chromatography (12 g, silica gel, methanol/dichloromethane, gradient 0:100 to 5:95 (v/v)) followed by crystallisation from dichloromethane/tertbutyl methylether to give the title compound as an off-white solid (89 mg, 243 µmol, 69% yield). HPLC (method LCMS_fastgradient) $t_R$=1.04 min. $^1$H NMR (CDCl$_3$, 300 MHz): δ 2.20 (s, 3H), 2.60 (s, 3H), 2.67 (s, 3H), 5.31 (br s, 1H), 7.11 (br s, 1H), 7.30-7.37 (m, 2H), 7.52 (dd, J=2.6, 8.1 Hz, 1H), 8.21 (d, J=5.0 Hz, 1H), 8.40 (s, 1H). MS (ES+) m/z 366.2, 368.2 [M+H, Cl isotopes].

Example 2

4-((2-Chloro-3-fluoropyridin-4-yl)ethynyl)-5-methyl-1-(6-methylpyridin-3-yl)-1H-imidazole-2-carboxamide

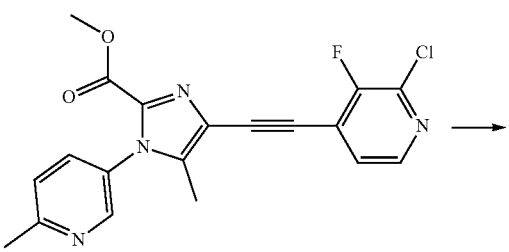

Int-28

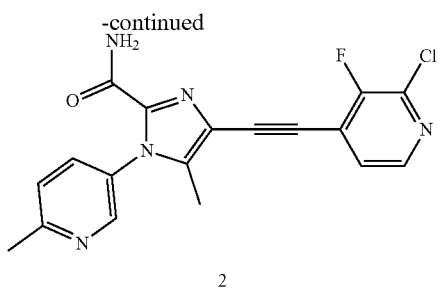

A solution of methyl 4-((2-chloro-3-fluoropyridin-4-yl)ethynyl)-5-methyl-1-(6-methylpyridin-3-yl)-1H-imidazole-2-carboxylate (Int-28) (310 mg, 806 μmol) in ammonia (7 N in MeOH) (11.5 ml, 80.6 mmol) was stirred for 6 h in a pressure tube at 70° C. After that, the reaction mixture was concentrated in vacuo, the residue was adsorbed on isolute HM-N and purified by column chromatography (12 g, silica gel, methanol/dichloromethane, gradient 0:100 to 5:95 (v/v)) followed by trituration in dichloromethane/tertbutyl methylether to give the title compound as a white solid (126 mg, 341 μmol, 42% yield). HPLC (method LCMS_fastgradient) $t_R$=1.06 min. $^1$H NMR (d6-DMSO, 300 MHz): δ 2.14 (s, 3H), 2.56 (s, 3H), 7.42 (d, J=8.1 Hz, 1H), 7.48 (br s, 1H), 7.71 (dd, J=5.0, 5.0 Hz, 1H), 7.76 (dd, J=2.5, 8.2 Hz, 1H), 8.43 (br s, 1H), 8.32 (d, J=5.0 Hz, 1H), 8.44 (d, J=2.2 Hz, 1H). MS (ES+) m/z 370.2, 372.1 [M+H, Cl isotopes].

Example 3

4-[2-(5-Chlorothiophen-3-yl)ethynyl]-5-methyl-1-(6-methylpyridin-3-yl)imidazole-2-carboxamide

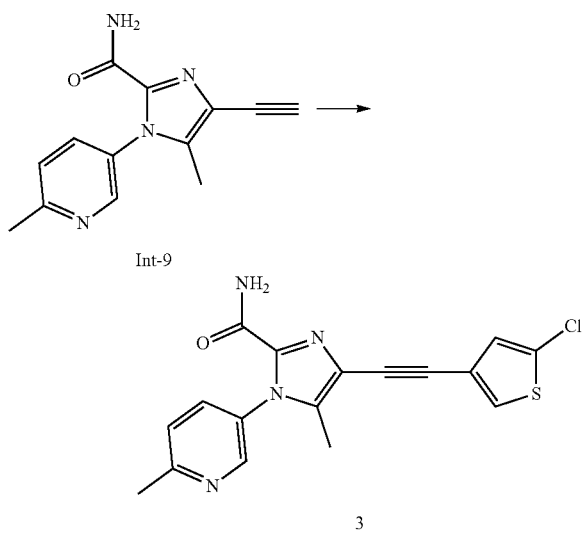

4-Ethynyl-5-methyl-1-(6-methylpyridin-3-yl)-1H-imidazole-2-carboxamide (Int-9) (80 mg, 333 μmol) and 2-chloro-4-iodothiophene (98 mg, 400 μmol) were dissolved in DMF (3 mL) and triethylamine (101 mg, 139 μL, 0.99 mmol) as well as bis(triphenylphosphine)-palladium(II) dichloride (24 mg, 33 μmol) were added under argon at 23° C. The flask was evacuated and purged with argon. Then, copper (I) iodide (3.2 mg, 16.6 μmol) was added resulting in a light brown solution. The resulting mixture was stirred at 23° C. for 16 h. The reaction mixture was extracted with water (15 mL) and dichloromethane (15 mL), the aqueous layer was backextracted with dichloromethane (15 mL). The combined organic layers were dried (sodium sulfate), filtered, and the filtrate concentrated in vacuo. The crude product was adsorbed on isolute HM-N and purified by column chromatography (12 g, silica gel, methanol/dichloromethane, gradient 0:100 to 10:90 (v/v)) to give the title compound as an off-white solid (80 mg, 224 μmol, 67% yield). HPLC (method LCMS_fastgradient) $t_R$=1.17 min. $^1$H NMR (CDCl3, 300 MHz): δ 2.15 (s, 3H), 2.66 (s, 3H), 5.25 (br s, 1H), 7.02 (d, J=1.6 Hz, 1H), 7.12 (br s, 1H), 7.28-7.33 (m, 2H), 7.50 (dd, J=2.6, 8.3 Hz, 1H), 8.38 (d, J=2.2 Hz, 1H). MS (ES+) m/z 357.2, 359.1 [M+H, Cl isotopes].

Example 4

4-[2-(3-Chlorophenyl)ethynyl]-5-methyl-1-(6-methyl-3-pyridyl)imidazole-2-carboxamide

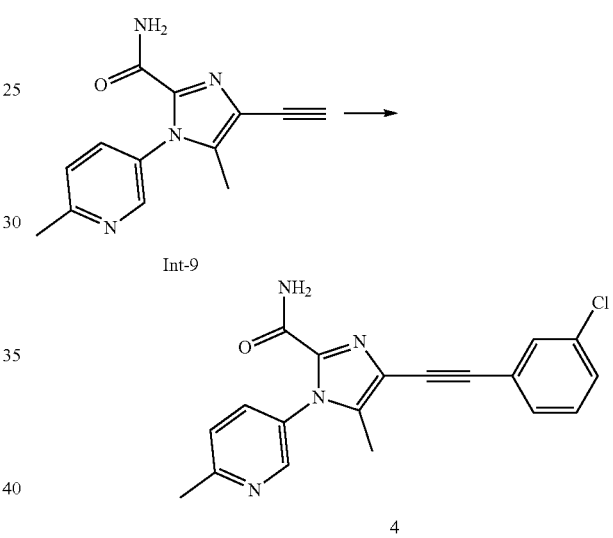

4-Ethynyl-5-methyl-1-(6-methylpyridin-3-yl)-1H-imidazole-2-carboxamide (Int-9) (600 mg, 2.5 mmol) and 1-chloro-3-iodobenzene (774 mg, 3.25 mmol) were dissolved in DMF (15 mL) and triethylamine (758 mg, 1.94 mL, 7.5 mmol) as well as bis(triphenylphosphine)palladium (II) dichloride (140 mg, 200 μmol) were added under argon at 0-5° C. The flask was evacuated and purged with argon. Then, copper (I) iodide (19 mg, 100 μmol) was added resulting in a light brown solution. The resulting mixture was stirred at 0-5° C. for 4 h. The reaction mixture was extracted with water (110 mL) and dichloromethane (110 mL), the aqueous layer was backextracted with dichloromethane (2×110 mL). The combined organic layers were washed with brine (100 mL), dried (sodium sulfate), filtered, and the filtrate concentrated in vacuo. The crude product was purified by column chromatography (40 g, silica gel, isopropanol/dichloromethane, gradient 0:100 to 20:80 (v/v)) to give the title compound as an off-white solid (449 mg, 1.28 mmol, 51% yield). HPLC (method LCMS_fastgradient) $t_R$=1.18 min. $^1$H NMR (CDCl3, 300 MHz): δ 2.18 (s, 3H), 2.67 (s, 3H), 5.27 (br s, 1H), 7.13 (br s, 1H), 7.27-7.35 (m, 3H), 7.44 (ddd, J=1.6, 1.6, 7.0 Hz, 1H), 7.49-7.55 (m, 2H), 8.38 (d, J=2.2 Hz, 1H). MS (ES+) m/z 351.2, 353.2 [M+H, Cl isotopes].

Example 5

4-((3-Cyanophenyl)ethynyl)-5-methyl-1-(6-methylpyridin-3-yl)-1H-imidazole-2-carboxamide

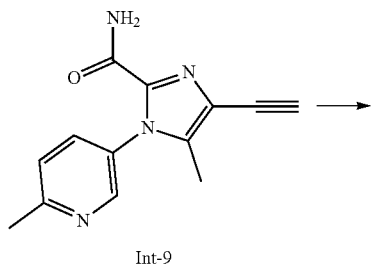

Int-9

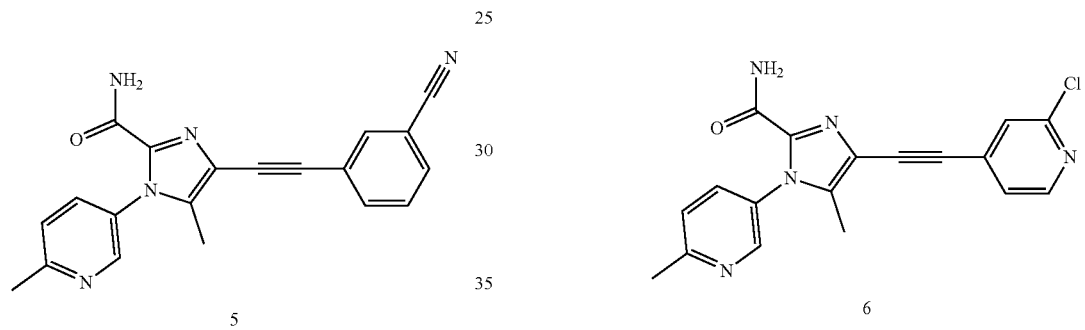

5

4-Ethynyl-5-methyl-1-(6-methylpyridin-3-yl)-1H-imidazole-2-carboxamide (Int-9) (69 mg, 287 µmol) and 3-iodobenzonitrile (78.9 mg, 345 µmol) were dissolved in DMF (2 mL) and triethylamine (87.2 mg, 120 µl, 862 µmol) as well as bis(triphenylphosphine)-palladium(II) dichloride (16.1 mg, 23 µmol) were added under argon at 0-5° C. The flask was evacuated and purged with argon. Then, copper (I) iodide (2.2 mg, 11.5 µmol) was added resulting in a light brown solution. The resulting mixture was stirred at 0-5° C. for 2 h. The reaction mixture was extracted with water (30 mL) and dichloromethane (30 mL), the aqueous layer was backextracted with dichloromethane (30 mL). The combined organic layers were washed with water (50 mL) and brine (50 mL), dried (sodium sulfate), filtered, and the filtrate concentrated in vacuo. The crude product was purified by column chromatography (12 g, silica gel, methanol/dichloromethane, gradient 0:100 to 5:95 (v/v)) to give the title compound as a light yellow solid (47 mg, 138 µmol, 48% yield). HPLC (method LCMS_fastgradient) $t_R$=1.03 min. $^1$H NMR (CDCl3, 300 MHz): δ 2.19 (s, 3H), 2.67 (s, 3H), 5.29 (br s, 1H), 7.12 (br s, 1H), 7.32 (d, J=8.3 Hz, 1H), 7.44-7.55 (m, 2H), 7.62 (ddd, J=1.4, 1.4, 7.9 Hz, 1H), 7.76 (ddd, J=1.4, 1.4, 7.9 Hz, 1H), 7.80-7.84 (m, 1H), 8.40 (d, J=2.4 Hz, 1H). MS (ES+) m/z 342.2 [M+H].

Example 6

4-(2-Chloro-pyridin-4-ylethynyl)-5-methyl-1-(6-methyl-pyridin-3-yl)-1H-imidazole-2-carboxylic Acid Amide

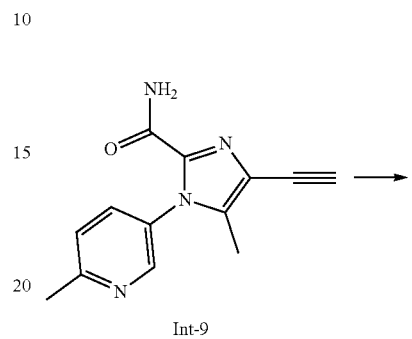

Int-9

6

4-Ethynyl-5-methyl-1-(6-methylpyridin-3-yl)-1H-imidazole-2-carboxamide (Int-9) (217 mg, 903 µmol) and 2-chloro-4-iodopyridine (273 mg, 1.08 mmol) were dissolved in DMF (5 mL) and triethylamine (274 mg, 378 µl, 2.71 mmol) as well as bis(triphenylphosphine)palladium(II) dichloride (32.3 mg, 45.2 µmol) were added under argon at 0-5° C. The flask was evacuated and purged with argon. Then, copper (I) iodide (5.2 mg, 27.1 µmol) was added resulting in a light brown solution. The resulting mixture was stirred at 0-5° C. for 3 h. After warming to room temperature, the reaction mixture was extracted with water (30 mL) and dichloromethane (30 mL), the aqueous layer was backextracted with dichloromethane (2×30 mL). The combined organic layers were washed with water (80 mL) and brine (80 mL), dried (sodium sulfate), filtered, and the filtrate concentrated in vacuo. The crude product was purified by column chromatography (12 g, silica gel, methanol/dichloromethane, gradient 0:100 to 5:95 (v/v)) to obtain the title compound as a light yellow solid (257 mg, 731 µmol, 81% yield). HPLC (method LCMS_fastgradient) $t_R$=1.00 min. $^1$H NMR (CDCl3, 300 MHz): δ 2.20 (s, 3H), 2.67 (s, 3H), 5.32 (br s, 1H), 7.10 (br s, 1H), 7.29-7.36 (m, 2H), 7.44 (s, 1H), 7.51 (dd, J=2.6, 8.3 Hz, 1H), 8.35-8.42 (m, 2H). MS (ES+) m/z 352.2, 354.1 [M+H, Cl isotopes].

Example 7

4-((2-Chloro-5-fluoropyridin-4-yl)ethynyl)-5-methyl-1-(6-methylpyridin-3-yl)-1H-imidazole-2-carboxamide

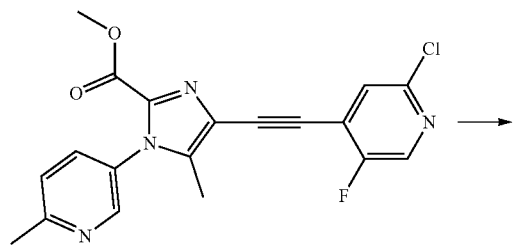

Int-29

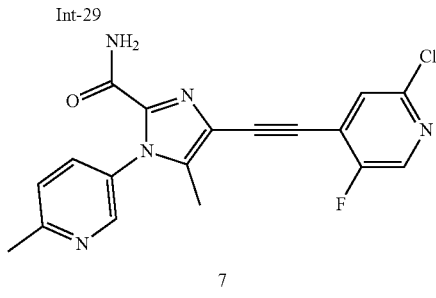

7

A solution of methyl 4-((2-chloro-5-fluoropyridin-4-yl)ethynyl)-5-methyl-1-(6-methylpyridin-3-yl)-1H-imidazole-2-carboxylate (Int-29) (41 mg, 107 µmol) in ammonia (7 N in MeOH) (3 ml, 21 mmol) was stirred for 20 h in a pressure tube at 85° C. After that, the reaction mixture was concentrated in vacuo, the residue was purified by preparative HPLC (YMC-Actus Triart C18, 100×30 mm×5 µm, eluting with acetonitrile/(water+0.1% triethylamine), gradient 20:80 to 98:2 v/v), followed by lyophilization to yield the title compound as a white solid (4 mg, 11 µmol, 10% yield). HPLC (method LCMS_fastgradient) $t_R$=1.05 min. $^1$H NMR (CDCl3, 300 MHz): δ 2.20 (s, 3H), 2.67 (s, 3H), 5.33 (br s, 1H), 7.12 (br s, 1H), 7.33 (d, J=8.3 Hz, 1H), 7.45 (d, J=4.8 Hz, 1H), 7.51 (dd, J=2.6, 8.3 Hz, 1H), 8.29 (s, 1H), 8.40 (d, J=2.4 Hz, 1H). MS (ES+) m/z 370.2, 372.2 [M+H, Cl isotopes].

Example 8

4-((3-Methoxyphenyl)ethynyl)-5-methyl-1-(6-methylpyridin-3-yl)-1H-imidazole-2-carboxamide

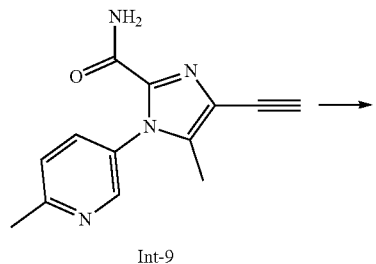

Int-9

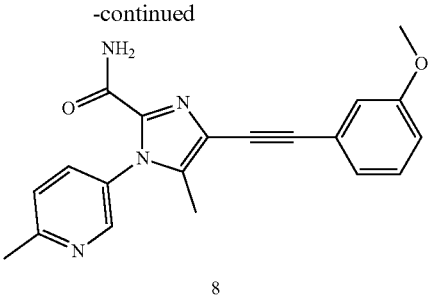

8

4-Ethynyl-5-methyl-1-(6-methylpyridin-3-yl)-1H-imidazole-2-carboxamide (Int-9) (73 mg, 304 µmol) and 1-iodo-3-methoxybenzene (85 mg, 43 µl, 365 µmol) were dissolved in DMF (4 mL) and triethylamine (92 mg, 127 µl, 911 µmol) as well as bis(triphenylphosphine)-palladium(II) dichloride (17.1 mg, 24.3 µmol) were added under argon at 0-5° C. The flask was evacuated and purged with argon. Then, copper (I) iodide (2.3 mg, 12 µmol) was added resulting in a light brown solution. The resulting mixture was stirred at 0-5° C. for 1 h. After stirring for an additional 1 h at room temperature, the reaction mixture was extracted with water (30 mL) and dichloromethane (30 mL), the aqueous layer was backextracted with dichloromethane (2×30 mL). The combined organic layers were washed with water (80 mL) and brine (80 mL), dried (sodium sulfate), filtered, and the filtrate concentrated in vacuo. The crude product was purified by column chromatography (12 g, silica gel, methanol/dichloromethane, gradient 0:100 to 10:90 (v/v)) to obtain the title compound as an off-white solid (58 mg, 167 µmol, 55% yield). HPLC (method LCMS_fastgradient) $t_R$=1.10 min. $^1$H NMR (CDCl3, 300 MHz): δ 2.18 (s, 3H), 2.66 (s, 3H), 3.82 (s, 3H), 5.26 (br s, 1H), 6.91 (ddd, J=1.0, 2.6, 8.3 Hz, 1H), 7.07-7.11 (m, 1H), 7.12-7.19 (m, 2H), 7.22-7.35 (m, 2H), 7.51 (dd, J=2.6, 8.3 Hz, 1H), 8.39 (d, J=2.2 Hz, 1H). MS (ES+) m/z 347.2 [M+H].

Example 9

4-[2-(4-Chlorophenyl)ethynyl]-5-methyl-1-(6-methyl-3-pyridyl)imidazole-2-carboxamide

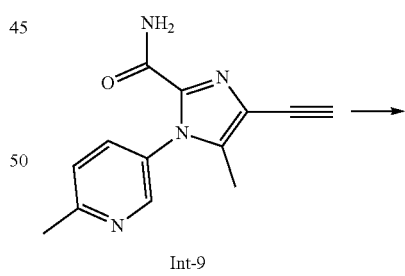

Int-9

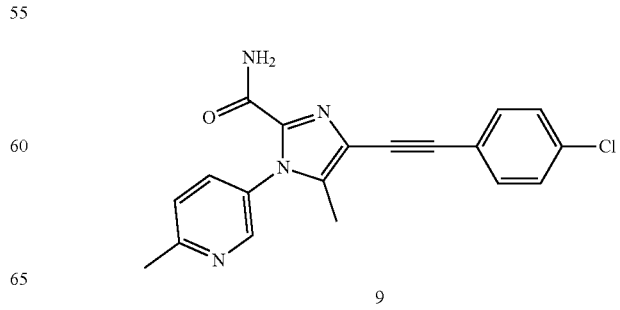

9

4-Ethynyl-5-methyl-1-(6-methylpyridin-3-yl)-1H-imidazole-2-carboxamide (Int-9) (100 mg, 420 µmol) and 1-chloro-4-iodobenzene (109 mg, 460 µmol) were dissolved in DMF (5 mL) and triethylamine (170 µl, 1.25 mmol) as well as bis(triphenylphosphine)palladium(II) dichloride (14.6 mg, 20 µmol) were added under argon at 0-5° C. The flask was evacuated and purged with argon. Then, copper (I) iodide (2.3 mg, 10 µmol) was added resulting in a light brown solution. The resulting mixture was stirred at 0-5° C. for 3 h. The crude reaction mixture was directly purified by preparative HPLC (YMC-Actus Triart C18, 100×30 mm×5 µm, eluting with acetonitrile/(water+0.1% triethylamine), gradient 20:80 to 98:2 v/v), followed by lyophilization to yield the title compound as a white solid (66 mg, 190 µmol, 45% yield). $^1$H NMR (DMSO-d6, 400 MHz): δ 2.11 (s, 3H), 2.57 (s, 3H), 7.42 (br s, 1H), 7.42 (d, J=8.2 Hz, 1H), 7.47-7.53 (m, 2H), 7.54-7.60 (m, 2H), 7.74 (dd, J=2.6, 8.2 Hz, 1H), 7.94 (br s, 1H), 8.42 (d, J=2.4 Hz, 1H). MS (ES+) m/z 351.0, 353.1 [M+H, Cl isotopes].

Example 10

5-Methyl-1-(6-methylpyridin-3-yl)-4-(m-tolylethynyl)-1H-imidazole-2-carboxamide

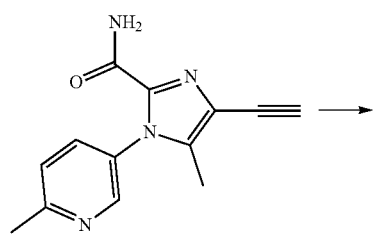

Int-9

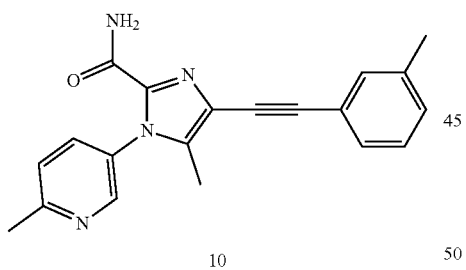

10

4-Ethynyl-5-methyl-1-(6-methylpyridin-3-yl)-1H-imidazole-2-carboxamide (Int-9) (81 mg, 337 µmol) and 1-iodo-3-methylbenzene (81 mg, 371 µmol) were dissolved in DMF (2 mL) and triethylamine (102 mg, 141 µl, 1.01 mmol) as well as bis(triphenylphosphine)-palladium(II) dichloride (19 mg, 27 µmol) were added under argon at 0-5° C. The flask was evacuated and purged with argon. Then, copper (I) iodide (2.3 mg, 10 µmol) was added resulting in a light brown solution. The resulting mixture was stirred at 0-5° C. for 3 h. After stirring for an additional 1 h at room temperature, the reaction mixture was extracted with water (30 mL) and dichloromethane (30 mL), the aqueous layer was backextracted with dichloromethane (2×30 mL). The combined organic layers were washed with water (80 mL) and brine (80 mL), dried (sodium sulfate), filtered, and the filtrate concentrated in vacuo. The crude product was purified by column chromatography (12 g, silica gel, methanol/dichloromethane, gradient 0:100 to 5:95 (v/v)) to obtain the title compound as a light yellow solid (39 mg, 118 µmol, 35% yield). HPLC (method LCMS_fastgradient) $t_R$=1.17 min. $^1$H NMR (CDCl3, 300 MHz): δ 2.18 (s, 3H), 2.35 (s, 3H), 2.66 (s, 3H), 5.30 (br s, 1H), 7.13-7.19 (m, 2H), 7.24 (dd, J=7.2, 7.2 Hz, 1H), 7.31 (d, J=8.3 Hz, 1H), 7.34-7.40 (m, 2H), 7.51 (dd, J=2.4, 8.2 Hz, 1H), 8.39 (d, J=2.4 Hz, 1H). MS (ES+) m/z 331.3 [M+H].

Example 11

5-Methyl-1-(6-methylpyridin-3-yl)-4-((2-(trifluoromethyl)pyridin-4-yl)ethynyl)-1H-imidazole-2-carboxamide

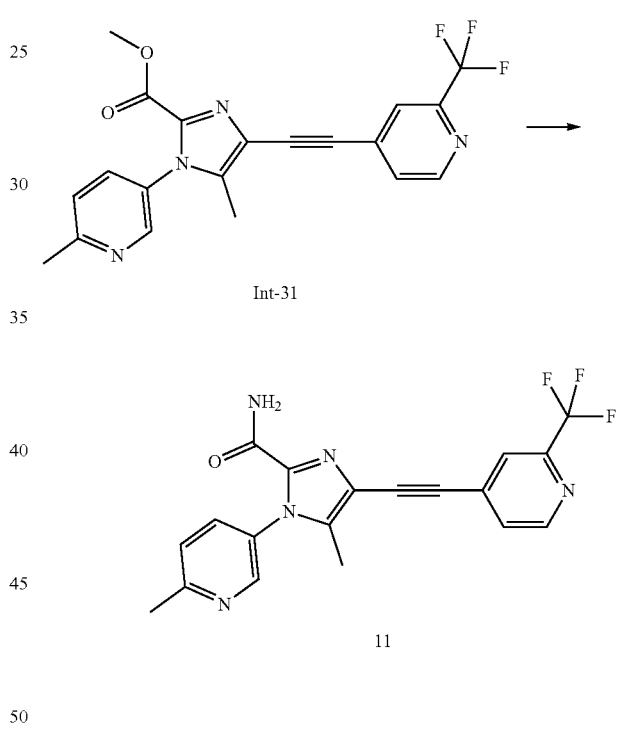

A solution of methyl 5-methyl-1-(6-methylpyridin-3-yl)-4-((2-(trifluoromethyl)pyridin-4-yl)ethynyl)-1H-imidazole-2-carboxylate (Int-31) (15 mg, 37 µmol) in ammonia (7 N in MeOH) (1.1 ml, 7.7 mmol) was stirred for 16 h in a pressure tube at 80° C. After that, the reaction mixture was concentrated in vacuo, the residue was purified by preparative HPLC (YMC-Actus Triart C18, 100×30 mm×5 µm, eluting with acetonitrile/(water+0.1% triethylamine), gradient 20:80 to 98:2 v/v), followed by lyophilization to give the title compound as a white solid (6 mg, 16 µmol, 41% yield). HPLC (method LCMS_fastgradient) $t_R$=1.06 min. $^1$H NMR (CDCl3, 300 MHz): δ 2.22 (s, 3H), 2.67 (s, 3H), 5.30 (br s, 1H), 7.10 (br s, 1H), 7.33 (d, J=8.3 Hz, 1H), 7.52 (dd, J=2.5, 8.2 Hz, 1H), 7.58 (dd, J=1.0, 5.0 Hz, 1H), 7.78 (s, 1H), 8.40 (d, J=2.4 Hz, 1H), 8.73 (d, J=5.0 Hz, 1H). MS (ES+) m/z 386.2 [M+H].

Example 12

4-[2-(2-Fluoro-4-pyridyl)ethynyl]-5-methyl-1-(6-methyl-3-pyridyl)imidazole-2-carboxamide

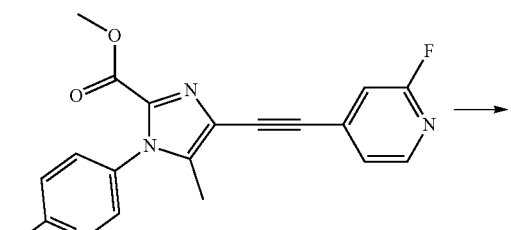
Int-34

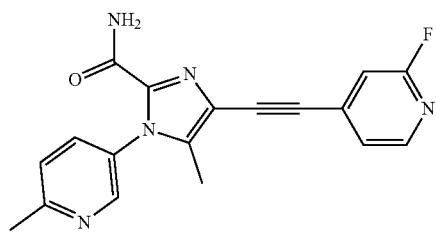
12

A solution of methyl 4-[2-(2-fluoro-4-pyridyl)ethynyl]-5-methyl-1-(6-methyl-3-pyridyl)imidazole-2-carboxylate (Int-34) (28 mg, 80 μmol) in ammonia (7 N in MeOH) (2.3 ml, 16 mmol) was stirred for 20 h in a pressure tube at 85° C. After that, the reaction mixture was concentrated in vacuo, the residue was purified by preparative HPLC (YMC-Actus Triart C18, 100×30 mm×5 μm, eluting with acetonitrile/(water+0.1% triethylamine), gradient 20:80 to 98:2 v/v), followed by lyophilization to give the title compound as a white solid (14 mg, 40 μmol, 50% yield). HPLC (method LCMS_fastgradient) $t_R$=0.94 min. $^1$H NMR (CDCl3, 300 MHz): δ 2.20 (s, 3H), 2.67 (s, 3H), 5.30 (br s, 1H), 7.03-7.06 (m, 1H), 7.11 (br s, 1H), 7.27-7.36 (m, 2H), 7.52 (dd, J=2.5, 8.2 Hz, 1H), 8.22 (d, J=5.2 Hz, 1H), 8.40 (d, J=2.4 Hz, 1H). MS (ES+) m/z 336.2 [M+H].

Example 13

4-(Benzo[d][1,3]dioxol-4-ylethynyl)-5-methyl-1-(6-methylpyridin-3-yl)-1H-imidazole-2-carboxamide

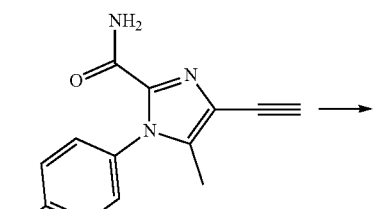
Int-9

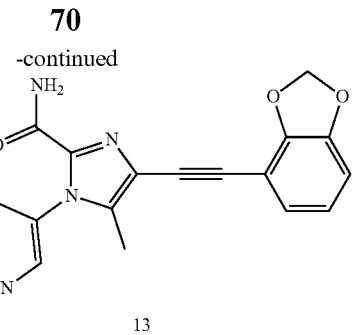
13

4-Ethynyl-5-methyl-1-(6-methylpyridin-3-yl)-1H-imidazole-2-carboxamide (Int-9) (92 mg, 383 μmol) and 4-iodobenzo[d][1,3]dioxole (114 mg, 459 μmol) were dissolved in DMF (2 mL) and triethylamine (116 mg, 160 μl, 1.15 mmol) as well as bis(triphenylphosphine)palladium(II) dichloride (21.5 mg, 30.6 μmol) were added under argon at 0-5° C. The flask was evacuated and purged with argon. Then, copper (I) iodide (2.9 mg, 15 μmol) was added resulting in a light brown solution. The resulting mixture was stirred at 0-5° C. for 2 h. The reaction mixture was extracted with water (30 mL) and dichloromethane (30 mL), the aqueous layer was backextracted with dichloromethane (2×30 mL). The combined organic layers were washed with water (80 mL) and brine (80 mL), dried (sodium sulfate), filtered, and the filtrate concentrated in vacuo. The crude product was purified by column chromatography (12 g, silica gel, methanol/dichloromethane, gradient 0:100 to 5:95 (v/v)) to obtain the title compound as a light yellow solid (78 mg, 216 μmol, 56% yield). HPLC (method LCMS_fastgradient) $t_R$=1.08 min. $^1$H NMR (CDCl3, 300 MHz): δ 2.18 (s, 3H), 2.66 (s, 3H), 5.43 (br s, 1H), 6.06 (s, 2H), 6.76-6.84 (m, 2H), 6.95-7.02 (m, 1H), 7.27-7.34 (m, 2H), 7.50 (dd, J=2.5, 8.2 Hz, 1H), 8.38 (d, J=2.4 Hz, 1H). MS (ES+) m/z 361.2 [M+H].

Example 14

4-((6-Chloropyridin-2-yl)ethynyl)-5-methyl-1-(6-methylpyridin-3-yl)-1H-imidazole-2-carboxamide

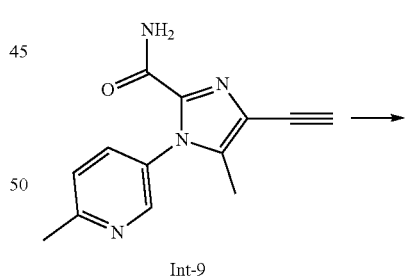
Int-9

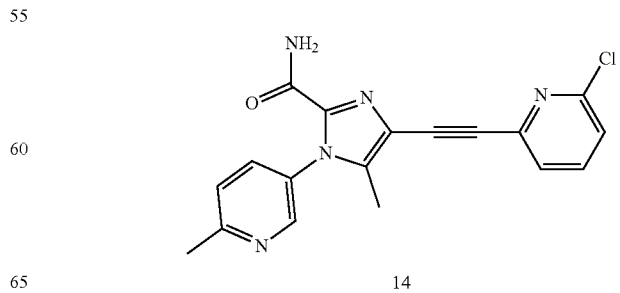
14

4-Ethynyl-5-methyl-1-(6-methylpyridin-3-yl)-1H-imidazole-2-carboxamide (Int-9) (60 mg, 250 µmol) and 2-chloro-6-iodopyridine (65.8 mg, 275 µmol) were dissolved in DMF (2 mL) and triethylamine (75.8 mg, 104 µl, 749 µmol) as well as bis(triphenylphosphine)-palladium(II) dichloride (14 mg, 20 µmol) were added under argon at 0-5° C. The flask was evacuated and purged with argon. Then, copper (I) iodide (1.9 mg, 10 µmol) was added resulting in a light brown solution. The resulting mixture was stirred at 0-5° C. for 3 h. After stirring for an additional 1 h at 23° C., the reaction mixture was extracted with water (30 mL) and dichloromethane (30 mL), the aqueous layer was backextracted with dichloromethane (2×30 mL). The combined organic layers were washed with water (80 mL) and brine (80 mL), dried (sodium sulfate), filtered, and the filtrate concentrated in vacuo. The crude product was purified by preparative HPLC (YMC-Actus Triart C18, 100×30 mm×5 µm, eluting with acetonitrile/(water+0.1% triethylamine), gradient 20:80 to 98:2 v/v), followed by lyophilization and crystallization from dichloromethane/tertbutyl methylether/n-heptane to give the title compound as a white solid (29 mg, 82 µmol, 33% yield). HPLC (method LCMS_fastgradient) $t_R$=0.99 min. $^1$H NMR (DMSO-d6, 300 MHz): δ 2.12 (s, 3H), 2.56 (s, 3H), 7.41 (d, J=8.3 Hz, 1H), 7.46 (br s, 1H), 7.54 (dd, J=0.7, 8.1 Hz, 1H), 7.65 (dd, J=0.8, 7.6 Hz, 1H), 7.76 (dd, J=2.5, 8.2 Hz, 1H), 7.92 (dd, J=7.7, 8.1 Hz, 1H), 7.98 (br s, 1H), 8.44 (d, J=2.4 Hz, 1H). MS (ES+) m/z 352.1, 354.1 [M+H, Cl isotopes].

Example 15

4-((2-Chloropyrimidin-4-yl)ethynyl)-5-methyl-1-(6-methylpyridin-3-yl)-1H-imidazole-2-carboxamide

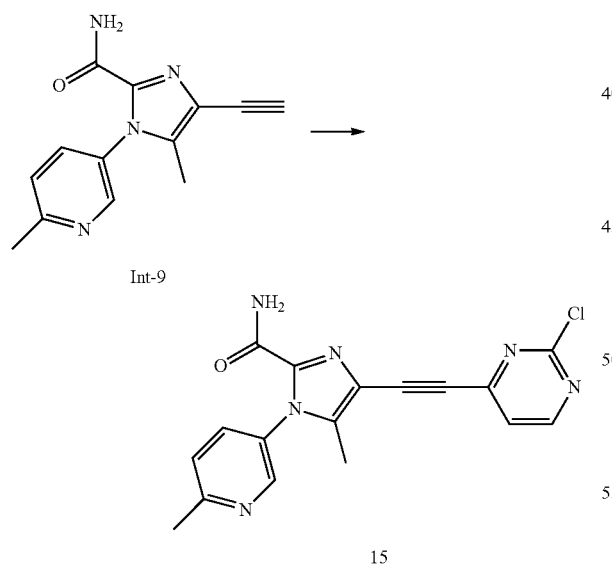

4-Ethynyl-5-methyl-1-(6-methylpyridin-3-yl)-1H-imidazole-2-carboxamide (Int-9) (49 mg, 204 µmol) and 2-chloro-4-iodopyrimidine (54 mg, 224 µmol) were dissolved in DMF (2 mL) and triethylamine (62 mg, 85 µl, 612 µmol) as well as bis(triphenylphosphine)-palladium(II) dichloride (7.2 mg, 10.2 µmol) were added under argon at 0-5° C. The flask was evacuated and purged with argon. Then, copper (I) iodide (1.2 mg, 6.1 µmol) was added resulting in a light brown solution. The resulting mixture was stirred at 0-5° C. for 3 h. After stirring for an additional 1 h at 23° C., the reaction mixture was extracted with water (30 mL) and dichloromethane (30 mL), the aqueous layer was backextracted with dichloromethane (2×30 mL). The combined organic layers were washed with water (80 mL) and brine (80 mL), dried (sodium sulfate), filtered, and the filtrate concentrated in vacuo. The crude product was purified by column chromatography (12 g, silica gel, methanol/dichloromethane, gradient 0:100 to 5:95 (v/v)) to obtain the title compound as a light yellow solid (27 mg, 76 µmol, 37% yield). HPLC (method LCMS_fastgradient) $t_R$=0.90 min. $^1$H NMR (CDCl3, 300 MHz): δ 2.23 (s, 3H), 2.67 (s, 3H), 5.30 (br s, 1H), 7.09 (br s, 1H), 7.33 (d, J=8.3 Hz, 1H), 7.42 (d, J=5.0 Hz, 1H), 7.51 (dd, J=2.5, 8.2 Hz, 1H), 8.39 (d, J=2.4 Hz, 1H), 8.61 (d, J=5.0 Hz, 1H). MS (ES+) m/z 353.2, 355.1 [M+H, Cl isotopes].

Example 16

4-((3-Fluoropyridin-4-yl)ethynyl)-5-methyl-1-(6-methylpyridin-3-yl)-1H-imidazole-2-carboxamide

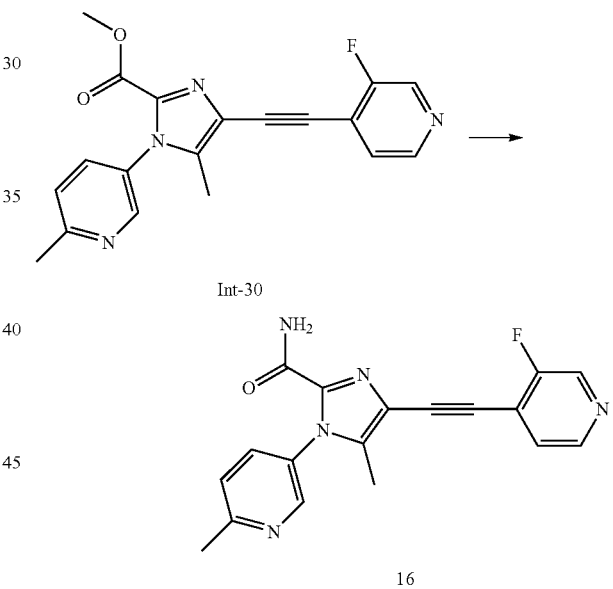

A solution of methyl 4-((3-fluoropyridin-4-yl)ethynyl)-5-methyl-1-(6-methylpyridin-3-yl)-1H-imidazole-2-carboxylate (Int-30) (101 mg, 288 µmol) in ammonia (7 N in MeOH) (4.1 ml, 28.7 mmol) was stirred for 20 h in a pressure tube at 85° C. After that, the reaction mixture was concentrated in vacuo, the residue was purified by column chromatography (12 g, silica gel, methanol/dichloromethane, gradient 0:100 to 5:95 (v/v)) to yield the title compound as a light yellow solid (35 mg, 104 µmol, 36% yield). HPLC (method LCMS_fastgradient) $t_R$=0.89 min. $^1$H NMR (DMSO-d6, 300 MHz): δ 2.13 (s, 3H), 2.56 (s, 3H), 7.42 (d, J=8.3 Hz, 1H), 7.47 (br s, 1H), 7.66 (dd, J=4.9, 6.1 Hz, 1H), 7.76 (dd, J=2.6, 8.3 Hz, 1H), 8.02 (br s, 1H), 8.44 (d, J=2.4 Hz, 1H), 8.49 (dd, J=1.1, 4.9 Hz, 1H), 8.70 (d, J=1.2 Hz, 1H). MS (ES+) m/z 336.1 [M+H].

Example 17

4-[2-(5-Chloro-3-pyridyl)ethynyl]-5-methyl-1-(6-methyl-3-pyridyl)imidazole-2-carboxamide

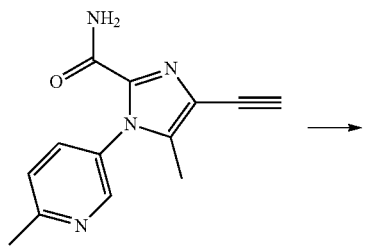

Int-9

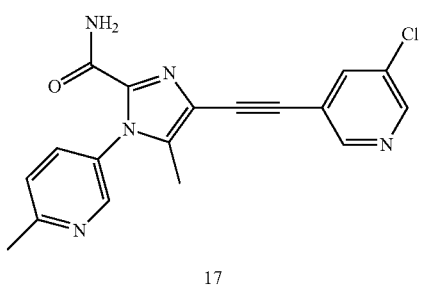

17

4-Ethynyl-5-methyl-1-(6-methylpyridin-3-yl)-1H-imidazole-2-carboxamide (Int-9) (100 mg, 420 µmol) and 3-chloro-5-iodopyridine (110 mg, 461 µmol) were dissolved in DMF (5 mL) and triethylamine (170 µL, 1.25 mmol) as well as bis(triphenylphosphine)-palladium(II) dichloride (14.6 mg, 20 µmol) were added under argon at 0-5° C. The flask was evacuated and purged with argon. Then, copper (I) iodide (2.4 mg, 12 µmol) was added resulting in a light brown solution. The resulting mixture was stirred at 0-5° C. for 3 h. The crude reaction mixture was directly purified by preparative HPLC (Shim-pack C18, 150×25 mm×10 µm, eluting with acetonitrile/(water+0.225% formic acid), linear, optimized for substrate between 70:30 to 10:90 v/v), followed by lyophilization to yield the title compound as a light yellow solid (55 mg, 160 µmol, 38% yield). $^1$H NMR (DMSO-d6, 400 MHz): δ 2.13 (s, 3H), 2.56 (s, 3H), 7.41 (d, J=8.3 Hz, 1H), 7.44 (br s, 1H), 7.74 (dd, J=2.6, 8.2 Hz, 1H), 7.95 (br s, 1H), 8.19 (dd, J=2.0, 2.0 Hz, 1H), 8.42 (d, J=2.6 Hz, 1H), 8.65 (d, J=2.4 Hz, 1H), 8.71 (d, J=1.7 Hz, 1H). MS (ES+) m/z 352.0, 354.0 [M+H, Cl isotopes].

Example 18

4-((4-Chloropyridin-2-yl)ethynyl)-5-methyl-1-(6-methylpyridin-3-yl)-1H-imidazole-2-carboxamide

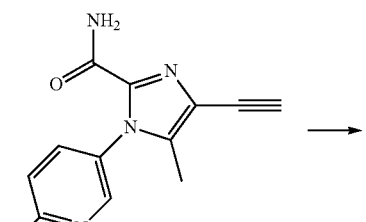

Int-9

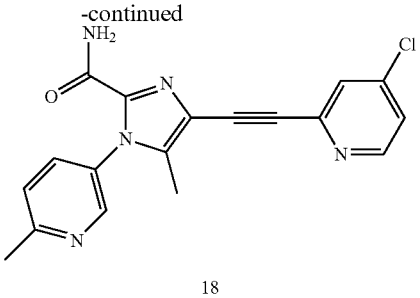

18

4-Ethynyl-5-methyl-1-(6-methylpyridin-3-yl)-1H-imidazole-2-carboxamide (Int-9) (73 mg, 304 µmol) and 4-chloro-2-iodopyridine (87 mg, 365 µmol) were dissolved in DMF (4.5 mL) and triethylamine (92 mg, 127 µL, 911 µmol) as well as bis(triphenylphosphine)-palladium(II) dichloride (17 mg, 24 µmol) were added under argon at 0-5° C. The flask was evacuated and purged with argon. Then, copper (I) iodide (2.3 mg, 12 µmol) was added resulting in a light brown solution. The resulting mixture was stirred at 0-5° C. for 1 h. After stirring for an additional 1 h at 23° C., the reaction mixture was extracted with water (30 mL) and dichloromethane (30 mL), the aqueous layer was backextracted with dichloromethane (2×30 mL). The combined organic layers were washed with water (80 mL) and brine (80 mL), dried (sodium sulfate), filtered, and the filtrate concentrated in vacuo. The crude product was purified by column chromatography (12 g, silica gel, methanol/dichloromethane, gradient 0:100 to 10:90 (v/v)) to obtain the title compound as an off-white solid (50 mg, 142 µmol, 47% yield). HPLC (method LCMS_fastgradient) $t_R$=0.98 min. $^1$H NMR (CDCl3, 300 MHz): δ 2.21 (s, 3H), 2.66 (s, 3H), 5.32 (br s, 1H), 7.14 (br s, 1H), 7.25-7.34 (m, 2H), 7.51 (dd, J=2.6, 8.1 Hz, 1H), 7.55-7.61 (m, 1H), 8.39 (d, J=2.2 Hz, 1H), 8.51 (d, J=5.2 Hz, 1H). MS (ES+) m/z 352.2, 354.1 [M+H, Cl isotopes].

Example 19

4-((6-Chloropyrimidin-4-yl)ethynyl)-5-methyl-1-(6-methylpyridin-3-yl)-1H-imidazole-2-carboxamide

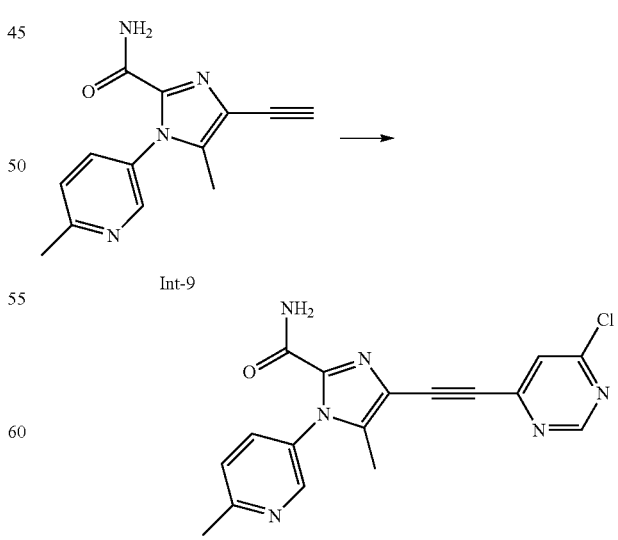

4-Ethynyl-5-methyl-1-(6-methylpyridin-3-yl)-1H-imidazole-2-carboxamide (Int-9) (54 mg, 225 μmol) and 4-chloro-6-iodopyrimidine (59.4 mg, 247 μmol) were dissolved in DMF (2 mL) and triethylamine (68 mg, 94 μL, 674 μmol) as well as bis(triphenylphosphine)-palladium(II) dichloride (7.9 mg, 11 μmol) were added under argon at 0-5° C. The flask was evacuated and purged with argon. Then, copper (I) iodide (1.3 mg, 6.7 μmol) was added resulting in a light brown solution. The resulting mixture was stirred at 0-5° C. for 3 h. After stirring for an additional 1 h at 23° C., the reaction mixture was extracted with water (30 mL) and dichloromethane (30 mL), the aqueous layer was backextracted with dichloromethane (2×30 mL). The combined organic layers were washed with water (80 mL) and brine (80 mL), dried (sodium sulfate), filtered, and the filtrate concentrated in vacuo. The crude product was adsorbed on isolute HM-N and purified by column chromatography (12 g, silica gel, methanol/dichloromethane, gradient 0:100 to 5:95 (v/v)) to obtain the title compound as a light yellow solid (31 mg, 88 μmol, 39% yield). HPLC (method LCMS-_fastgradient) $t_R$=0.92 min. $^1$H NMR (CDCl3, 300 MHz): δ 2.23 (s, 3H), 2.67 (s, 3H), 5.32 (br s, 1H), 7.11 (br s, 1H), 7.32 (d, J=8.3 Hz, 1H), 7.48-7.56 (m, 2H), 8.39 (d, J=2.2 Hz, 1H), 8.97 (d, J=1.2 Hz, 1H). MS (ES+) m/z 353.1, 355.1 [M+H, Cl isotopes].

Example 20

5-Methyl-1-(6-methyl-3-pyridyl)-4-[2-(3-pyridyl)ethynyl]imidazole-2-carboxamide

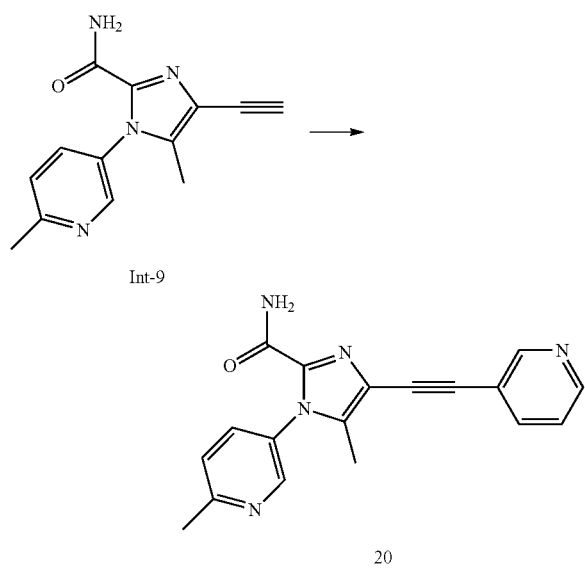

4-Ethynyl-5-methyl-1-(6-methylpyridin-3-yl)-1H-imidazole-2-carboxamide (Int-9) (30 mg, 120 μmol) and 3-iodopyridine (26.9 mg, 130 μmol) were dissolved in DMF (5 mL) and triethylamine (50 μL, 370 μmol) as well as bis(triphenylphosphine)palladium(II) dichloride (4.4 mg, 6 μmol) were added under argon at 0-5° C. The flask was evacuated and purged with argon. Then, copper (I) iodide (0.7 mg, 3.7 μmol) was added resulting in a light brown solution. The resulting mixture was stirred at 0-5° C. for 3 h. The crude reaction mixture was directly purified by preparative HPLC (Shim-pack C18, 150×25 mm×10 μm, eluting with acetonitrile/(water+0.225% formic acid), linear, optimized for substrate between 70:30 to 10:90 v/v), and lyophilization, followed by preparative TLC (silica gel, eluting with ethyl acetate) to afford the title compound as a white solid (7 mg, 20 μmol, 17% yield). $^1$H NMR (DMSO-d6, 400 MHz): δ 2.12 (s, 3H), 2.56 (s, 3H), 7.38-7.50 (m, 3H), 7.74 (dd, J=2.4, 8.2 Hz, 1H), 7.94-8.02 (m, 2H), 8.42 (d, J=2.3 Hz, 1H), 8.59 (dd, J=1.3, 4.8 Hz, 1H), 8.75 (s, 1H). MS (ES+) m/z 318.2 [M+H].

Example 21

5-Methyl-1-(6-methyl-3-pyridyl)-4-[2-(4-pyridyl)ethynyl]imidazole-2-carboxamide

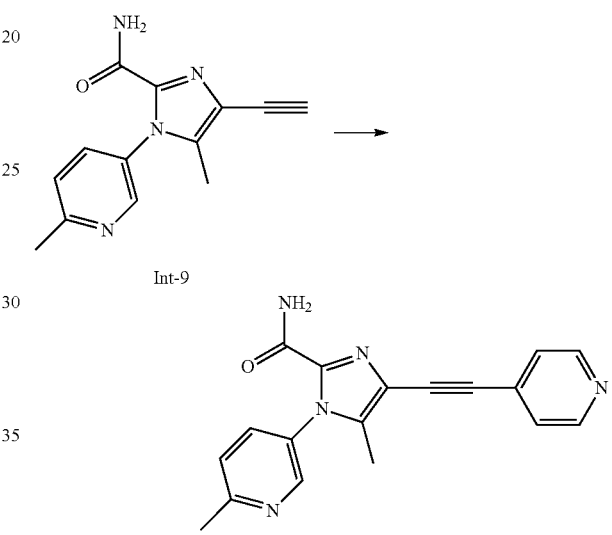

4-Ethynyl-5-methyl-1-(6-methylpyridin-3-yl)-1H-imidazole-2-carboxamide (Int-9) (73 mg, 304 μmol) and 4-iodopyridine (71.4 mg, 334 μmol) were dissolved in DMF (2 mL) and triethylamine (92.2 mg, 127 μl, 991 μmol) as well as bis(triphenylphosphine)-palladium(II) dichloride (11 mg, 16 μmol) were added under argon at 0-5° C. The flask was evacuated and purged with argon. Then, copper (I) iodide (1.7 mg, 9 μmol) was added resulting in a light brown solution. The resulting mixture was stirred at 0-5° C. for 3 h. After stirring for an additional 1 h at 23° C., the reaction mixture was extracted with water (30 mL) and dichloromethane (30 mL), the aqueous layer was backextracted with dichloromethane (2×30 mL). The combined organic layers were washed with water (80 mL) and brine (80 mL), dried (sodium sulfate), filtered, and the filtrate concentrated in vacuo. The crude product was purified by preparative HPLC (YMC-Actus Triart C18, 100×30 mm×5 μm, eluting with acetonitrile/(water+0.1% triethylamine), gradient 20:80 to 98:2 v/v), to yield the title compound as a white solid (36 mg, 113 μmol, 37% yield). HPLC (method LCMS-_fastgradient) $t_R$=0.69 min. $^1$H NMR (CDCl3, 300 MHz): δ 2.20 (s, 3H), 2.66 (s, 3H), 5.36 (br s, 1H), 7.13 (br s, 1H), 7.32 (d, J=8.1 Hz, 1H), 7.37-7.43 (m, 2H), 7.51 (dd, J=2.6, 8.3 Hz, 1H), 8.39 (d, J=2.2 Hz, 1H), 8.61 (d, J=5.8 Hz, 1H). MS (ES+) m/z 318.2 [M+H].

Example 22

5-Methyl-1-(6-methylpyridin-3-yl)-4-((2-methylpyridin-4-yl)ethynyl)-1H-imidazole-2-carboxamide

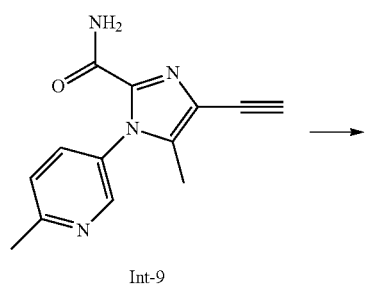

Int-9

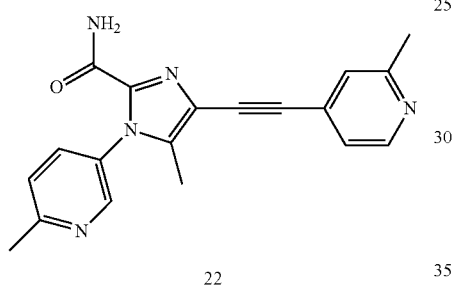

22

4-Ethynyl-5-methyl-1-(6-methylpyridin-3-yl)-1H-imidazole-2-carboxamide (Int-9) (49 mg, 204 µmol) and 4-iodo-2-methylpyridine (67 mg, 306 µmol) were dissolved in DMF (2 mL) and triethylamine (62 mg, 85 µL, 612 µmol) as well as bis(triphenylphosphine)-palladium(II) dichloride (14 mg, 20 µmol) were added under argon at 0-5° C. The flask was evacuated and purged with argon. Then, copper (I) iodide (3.9 mg, 20 µmol) was added resulting in a light brown solution. The resulting mixture was stirred at 0-5° C. for 3 h. After stirring for an additional 1 h at room temperature, the reaction mixture was extracted with water (30 mL) and dichloromethane (30 mL), the aqueous layer was backextracted with dichloromethane (2×30 mL). The combined organic layers were washed with water (80 mL) and brine (80 mL), dried (sodium sulfate), filtered, and the filtrate concentrated in vacuo. The crude product was adsorbed on isolute HM-N and purified by column chromatography (12 g, silica gel, methanol/dichloromethane, gradient 0:100 to 5:95 (v/v)) to obtain the title compound as a light yellow solid (23 mg, 69 µmol, 34% yield). HPLC (method LCMS-_fastgradient) $t_R$=0.65 min. ¹H NMR (CDCl3, 300 MHz): δ 2.19 (s, 3H), 2.57 (s, 3H), 2.66 (s, 3H), 5.30 (br s, 1H), 7.12 (br s, 1H), 7.18-7.35 (m, 3H), 7.51 (dd, J=2.5, 8.2 Hz, 1H), 8.39 (d, J=2.0 Hz, 1H), 8.50 (br s, 1H). MS (ES+) m/z 332.1 [M+H].

Example 23

4-[2-(2-Chloro-3-methyl-4-pyridyl)ethynyl]-5-methyl-1-(5-methylpyrazin-2-yl)imidazole-2-carboxamide

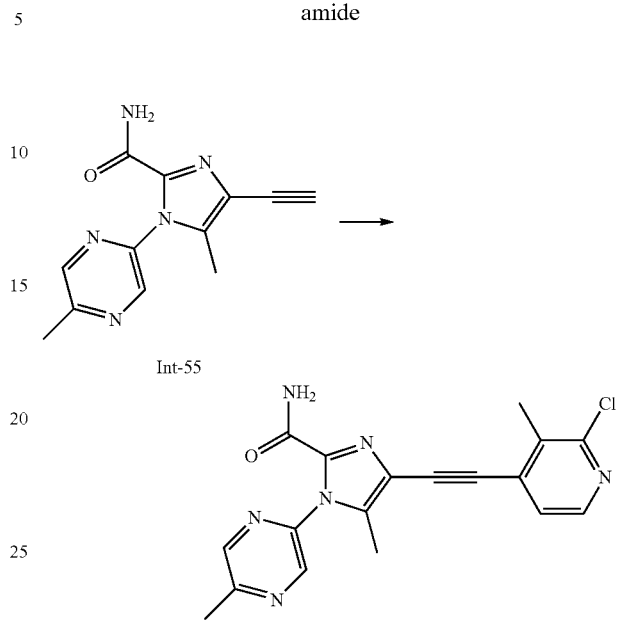

23

4-Ethynyl-5-methyl-1-(5-methylpyrazin-2-yl)imidazole-2-carboxamide (Int-55) (140 mg, 580 µmol) was dissolved in DMF (4 mL) and 1,1'-bis(diphenylphosphino) ferrocene-palladium(II)dichloride dichloromethane complex (23.7 mg, 30 µmol), copper(I) iodide (3.3 mg, 20 µmol) and triethylamine (0.24 mL, 1.74 mmol) were added. The resulting mixture was stirred for 1 h at 80° C. Then, 2-chloro-4-iodo-3-methyl-pyridine (147 mg, 580 µmol) was added and the reaction mixture was stirred at 80° C. for additional 2 h. After cooling, the mixture was directly purified by preparative HPLC (Shim-pack C18, 150×25 mm×10 µm, eluting with acetonitrile/(water+0.225% formic acid), linear, optimized for substrate between 70:30 to 10:90 v/v), to give, after lyophilization, the title compound as a white solid (50 mg, 140 µmol, 23% yield). ¹H NMR (400 MHz, DMSO-d₆) δ ppm 2.21 (s, 3H), 2.53-2.55 (m, 3H), 2.62 (s, 3H), 7.46-7.65 (m, 2H), 8.13 (s, 1H), 8.29 (d, J=4.9 Hz, 1H), 8.59 (s, 1H), 8.75 (d, J=1.1 Hz, 1H). MS (ES+) m/z 367 [M+H].

Example 24

4-[2-(2-Chloro-3-methyl-4-pyridyl)ethynyl]-5-methyl-1-(6-methylpyridazin-3-yl)imidazole-2-carboxamide

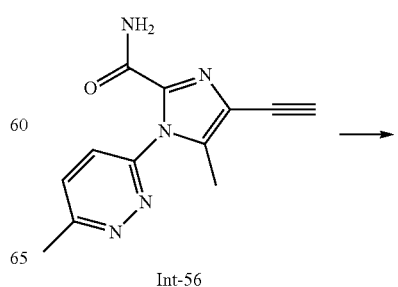

Int-56

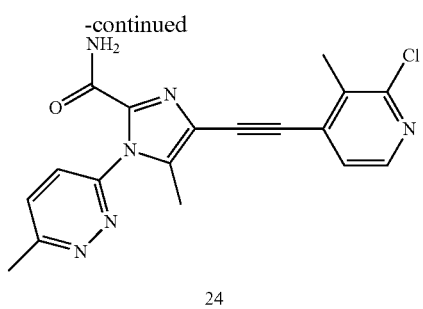

24

2-Chloro-4-iodo-3-methyl-pyridine (63 mg, 250 μmol) was dissolved in DMF (2 mL) and 1,1'-bis(diphenylphosphino) ferrocene-palladium(II)dichloride dichloromethane complex (10.1 mg, 12 μmol), copper(I) iodide (1.4 mg, 7 μmol) and triethylamine (100 μL, 0.72 mmol) were added. The resulting mixture was stirred for 1 h at 70° C. Then, 4-ethynyl-5-methyl-1-(6-methylpyridazin-3-yl) imidazole-2-carboxamide (Int-56) (60 mg, 250 μmol) was added and the reaction mixture was stirred at 70° C. for additional 2 h. After cooling, the mixture was directly purified by preparative HPLC (Shim-pack C18, 150×25 mm×10 μm, eluting with acetonitrile/(water+0.225% formic acid), linear, optimized for substrate between 70:30 to 10:90 v/v), to give, after lyophilization, the title compound as a light yellow solid (18 mg, 49 μmol, 20% yield). $^1$H NMR (400 MHz, DMSO-d6) δ ppm 2.19 (s, 3H), 2.54 (s, 3H), 2.74 (s, 3H), 7.51-7.59 (m, 2H), 7.81-7.89 (m, 2H), 8.11-8.17 (m, 1H), 8.27-8.30 (m, 1H). MS (ES+) m/z 367 [M+H].

Example 25

4-[2-(2-Chloro-3-methyl-4-pyridyl)ethynyl]-5-methyl-1-(5-methyl-3-pyridyl)imidazole-2-carboxamide

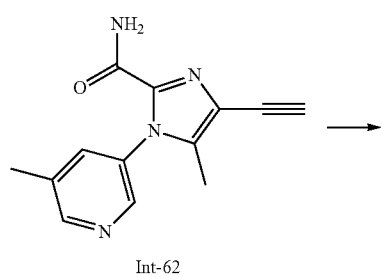

Int-62

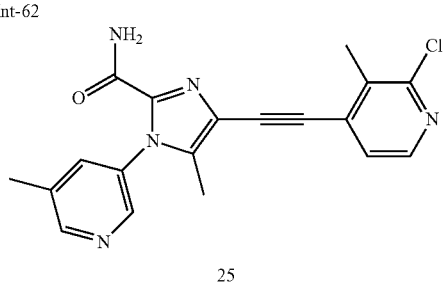

25

4-Ethynyl-5-methyl-1-(5-methyl-3-pyridyl)imidazole-2-carboxamide (Int-62) (70 mg, 290 μmol) was dissolved in DMF (0.5 mL) and 1,1'-bis(diphenylphosphino) ferrocene-palladium(II)dichloride dichloromethane complex (11.9 mg, 14 μmol), copper(I) iodide (2.8 mg, 15 μmol), triethylamine (88 mg, 0.87 mmol), and 2-chloro-4-iodo-3-methyl-pyridine (89 mg, 0.35 mmol) were added. The resulting mixture was stirred for 1 h at 70° C. After cooling, the mixture was filtered and the filtrate directly purified by preparative HPLC (Shim-pack C18, 150×25 mm×10 μm, eluting with acetonitrile/(water+0.225% formic acid), linear, optimized for substrate between 70:30 to 10:90 v/v), to afford, after lyophilization, the title compound as a yellow solid (7 mg, 20 μmol, 6% yield). $^1$H NMR (400 MHz, CDCl$_3$) δ ppm 2.21 (s, 3H), 2.46 (s, 3H), 2.61 (s, 3H), 5.32 (brs, 1H), 7.13 (brs, 1H), 7.35 (d, J=4.8 Hz, 1H), 7.45 (s, 1H), 8.23 (d, J=4.8 Hz, 1H), 8.35 (d, J=2.0 Hz, 1H), 8.60 (s, 1H). MS (ES+) m/z 366 [M+H].

Example 26

4-[2-(2-Chloro-3-methyl-4-pyridyl)ethynyl]-1-(6-chloro-3-pyridyl)-5-methyl-imidazole-2-carboxamide

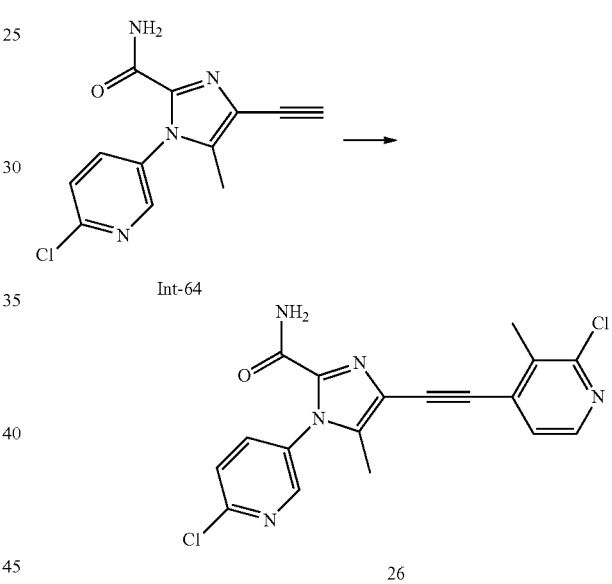

2-Chloro-4-iodo-3-methyl-pyridine (77.8 mg, 0.310 mmol) was dissolved in DMF (2 mL) and 1,1'-bis(diphenylphosphino) ferrocene-palladium(II)dichloride dichloromethane complex (12.5 mg, 15 μmol), copper(I) iodide (1.7 mg, 9 μmol) and triethylamine (130 μL, 0.92 mmol) were added. The resulting mixture was stirred for 1 h at 70° C. Then, 1-(6-chloro-3-pyridyl)-4-ethynyl-5-methyl-imidazole-2-carboxamide (Int-64) (80 mg, 310 μmol) was added and the reaction mixture was stirred at 70° C. for additional 3 h. After cooling, the mixture was directly purified by preparative HPLC (Shim-pack C18, 150×25 mm×10 μm, eluting with acetonitrile/(water+0.225% formic acid), linear, optimized for substrate between 70:30 to 10:90 v/v), to give, after lyophilization, the title compound as a yellow solid (23 mg, 60 μmol, 19% yield). $^1$H NMR (400 MHz, DMSO-d$_6$) δ ppm 2.17 (s, 3H), 2.53 (br s, 3H), 7.50-7.54 (m, 2H), 7.73 (d, J=8.6 Hz, 1H), 8.01 (dd, J=8.4, 2.7 Hz, 1H), 8.07 (s, 1H), 8.28 (d, J=5.1 Hz, 1H), 8.51 (d, J=2.7 Hz, 1H). MS (ES+) m/z 386 [M+H].

Example 27

4-[2-(2-Chloro-3-methyl-4-pyridyl)ethynyl]-1-(6-methoxy-3-pyridyl)-5-methyl-imidazole-2-carboxamide

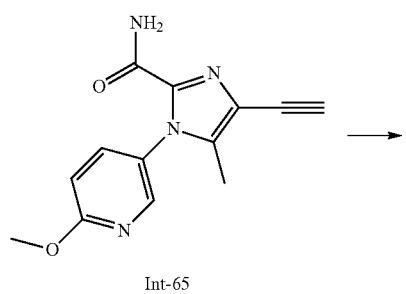

Int-65

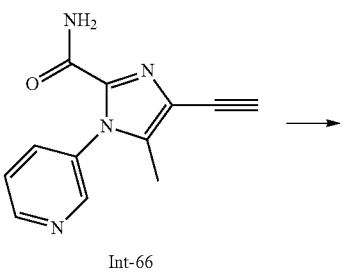

27

4-Ethynyl-1-(6-methoxy-3-pyridyl)-5-methyl-imidazole-2-carboxamide (Int-65) (60 mg, 230 μmol) was dissolved in DMF (1 mL) and 1,1'-bis(diphenylphosphino) ferrocene-palladium(II)dichloride dichloromethane complex (9.5 mg, 12 μmol), copper(I) iodide (2.2 mg, 11 μmol), triethylamine (71 mg, 0.70 mmol), and 2-chloro-4-iodo-3-methyl-pyridine (71 mg, 0.28 mmol) were added. The resulting mixture was stirred for 4 h at 70° C. After cooling, the mixture was filtered and the filtrate directly purified by preparative HPLC (Shim-pack C18, 150×25 mm×10 μm, eluting with acetonitrile/(water+0.225% formic acid), linear, optimized for substrate between 70:30 to 10:90 v/v), to afford, after lyophilization, the title compound as a yellow solid (10 mg, 26 μmol, 11% yield). $^1$H NMR (400 MHz, CDCl$_3$) δ ppm 2.22 (s, 3H), 2.61 (s, 3H), 4.01 (s, 3H), 5.32 (br s, 1H), 6.90 (d, J=8.8 Hz, 1H), 7.14 (br s, 1H), 7.34 (d, J=4.8 Hz, 1H), 7.49 (dd, J=4.8, 2.8 Hz, 1H), 8.06 (d, J=2.8 Hz, 1H), 8.22 (d, J=4.8 Hz, 1H). MS (ES+) m/z 382 [M+H].

Example 28

4-[2-(2-Chloro-3-methyl-4-pyridyl)ethynyl]-5-methyl-1-(5-methyl-2-pyridyl)imidazole-2-carboxamide

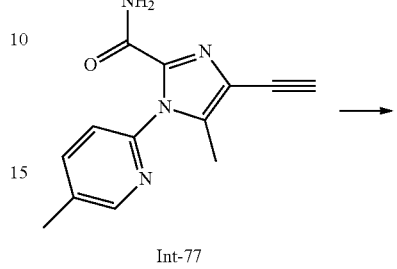

Int-77

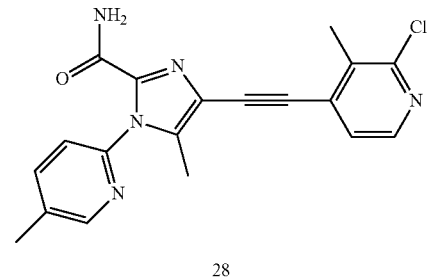

28

2-Chloro-4-iodo-3-methyl-pyridine (63.3 mg, 0.250 mmol) was dissolved in DMF (1 mL) and 1,1'-bis(diphenylphosphino) ferrocene-palladium(II)dichloride dichloromethane complex (10.2 mg, 12 μmol), copper(I) iodide (1.4 mg, 7 μmol) and triethylamine (100 μL, 0.75 mmol) were added. The resulting mixture was stirred for 1 h at 70° C. Then, 4-ethynyl-5-methyl-1-(5-methyl-2-pyridyl) imidazole-2-carboxamide (Int-77) (60 mg, 250 μmol) was added and the reaction mixture was stirred at 70° C. for additional 3 h. After cooling, the mixture was filtered and the filtrate directly purified by preparative HPLC (Shim-pack C18, 150×25 mm×10 μm, eluting with acetonitrile/(water+0.225% formic acid), linear, optimized for substrate between 70:30 to 10:90 v/v), to give, after lyophilization, the title compound as a yellow solid (4 mg, 11 μmol, 4% yield). $^1$H NMR (400 MHz, DMSO-d$_6$) δ ppm 2.16 (s, 3H), 2.41 (s, 3H), 2.53 (br s, 3H), 7.42-7.49 (m, 2H), 7.53 (d, J=5.0 Hz, 1H), 7.85 (dd, J=8.1, 1.7 Hz, 1H), 8.03 (br s, 1H), 8.28 (d, J=4.9 Hz, 1H), 8.41 (s, 1H). MS (ES+) m/z 366 [M+H].

Example 29

4-[2-(2-Chloro-3-methyl-4-pyridyl)ethynyl]-5-methyl-1-(3-pyridyl)imidazole-2-carboxamide Int-66

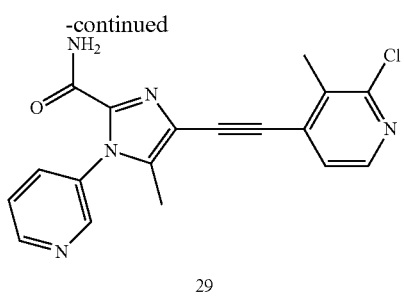

29

2-Chloro-4-iodo-3-methyl-pyridine (687 mg, 2.71 mmol) was dissolved in DMF (10 mL) and 1,1'-bis(diphenylphosphino) ferrocene-palladium(II)dichloride dichloromethane complex (92 mg, 110 μmol), copper(I) iodide (13 mg, 70 μmol) and triethylamine (0.94 mL, 6.77 mmol) were added. The resulting mixture was stirred for 0.5 h at 70° C. Then, 4-ethynyl-5-methyl-1-(3-pyridyl) imidazole-2-carboxamide (Int-66) (700 mg, 2.26 mmol) was added and the reaction mixture was stirred at 70° C. for additional 1 h. After cooling, the mixture was filtered and the filtrate concentrated in vacuo. The crude product was purified by column chromatography (200 g, silica gel, n-heptane/(ethyl acetate+30% ethanol), gradient 90:10 to 66:33 (v/v)), followed by trituration with tertbutylmethyl ether to yield the title compound as a yellow solid (311 mg, 0.88 mmol, 38% yield). $^1$H NMR (400 MHz, DMSO-$d_6$) δ ppm 2.15 (s, 3H), 2.53 (br s, 3H), 7.50 (br s, 1H), 7.54 (d, J=5.0 Hz, 1H), 7.59 (dd, J=8.0, 4.8 Hz, 1H), 7.91 (br d, J=8.1 Hz, 1H), 8.05 (br s, 1H), 8.28 (d, J=4.9 Hz, 1H), 8.61 (d, J=2.0 Hz, 1H), 8.69 (br d, J=4.0 Hz, 1H). MS (ES+) m/z 352 [M+H].

Example 30

4-[2-(3-Chloro-2-methyl-phenyl)ethynyl]-5-methyl-1-(3-pyridyl)imidazole-2-carboxamide

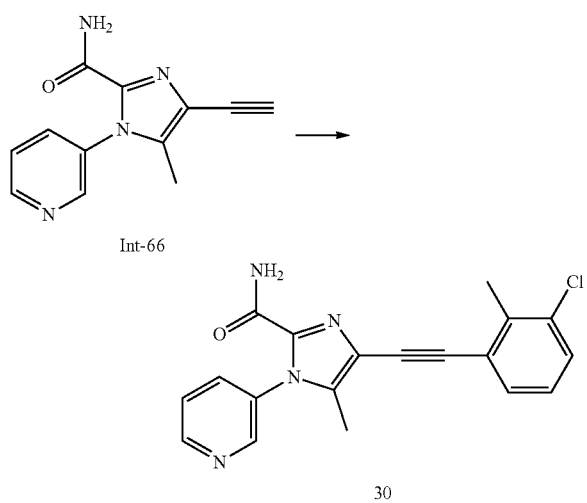

30

1-Chloro-3-iodo-2-methyl-benzene (179 mg, 0.71 mmol) was dissolved in DMF (2 mL) and 1,1'-bis(diphenylphosphino) ferrocene-palladium(II)dichloride dichloromethane complex (14.4 mg, 18 μmol), copper(I) iodide (2.0 mg, 10 μmol) and triethylamine (150 μL, 1.06 mmol) were added. The resulting mixture was stirred for 0.5 h at 70° C. Then, 4-ethynyl-5-methyl-1-(3-pyridyl)imidazole-2-carboxamide (Int-66) (80 mg, 350 μmol) was added and the reaction mixture was stirred at 70° C. for additional 1 h. After cooling, the mixture was filtered, the filtrate concentrated in vacuo and purified by preparative HPLC (Shim-pack C18, 150×25 mm×10 μm, eluting with acetonitrile/(water+0.225% formic acid), linear, optimized for substrate between 70:30 to 10:90 v/v), to afford, after lyophilization, the title compound as a light yellow solid (29 mg, 83 μmol, 23% yield). $^1$H NMR (400 MHz, DMSO-d6) δ ppm 2.13 (s, 3H), 2.54 (s, 3H), 7.25-7.32 (m, 1H), 7.43-7.47 (m, 1H), 7.51 (t, J=7.5 Hz, 2H), 7.57-7.62 (m, 1H), 7.86-7.95 (m, 1H), 7.98-8.07 (m, 1H), 8.61 (d, J=2.3 Hz, 1H), 8.65-8.74 (m, 1H). MS (ES+) m/z 351 [M+H].

Example 31

4-[2-(2-Chloro-4-pyridyl)ethynyl]-5-methyl-1-(6-methyl-3-pyridyl)pyrrole-2-carboxamide

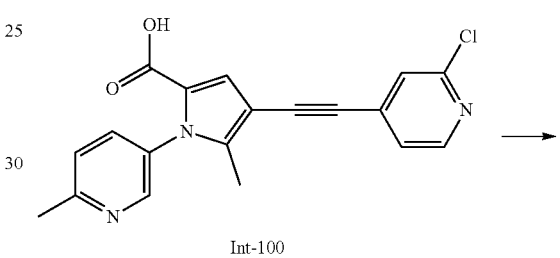

Int-100

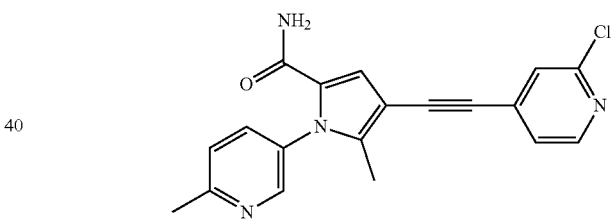

31

4-[2-(2-Chloro-4-pyridyl)ethynyl]-5-methyl-1-(6-methyl-3-pyridyl)pyrrole-2-carboxylic acid (Int-100) (85 mg, 0.24 mmol) was dissolved in THF (4 mL) and N,N'-carbonyldiimidazole (47 mg, 0.29 mmol) was added at 0° C. The mixture was stirred at 25° C. for 2 h. Then, the mixture was cooled to 0° C. and conc. ammonium hydroxide solution (3.0 mL, 25-28% in water) was added. The resulting mixture was stirred for 1 h at 0° C., followed by 2 h at 25° C. After that, the solvent was removed in vacuo and the residue was purified by preparative HPLC (Shim-pack C18, 150×25 mm×10 μm, eluting with acetonitrile/(water+0.225% formic acid), linear, optimized for substrate between 70:30 to 10:90 v/v), to afford, after lyophilization, the title compound as a white solid (20 mg, 57 μmol, 23% yield). $^1$H NMR (400 MHz, DMSO-$d_6$) δ ppm 2.55 (s, 3H), 3.65 (s, 3H), 7.19 (br s, 1H), 7.38 (d, J=7.9 Hz, 1H), 7.49-7.59 (m, 1H), 7.68 (dd, J=5.0, 1.2 Hz, 1H), 7.82 (dd, J=7.9, 2.2 Hz, 1H), 7.89 (s, 1H), 8.47-8.59 (m, 2H). MS (ES+) m/z 351 [M+H].

Example 32

2-[2-(2-Chloro-4-pyridyl)ethynyl]-1-methyl-5-(6-methyl-3-pyridyl)imidazole-4-carboxamide

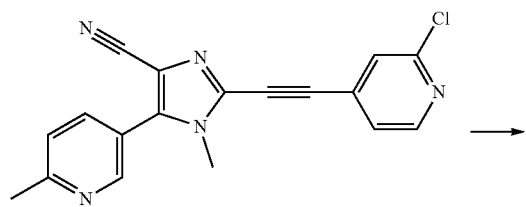

2-[2-(2-Chloro-4-pyridyl)ethynyl]-1-methyl-5-(6-methyl-3-pyridyl)imidazole-4-carbonitrile (Int-85) (350 mg, 1.05 mmol) was dissolved in conc. sulfuric acid (3.0 mL, 98%, 55 mmol) and stirred at 25° C. for 16 h. After that, the pH was adjusted to around 8 by addition of 2 N aqueous solution of sodium hydroxide. A precipitate was formed which was filtered off, washed (tertbutyl methylether) and dried in vacuo to afford the title compound as off-white solid (200 mg, 0.57 mmol, 53% yield). $^1$H NMR (400 MHz, DMSO-$d_6$) δ ppm 2.55 (s, 3H), 3.65 (s, 3H), 7.19 (br s, 1H), 7.38 (d, J=7.9 Hz, 1H), 7.49-7.59 (m, 1H), 7.68 (dd, J=5.0, 1.2 Hz, 1H), 7.82 (dd, J=7.9, 2.2 Hz, 1H), 7.89 (s, 1H), 8.47-8.59 (m, 2H). MS (ES+) m/z 352 [M+H].

Example 33

2-[2-(3-Chloro-2-methyl-phenyl)ethynyl]-1-methyl-5-(6-methyl-3-pyridyl)imidazole-4-carboxamide

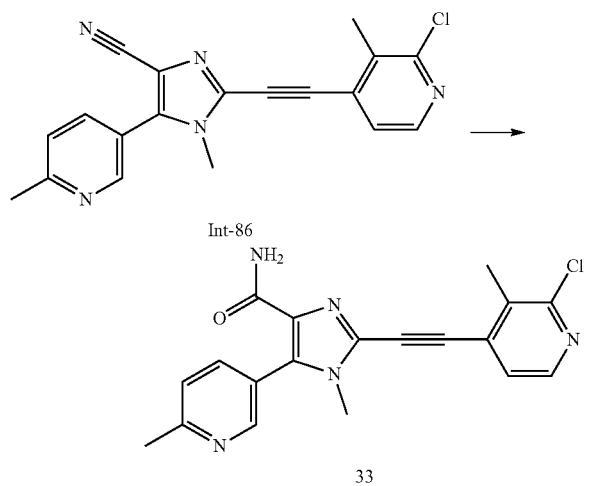

2-[2-(2-Chloro-3-methyl-4-pyridyl)ethynyl]-1-methyl-5-(6-methyl-3-pyridyl) imidazole-4-carbonitrile (Int-86) (80 mg, 0.23 mmol) was dissolved in conc. sulfuric acid (1.0 mL, 98%, 18 mmol) and stirred at 25° C. for 1 h. After that, the pH was adjusted to around 8 by addition of 2 N aqueous solution of sodium hydroxide. A precipitate was formed which was filtered off, washed (tertbutyl methylether) and purified by preparative HPLC (Shim-pack C18, 150×25 mm×10 μm, eluting with acetonitrile/(water+0.225% formic acid), linear, optimized for substrate between 70:30 to 10:90 v/v) to yield, after lyophilization, the title compound as formate salt as off-white solid (29 mg, 70 μmol, 30% yield). $^1$H NMR (400 MHz, DMSO-$d_6$) δ ppm 2.55 (s, 3H), 2.56 (s, 3H), 3.63 (s, 3H), 7.08-7.20 (m, 1H), 7.34-7.44 (m, 1H), 7.37-7.38 (m, 1H), 7.51-7.62 (m, 1H), 7.52-7.59 (m, 1H), 7.62-7.68 (m, 1H), 7.75-7.87 (m, 1H), 8.29-8.37 (m, 1H), 8.38-8.44 (m, 1H), 8.47-8.58 (m, 1H). MS (ES+) m/z 365.9 [M+H].

Example 34

2-[2-(3-Chlorophenyl)ethynyl]-1-methyl-5-(6-methyl-3-pyridyl)imidazole-4-carboxamide 2-[2-(3-Chlorophenyl)ethynyl]-1-methyl-5-(6-methyl-3-pyridyl)imidazole-4-carbonitrile (Int-87) (110 mg, 0.33 mmol) was dissolved in conc. sulfuric acid (2.0 mL, 98%, 37 mmol) and stirred at 25° C. for 1 h. After that, the pH was adjusted to around 8 by addition of 2 N aqueous solution of sodium hydroxide. A precipitate was formed which was filtered off, washed (tertbutyl methylether) and purified by preparative HPLC (Shim-pack C18, 150×25 mm×10 μm, eluting with acetonitrile/(water+0.225% formic acid), linear, optimized for substrate between 70:30 to 10:90 v/v) to yield, after lyophilization, the title compound as off-white solid (41 mg, 120 μmol, 35% yield). $^1$H NMR (400 MHz, DMSO-d6) δ ppm 2.55 (s, 3H), 3.62 (s, 3H), 7.09-7.18 (m, 1H), 7.38 (d, J=8.1 Hz, 1H), 7.48-7.56 (m, 2H), 7.56-7.61 (m, 1H), 7.65 (d, J=7.6 Hz, 1H), 7.78-7.84 (m, 2H), 8.51-8.55 (m, 1H). MS (ES+) m/z 350.8 [M+H].

Example 35

2-[2-(3-Chloro-2-methyl-phenyl)ethynyl]-1-methyl-5-(3-pyridyl)imidazole-4-carboxamide Formic Acid Salt

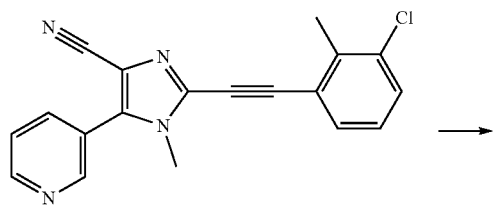

Int-88

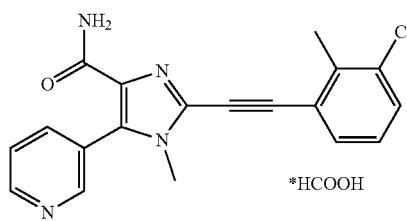

35

2-[2-(3-Chloro-2-methyl-phenyl)ethynyl]-1-methyl-5-(3-pyridyl)imidazole-4-carbonitrile (Int-88) (180 mg, 0.54 mmol) was dissolved in conc. sulfuric acid (1.0 mL, 98%, 18 mmol) and stirred at 0° C. for 1.5 h. After that, the pH was adjusted to around 8 by addition of 2 N aqueous solution of sodium hydroxide. A precipitate was formed which was filtered off, washed (tertbutyl methylether) and purified by preparative HPLC (Shim-pack C18, 150×25 mm×10 μm, eluting with acetonitrile/(water+0.225% formic acid), linear, optimized for substrate between 70:30 to 10:90 v/v) to yield, after lyophilization, the title compound as formate salt as white solid (36 mg, 90 μmol, 19% yield). $^1$H NMR (400 MHz, DMSO-d6) δ ppm 2.57 (s, 3H), 3.63 (s, 3H), 7.16 (br s, 1H), 7.34 (t, J=7.8 Hz, 1H), 7.50-7.67 (m, 4H), 7.94 (dt, J=7.9, 1.9 Hz, 1H), 8.64 (dd, J=1.6, 4.9 Hz, 1H), 8.68 (d, J=1.5 Hz, 1H). MS (ES+) m/z 351.0 [M+H].

Example 36

2-[2-(2-Chloro-3-methyl-4-pyridyl)ethynyl]-1-methyl-5-(3-pyridyl)imidazole-4-carboxamide Formic Acid Salt

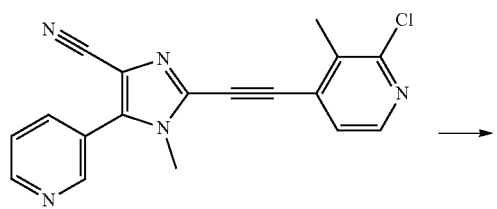

Int-89

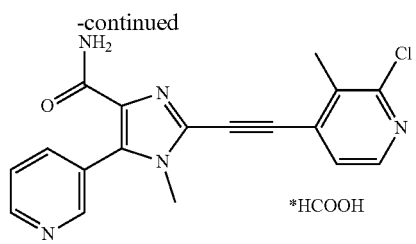

36

2-[2-(2-Chloro-3-methyl-4-pyridyl)ethynyl]-1-methyl-5-(3-pyridyl)imidazole-4-carbonitrile (Int-89) (50 mg, 0.15 mmol) was dissolved in conc. sulfuric acid (1.0 mL, 98%, 18 mmol) and stirred at 0° C. for 1 h. After that, the pH was adjusted to around 8 by addition of 2 N aqueous solution of sodium hydroxide. A precipitate was formed which was filtered off, washed (tertbutyl methylether) and purified by preparative HPLC (Shim-pack C18, 150×25 mm×10 μm, eluting with acetonitrile/(water+0.225% formic acid), linear, optimized for substrate between 70:30 to 10:90 v/v) to yield, after lyophilization, the title compound as formate salt as white solid (25 mg, 71 μmol, 47% yield). $^1$H NMR (400 MHz, DMSO-d6) δ ppm 2.57 (s, 3H), 3.65 (s, 3H), 7.20 (br s, 1H), 7.50-7.55 (m, 1H), 7.61 (br s, 1H), 7.67 (d, J=5.0 Hz, 1H), 7.95 (dt, J=8.0, 2.0 Hz, 1H), 8.35 (d, J=4.9 Hz, 1H), 8.65 (dd, J=4.9, 1.6 Hz, 1H), 8.67-8.69 (m, 1H). MS (ES+) m/z 351.8 [M+H].

Example 37

5-Methyl-4-(phenylethynyl)-1-(p-tolyl)-1H-imidazole-2-carboxamide

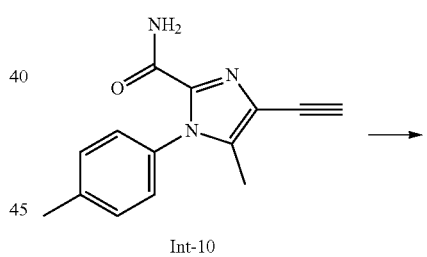

Int-10

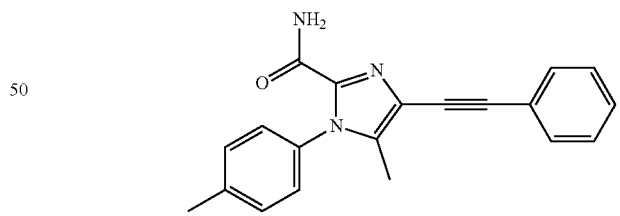

37

4-Ethynyl-5-methyl-1-(p-tolyl)-1H-imidazole-2-carboxamide (Int-10) (64 mg, 267 μmol) and iodobenzene (76.4 mg, 374 μmol) were dissolved in DMF (2 mL) and triethylamine (81 mg, 112 μL, 802 μmol) as well as bis(triphenylphosphine)palladium(II) dichloride (9.4 mg, 13 μmol) were added under argon at 0-5° C. The flask was evacuated and purged with argon. Then, copper (I) iodide (1.5 mg, 8.0 μmol) was added resulting in a light brown solution. The resulting mixture was stirred at 0-5° C. for 2 h. Then, the reaction mixture was extracted with water (20 mL) and dichloromethane (20 mL), the aqueous layer was backextracted with dichloromethane (2×20 mL). The combined organic layers were washed with water (50 mL) and brine (50 mL), dried (sodium sulfate), filtered, and the filtrate concentrated in vacuo. The crude product was purified by column chromatography (24 g, silica gel, ethyl acetate/n-heptane, gradient 0:100 to 40:60 (v/v)) to obtain the title compound as a white solid (26 mg, 82 µmol, 31% yield). HPLC (method LCMS_fastgradient) $t_R$=1.34 min. $^1$H NMR (300 MHz, CDCl$_3$) δ ppm 2.16 (s, 3H), 2.43 (s, 3H), 5.31 (br s, 1H), 7.11 (d, J=8.3 Hz, 2H), 7.17 (br s, 1H), 7.29 (d, J=7.9 Hz, 2H), 7.32-7.37 (m, 3H), 7.53-7.58 (m, 2H). MS (ES+) m/z 316.2 [M+H].

Example 38

4-[2-(2-Chloro-4-pyridyl)ethynyl]-5-methyl-1-(p-tolyl)imidazole-2-carboxamide

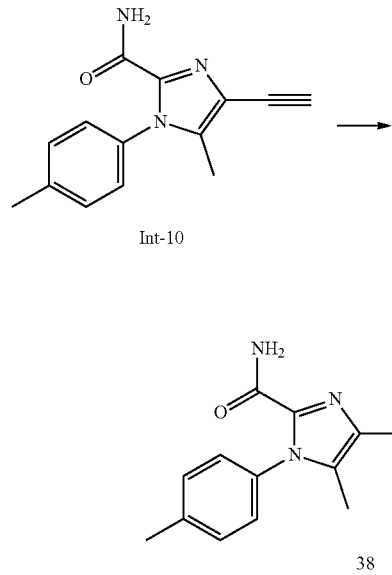

38

4-Ethynyl-5-methyl-1-(p-tolyl)-1H-imidazole-2-carboxamide (Int-10) (75 mg, 314 µmol) was dissolved in DMF (5 mL) and bis(triphenylphosphine)palladium(II) dichloride (11 mg, 15 µmol), copper(I) iodide (1.8 mg, 9 µmol), triethylamine (130 µL, 0.94 mmol) and 2-chloro-4-iodopyridine (83 mg, 0.34 mmol) were added. The resulting mixture was degassed with nitrogen, stirred at 0° C. for 3 h. After cooling, the mixture was filtered and the filtrate directly purified by preparative HPLC (Shim-pack C18, 150×25 mm×10 µm, eluting with acetonitrile/(water+0.225% formic acid), linear, optimized for substrate between 70:30 to 10:90 v/v), to give, after lyophilization, the title compound as a white solid (29 mg, 80 µmol, 25% yield). $^1$H NMR (400 MHz, DMSO-d$_6$) δ ppm 2.11 (s, 3H), 2.39 (s, 3H), 7.21 (d, J=8.2 Hz, 2H), 7.30 (d, J=8.1 Hz, 2H), 7.39 (br s, 1H), 7.53 (dd, J=1.3, 5.1 Hz, 1H), 7.69 (s, 1H), 7.89 (br s, 1H), 8.44 (d, J=5.1 Hz, 1H). MS (ES+) m/z 351.3, 353.2 [M+H, Cl isotopes].

Example 39

1-(4-Chlorophenyl)-4-((2-chloropyridin-4-yl)ethynyl)-5-methyl-1H-imidazole-2-carboxamide

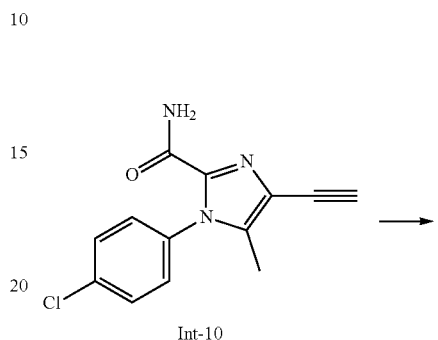

Int-10

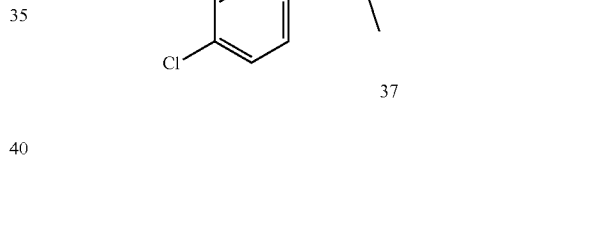

37

1-(4-Chlorophenyl)-4-ethynyl-5-methyl-1H-imidazole-2-carboxamide (Int-11) (55 mg, 212 µmol) and 2-chloro-4-iodopyridine (55.8 mg, 233 µmol) were dissolved in DMF (2 mL) and triethylamine (64 mg, 89 µL, 635 µmol) as well as bis(triphenylphosphine)-palladium(II) dichloride (12 mg, 17 µmol) were added under argon at 0-5° C. The flask was evacuated and purged with argon. Then, copper (I) iodide (1.6 mg, 8.5 µmol) was added resulting in a light brown solution. The resulting mixture was stirred at 0-5° C. for 2 h. Then, the reaction mixture was extracted with water (40 mL) and dichloromethane (50 mL), the aqueous layer was backextracted with dichloromethane (2×40 mL). The combined organic layers were washed with brine (30 mL), dried (sodium sulfate), filtered, and the filtrate concentrated in vacuo. The crude product was triturated with hot ethyl acetate (5 mL), after cooling the precipitate was filtered off, washed (ethyl acetate) and dried in vacuo to afford the title compound as off white solid (23 mg, 62 µmol, 29% yield). $^1$H NMR (600 MHz, trifluoroacetic acid) δ ppm 2.45 (s, 3H), 7.53 (d, J=6.6 Hz, 2H), 7.75 (d, J=7.7 Hz, 2H), 8.13 (br s, 1H), 8.18 (s, 1H), 8.84 (br s, 1H). MS (EI+) m/z 369.9, 371.9 [M+H, 2 Cl isotopes].

Example 40

1-(3-Chlorophenyl)-4-((2-chloropyridin-4-yl)ethynyl)-5-methyl-1H-imidazole-2-carboxamide

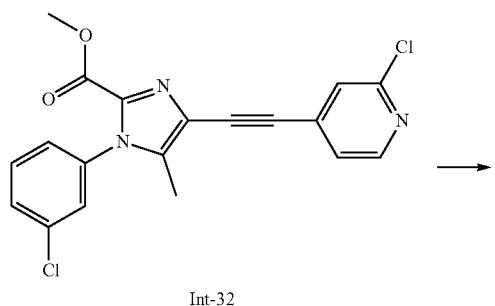

Int-32

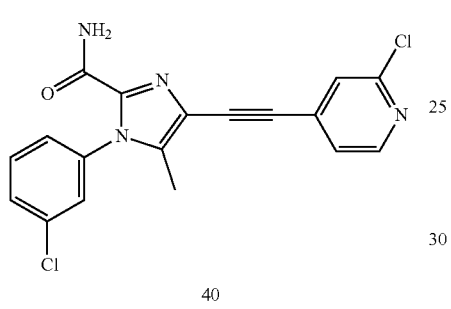

40

A solution of 1-(3-chloro-phenyl)-4-(2-chloro-pyridin-4-ylethynyl)-5-methyl-1H-imidazole-2-carboxylic acid methyl ester (Int-32) (110 mg, 285 µmol) in ammonia (7 N in MeOH) (3 mL, 21 mmol) was stirred for 16 h in a pressure tube at 90° C. After that, the reaction mixture was concentrated in vacuo, the residue was purified by column chromatography (20 g, silica gel functionalized with NH2, ethyl acetate/n-heptane, isocratic 50:50 (v/v)) to yield the title compound as an off-white solid (44 mg, 118 µmol, 42% yield). MS (ES+) m/z 370 [M+H].

Example 41

4-(2-Chloro-pyridin-4-ylethynyl)-1-(2,4-difluorophenyl)-5-methyl-1H-imidazole-2-carboxylic Acid Amide

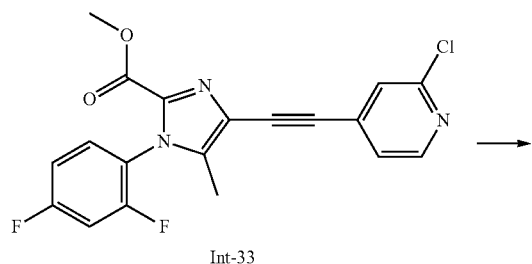

Int-33

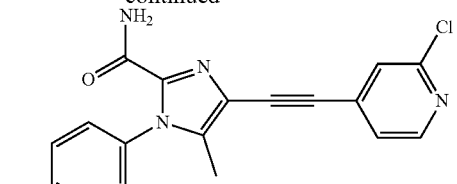

41

A solution of 4-(2-chloro-pyridin-4-yl-ethynyl)-1-(2,4-difluoro-phenyl)-5-methyl-1H-imidazole-2-carboxylic acid methyl ester (Int-33) (70 mg, 180 µmol) in ammonia (7 N in MeOH) (2.6 mL, 18 mmol) was stirred for 16 h in a pressure tube at 90° C. After that, the reaction mixture was concentrated in vacuo, the residue was purified by column chromatography (20 g, silica gel, ethyl acetate/n-heptane, gradient 0:100 to 33:67 (v/v)) to afford the title compound as an off-white solid (15 mg, 40 µmol, 22% yield). MS (ES+) m/z 373 [M+H].

Example 42

4-(2-Chloro-pyridin-4-ylethynyl)-1-(4-fluoro-phenyl)-1H-imidazole-2-carboxylic Acid Amide

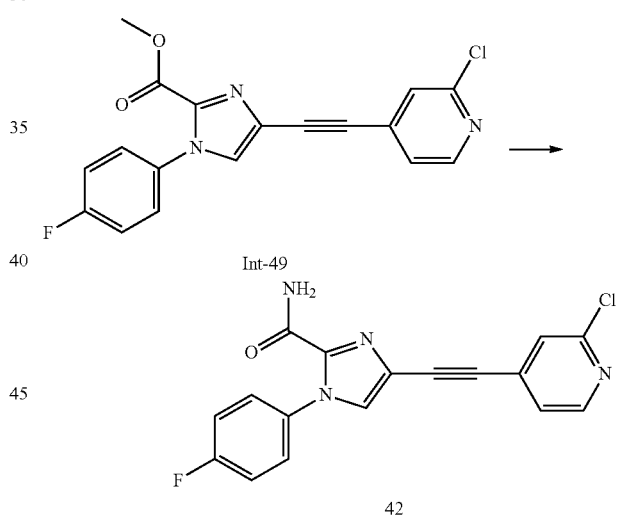

A suspension of methyl 4-((2-chloropyridin-4-yl)ethynyl)-1-(4-fluorophenyl)-1H-imidazole-2-carboxylate (Int-49) (100 mg, 197 µmol), sodium cyanide (1.4 mg, 28 µmol) in ammonia (7 N in MeOH) (2 mL, 14 mmol) was stirred for 15 h in a pressure tube at 50° C. After cooling, the reaction mixture was extracted with water (15 mL) and dichloromethane (30 mL), the aqueous layer was backextracted with dichloromethane (2×30 mL). The combined organic layers were washed with brine (15 mL), dried (sodium sulfate), filtered, and the filtrate concentrated in vacuo. The crude product was purified by trituration with dichloromethane (1.5 mL) at room temperature, filtration, followed by trituration with dichloromethane (1 mL) at reflux, filtration after stirring for 1 h at room temperature, and drying in vacuo to yield the title compound as an off-white solid (29 mg, 85 µmol, 43% yield). HPLC (method LCMS_fastgradient) $t_R$=1.12 min. $^1$H NMR (300 MHz, CDCl$_3$) δ ppm 7.29-7.36 (m, 2H), 7.46-7.54 (m, 3H), 7.58 (br s, 1H), 7.64-7.66 (m, 1H), 8.06 (s, 2H), 8.47 (dd, J=0.6, 5.2 Hz, 1H). MS (ES+) m/z 341.2, 343.2 [M+H, Cl isotopes].

Example 43

4-((2-Chloropyridin-4-yl)ethynyl)-1-(6-methylpyridin-3-yl)-1H-imidazole-2-carboxamide

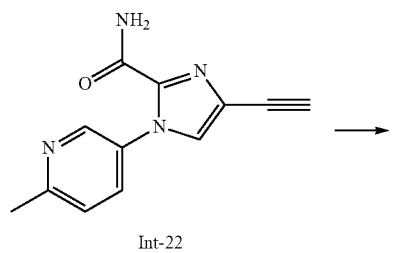

Int-22

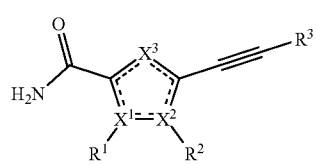

43

4-Ethynyl-1-(6-methylpyridin-3-yl)-1H-imidazole-2-carboxamide (Int-22) (95 mg, 420 µmol) and 2-chloro-4-iodopyridine (111 mg, 462 µmol) were dissolved in DMF (3.5 mL) and triethylamine (127 mg, 176 µL, 1.26 mmol) as well as bis(triphenylphosphine)-palladium(II) dichloride (24 mg, 34 µmol) were added under argon at 0-5° C. The flask was evacuated and purged with argon. Then, copper (I) iodide (3.2 mg, 17 µmol) was added resulting in a light brown solution. The resulting mixture was stirred at 0-5° C. for 1 h. Then, the reaction mixture was extracted with water (40 mL) and dichloromethane (50 mL), the aqueous layer was backextracted with dichloromethane (2×40 mL). The combined organic layers were washed with brine (30 mL), dried (sodium sulfate), filtered, and the filtrate concentrated in vacuo. The crude product was purified by trituration with dichloromethane (5 mL) at reflux, filtration after cooling, followed by trituration with ethanol (5 mL) at 50° C., filtration after cooling, and drying at high vacuum to afford the title compound as an off-white solid (80 mg, 237 µmol, 56% yield). HPLC (method LCMS_fastgradient) $t_R$=0.93 min. $^1$H NMR (300 MHz, DMSO-d$_6$) δ ppm 2.54 (s, 3H), 7.38 (d, J=8.5 Hz, 1H), 7.52 (dd, J=1.3, 5.1 Hz, 1H), 7.61 (br s, 1H), 7.65 (s, 1H), 7.80 (dd, J=2.6, 8.3 Hz, 1H), 8.10 (s, 2H), 8.47 (d, J=4.8 Hz, 1H), 8.50 (d, J=2.4 Hz, 1H). MS (ES+) m/z 338.2, 340.2 [M+H, Cl isotopes].

Example 44

2-[2-(3-Chloro-2-methyl-phenyl)ethynyl]-1-methyl-5-(6-methyl-3-pyridyl)imidazole-4-carboxamide

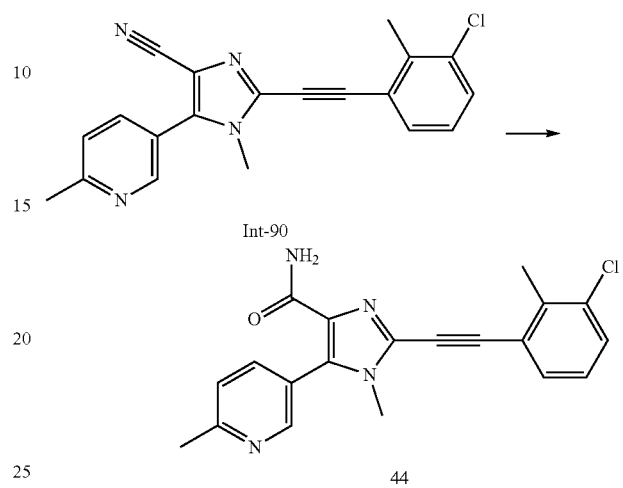

2-[2-(3-Chloro-2-methyl-phenyl)ethynyl]-1-methyl-5-(6-methyl-3-pyridyl)imidazole-4-carbonitrile (Int-90) (100 mg, 0.29 mmol) was dissolved in conc. sulfuric acid (2.0 mL, 98%, 36 mmol) and stirred at 0° C. for 2 h. After that, the pH was adjusted to around 8 by addition of 2 N aqueous solution of sodium hydroxide. A precipitate was formed which was filtered off, washed (tertbutyl methylether) and purified by preparative HPLC (Shim-pack CIS, 150×25 mm×10 µm, eluting with acetonitrile/(water+0.225% formic acid), linear, optimized for substrate between 70:30 to 10:90 v/v) to yield, after lyophilization, the title compound as white solid (20 mg, 50 µmol, 19% yield). $^1$H NMR (400 MHz, DMSO-d$_6$) δ ppm 2.54 (s, 3H), 2.57 (s, 3H), 3.61 (s, 3H), 7.12 (br s, 1H), 7.33 (dd, J=8.1, 8.1 Hz, 1H), 7.37 (d, J=8.1 Hz, 1H), 7.55 (br s, 1H), 7.56-7.59 (m, 1H), 7.61-7.65 (m, 1H), 7.81 (dd, J=2.2, 8.0 Hz, 1H). MS (ES+) m/z 364.9, 366.9 [M+H, Cl isotopes].

ASPECTS OF THE PRESENT INVENTION

1. A compound of formula I

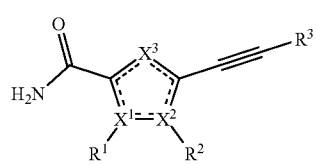

I wherein
X$^1$ is either N or C
X$^2$ is either N or C
X$^3$ is either N or C
provided that at least one of X$^1$, X$^2$ and X$^3$ is N and that no more than two of X$^1$, X$^2$ and X$^3$ represent N and that if X$^1$ is N then X$^2$ can not be N;
the dotted lines represent a single or double bond, to enable the five membered rings to be aromatic;

R¹ is phenyl, N-heteroaryl, wherein said N-heteroaryl comprises 1, 2 or 3 nitrogen ring atoms and wherein said phenyl or said N-heteroaryl are optionally substituted with 1, 2, 3 or 4 substituents selected from R⁴;

R² is hydrogen or $C_1$-$C_6$ alkyl, with the proviso that if X² is N then R² is not hydrogen;

R³ is a heteroaryl or a phenyl, wherein said heteroaryl or said phenyl are optionally substituted with 1, 2, 3 or 4 substituents selected from R⁵;

R⁴ is independently selected from halogen, $C_1$-$C_6$ alkyl, $C_1$-$C_6$ alkoxy, cyano, halo$C_1$-$C_6$ alkyl and halo$C_1$-$C_6$ alkoxy; and R⁵ is independently selected from hydroxy, halogen, cyano, $C_1$-$C_6$ alkyl, $C_1$-$C_6$ alkoxy, halo$C_1$-$C_6$ alkyl and halo$C_1$-$C_6$ alkoxy, or where two vicinal R⁵ groups form a five-membered or six-membered heterocyclyl fused ring, where the heterocyclyl fused ring is optionally substituted with one or more groups independently selected from— hydroxy, halogen, $C_1$-$C_6$ alkyl, $C_1$-$C_6$ alkoxy, halo$C_1$-$C_6$ alkyl and halo$C_1$-$C_6$ alkoxy; or pharmaceutically acceptable salts thereof.

2. The compound according to aspect 1 wherein the compound is of formula Ia

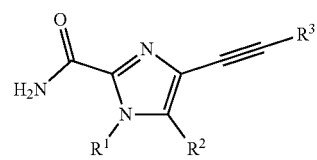

Ia wherein R¹, R² or R³ are defined according to aspect 1 or pharmaceutically acceptable salts thereof.

3. The compound according to aspect 1 wherein the compound is of formula Ib

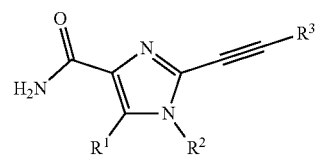

Ib wherein R¹, R² or R³ are defined according to aspect 1 or pharmaceutically acceptable salts thereof 4. The compound according to aspect 1 wherein the compound is of formula Ic

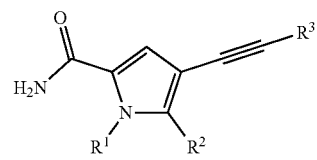

Ic wherein R¹, R² or R³ are defined according to aspect 1 or pharmaceutically acceptable salts thereof.

5. The compound according to any one of aspects 1 to 4, wherein R¹ is phenyl, pyrazinyl, pyridazinyl, pyrimidinyl or pyridinyl wherein said phenyl, said pyrazinyl, said pyridazinyl, said pyrimidinyl or said pyridinyl are optionally substituted with 1, 2, 3 or 4 substituents selected from R⁴, wherein R⁴ is defined according to aspect 1.

6. The compound according to any one of aspects 1 to 5, wherein R¹ is phenyl, pyrazinyl, pyridazinyl or pyridinyl wherein said phenyl, said pyrazinyl, said pyridazinyl or said pyridinyl are optionally substituted with 1, 2 or 3 substituents selected from R⁴, wherein R⁴ is defined according to aspect 1.

7. The compound according to any one of aspects 1 to 4, wherein R¹ is phenyl, pyrazinyl, pyridazinyl or pyridinyl wherein said phenyl, said pyrazinyl, said pyridazinyl or said pyridinyl are optionally substituted with 1 or 2 substituents selected from R⁴, wherein R⁴ is defined according to aspect 1.

8. The compound according to any one of aspects 1 to 7, wherein R² is $C_1$-$C_6$ alkyl.

9. The compound according to any one of aspects 1 to 8, wherein R² is methyl.

10. The compound according to any one of aspects 1 to 9, wherein R³ is a phenyl, pyrazolyl, pyridinyl, pyrimidinyl or thiophenyl, wherein said phenyl, said pyrazolyl, said pyridinyl, said pyrimidinyl or said thiophenyl are optionally substituted with 1, 2, 3 or 4 substituents selected from R⁵, wherein R⁵ is defined according to aspect 1.

11. The compound according to any one of aspects 1 to 10, wherein R³ is a phenyl, pyrazolyl, pyridinyl, pyrimidinyl or thiophenyl, wherein said phenyl, said pyrazolyl, said pyridinyl, said pyrimidinyl or said thiophenyl are optionally substituted with 1, 2 or 3 substituents selected from R⁵, wherein R⁵ is defined according to aspect 11.

12. The compound according to any one of aspects 1 to 11, wherein R³ is a phenyl, pyrazolyl, pyridinyl, pyrimidinyl or thiophenyl, wherein said phenyl, said pyrazolyl, said pyridinyl, said pyrimidinyl or said thiophenyl are optionally substituted with 1 or 2 substituents selected from R⁵, wherein R⁵ is defined according to aspect 1.

13. The compound according to any one of aspects 1 to 12, wherein R³ is a phenyl, pyridinyl or thiophenyl, wherein said phenyl, said pyridinyl said thiophenyl are optionally substituted with substituted with 1 or 2 substituents selected from R⁵, wherein R⁵ is defined according to aspect 1.

14. The compound according to any one of aspects 1 to 13, wherein from R⁴ is independently selected from halogen, $C_1$-$C_6$ alkyl and $C_1$-$C_6$ alkoxy.

15. The compound according to any one of aspects 1 to 14, wherein R⁴ is independently selected from halogen, methyl and methoxy.

16. The compound according to any one of aspects 1 to 15, wherein R⁴ is independently selected from fluoro, chloro, methyl and methoxy.

17. The compound according to any one of aspects 1 to 13, wherein R¹ is phenyl, pyrazinyl, pyridazinyl, pyrimidinyl or pyridinyl.

18. The compound according to any one of aspects 1 to 13, wherein R¹ is phenyl, pyrazinyl, pyridazinyl or pyridinyl.

19. The compound according to any one of aspects 1 to 18, wherein R⁵ is independently selected from halogen, cyano, $C_1$-$C_6$ alkyl, halo$C_1$-$C_6$ alkyl and $C_1$-$C_6$ alkoxy, or where two vicinal R⁵ groups form a five-membered or six-membered heterocyclyl fused ring, where the heterocyclyl fused ring is optionally substituted with one or more groups independently selected from—hydroxy, halogen, $C_1$-$C_6$ alkyl, $C_1$-$C_6$ alkoxy, halo$C_1$-$C_6$ alkyl and halo$C_1$-$C_6$ alkoxy.

20. The compound according to any one of aspects 1 to 19, wherein $R^5$ is independently selected from halogen, cyano, methyl, trifluoromethyl and methoxy, or where two vicinal $R^5$ groups from dioxolanyl.

21. The compound according to any one of aspects 1 to 13, selected from:

4-((2-Chloro-3-methylpyridin-4-yl)ethynyl)-5-methyl-1-(6-methylpyridin-3-yl)-1H-imidazole-2-carboxamide 4-((2-Chloro-3-fluoropyridin-4-yl)ethynyl)-5-methyl-1-(6-methylpyridin-3-yl)-1H-imidazole-2-carboxamide 4-[2-(5-Chlorothiophen-3-yl)ethynyl]-5-methyl-1-(6-methylpyridin-3-yl)imidazole-2-carboxamide 4-[2-(3-Chlorophenyl)ethynyl]-5-methyl-1-(6-methyl-3-pyridyl)imidazole-2-carboxamide 4-((3-Cyanophenyl)ethynyl)-5-methyl-1-(6-methylpyridin-3-yl)-1H-imidazole-2-carboxamide 4-(2-Chloro-pyridin-4-ylethynyl)-5-methyl-1-(6-methyl-pyridin-3-yl)-1H-imidazole-2-carboxylic acid amide 4-((2-Chloro-5-fluoropyridin-4-yl)ethynyl)-5-methyl-1-(6-methylpyridin-3-yl)-1H-imidazole-2-carboxamide 4-((3-Methoxyphenyl)ethynyl)-5-methyl-1-(6-methylpyridin-3-yl)-1H-imidazole-2-carboxamide 4-[2-(4-Chlorophenyl)ethynyl]-5-methyl-1-(6-methyl-3-pyridyl)imidazole-2-carboxamide 5-Methyl-1-(6-methylpyridin-3-yl)-4-(m-tolylethynyl)-1H-imidazole-2-carboxamide 5-Methyl-1-(6-methylpyridin-3-yl)-4-((2-(trifluoromethyl)pyridin-4-yl)ethynyl)-1H-imidazole-2-carboxamide 4-[2-(2-Fluoro-4-pyridyl)ethynyl]-5-methyl-1-(6-methyl-3-pyridyl)imidazole-2-carboxamide 4-(Benzo[d][1,3]dioxol-4-ylethynyl)-5-methyl-1-(6-methylpyridin-3-yl)-1H-imidazole-2-carboxamide 4-((6-Chloropyridin-2-yl)ethynyl)-5-methyl-1-(6-methylpyridin-3-yl)-1H-imidazole-2-carboxamide 4-((2-Chloropyrimidin-4-yl)ethynyl)-5-methyl-1-(6-methylpyridin-3-yl)-1H-imidazole-2-carboxamide 4-((3-Fluoropyridin-4-yl)ethynyl)-5-methyl-1-(6-methylpyridin-3-yl)-1H-imidazole-2-carboxamide 4-[2-(5-Chloro-3-pyridyl)ethynyl]-5-methyl-1-(6-methyl-3-pyridyl)imidazole-2-carboxamide 4-((4-Chloropyridin-2-yl)ethynyl)-5-methyl-1-(6-methylpyridin-3-yl)-1H-imidazole-2-carboxamide 4-((6-Chloropyrimidin-4-yl)ethynyl)-5-methyl-1-(6-methylpyridin-3-yl)-1H-imidazole-2-carboxamide 5-Methyl-1-(6-methyl-3-pyridyl)-4-[2-(3-pyridyl)ethynyl]imidazole-2-carboxamide 5-Methyl-1-(6-methyl-3-pyridyl)-4-[2-(4-pyridyl)ethynyl]imidazole-2-carboxamide 5-Methyl-1-(6-methylpyridin-3-yl)-4-((2-methylpyridin-4-yl)ethynyl)-1H-imidazole-2-carboxamide 4-[2-(2-Chloro-3-methyl-4-pyridyl)ethynyl]-5-methyl-1-(5-methylpyrazin-2-yl)imidazole-2-carboxamide 4-[2-(2-Chloro-3-methyl-4-pyridyl)ethynyl]-5-methyl-1-(6-methylpyridazin-3-yl)imidazole-2-carboxamide 4-[2-(2-Chloro-3-methyl-4-pyridyl)ethynyl]-5-methyl-1-(5-methyl-3-pyridyl)imidazole-2-carboxamide 4-[2-(2-Chloro-3-methyl-4-pyridyl)ethynyl]-1-(6-chloro-3-pyridyl)-5-methyl-imidazole-2-carboxamide 4-[2-(2-Chloro-3-methyl-4-pyridyl)ethynyl]-1-(6-methoxy-3-pyridyl)-5-methyl-imidazole-2-carboxamide 4-[2-(2-Chloro-3-methyl-4-pyridyl)ethynyl]-5-methyl-1-(5-methyl-2-pyridyl)imidazole-2-carboxamide 4-[2-(2-Chloro-3-methyl-4-pyridyl)ethynyl]-5-methyl-1-(3-pyridyl)imidazole-2-carboxamide 4-[2-(3-Chloro-2-methyl-phenyl)ethynyl]-5-methyl-1-(3-pyridyl)imidazole-2-carboxamide 4-[2-(2-Chloro-4-pyridyl)ethynyl]-5-methyl-1-(6-methyl-3-pyridyl)pyrrole-2-carboxamide 2-[2-(2-Chloro-4-pyridyl)ethynyl]-1-methyl-5-(6-methyl-3-pyridyl)imidazole-4-carboxamide 2-[2-(3-Chloro-2-methyl-phenyl)ethynyl]-1-methyl-5-(6-methyl-3-pyridyl)imidazole-4-carboxamide 2-[2-(3-Chlorophenyl)ethynyl]-1-methyl-5-(6-methyl-3-pyridyl)imidazole-4-carboxamide 2-[2-(3-Chloro-2-methyl-phenyl)ethynyl]-1-methyl-5-(3-pyridyl)imidazole-4-carboxamide formic acid salt 2-[2-(2-Chloro-3-methyl-4-pyridyl)ethynyl]-1-methyl-5-(3-pyridyl)imidazole-4-carboxamide formic acid salt 5-Methyl-4-(phenylethynyl)-1-(p-tolyl)-1H-imidazole-2-carboxamide 4-[2-(2-Chloro-4-pyridyl)ethynyl]-5-methyl-1-(p-tolyl)imidazole-2-carboxamide 1-(4-Chlorophenyl)-4-((2-chloropyridin-4-yl)ethynyl)-5-methyl-1H-imidazole-2-carboxamide 1-(3-Chlorophenyl)-4-((2-chloropyridin-4-yl)ethynyl)-5-methyl-1H-imidazole-2-carboxamide 4-(2-Chloro-pyridin-4-ylethynyl)-1-(2,4-difluoro-phenyl)-5-methyl-1H-imidazole-2-carboxylic acid amide 4-(2-Chloro-pyridin-4-ylethynyl)-1-(4-fluoro-phenyl)-1H-imidazole-2-carboxylic acid amide 4-((2-Chloropyridin-4-yl)ethynyl)-1-(6-methylpyridin-3-yl)-1H-imidazole-2-carboxamide; and 2-[2-(3-Chloro-2-methyl-phenyl)ethynyl]-1-methyl-5-(6-methyl-3-pyridyl)imidazole-4-carboxamide.

22. A compound according to any one of aspects 1 to 21 for use as a therapeutically active substance.

23. Pharmaceutical compositions comprising compounds of formula I according to any of aspect 1 to 21 or their pharmaceutically acceptable salts and one or more pharmaceutically acceptable excipients.

24. Compounds of formula I according to any of aspects 1 to 21 or their pharmaceutically acceptable salts above for use as therapeutically active substances.

25. Compounds of formula I according to any of aspects 1 to 21 or their pharmaceutically acceptable salts for the use in the treatment, prevention and/or delay of progression of CNS disorder.

26. A method for the treatment or prevention of CNS disorder, which method comprises administering compounds of formula I according to any of aspects 1 to 21 or their pharmaceutically acceptable salts as defined above to a subject.

27. The use of compounds of formula I according to any of aspects 1 to 21 or their pharmaceutically acceptable salts for the treatment, prevention and/or delay of progression of CNS disorder.

28. A HCN1 selective compound for use in the treatment, prevention and/or delay of progression of CNS disorder.

29. The HCN1 selective compound according to aspect 28, wherein the HCN1 selective compound is selective over HCN2 and HCN4.

30. The HCN1 selective compound according to aspect 28 or 29 wherein the CNS disorder is selected from the group consisting of psychiatric, neurological, neurodevelopmental, neurodegenerative, mood, motivational, metabolic, cardiovascular, renal, ophthalmic, endocrine, and/or other disorders described herein including schizophrenia (e.g., cognitive impairment and negative symptoms in schizophrenia), cognitive impairment associated with D2 antagonist therapy, ADHD, impulsivity, autism spectrum disorder, mild cognitive impairment (MCI), age-related cognitive decline, Alzheimer's dementia, Parkinson's disease, Huntington's chorea, depression, anxiety, treatment-resistant depression (TRD), bipolar disorder, chronic apathy, anhedonia, chronic fatigue, post-traumatic stress disorder, seasonal affective disorder, social anxiety disorder, postpartum depression, serotonin syndrome, substance abuse and drug dependence, Tourette's syndrome, tardive dyskinesia, drowsiness, sexual dysfunction, migraine, systemic lupus erythematosus (SLE), hyperglycemia, dislipidemia, obesity, diabetes, sepsis, post-ischemic tubular necrosis, renal failure, resistant edema, narcolepsy, hypertension, congestive heart failure, postoperative ocular hypotonia, sleep disorders, pain, cognitive impairments associated with schizophrenia (CIAS), early infantile epileptic encephalopathies (EIEE), epilepsy, mood disorders (e.g. depression), neuropathic pain, and autism (sensory sensitivity), more particularly cognitive impairments associated with schizophrenia (CIAS), early infantile epileptic encephalopathies (EIEE), epilepsy, mood disorders (e.g. depression), neuropathic pain, and autism (sensory sensitivity).

31. The HCN1 selective compound according to aspect 28 to 30 wherein the CNS disorder is cognitive impairments associated with schizophrenia.

32. The HCN1 selective compound according to aspect 28 to 31 for use in the treatment of cognitive impairments associated with schizophrenia.

What is claimed is:

1. A compound of formula I or a pharmaceutically acceptable salt thereof

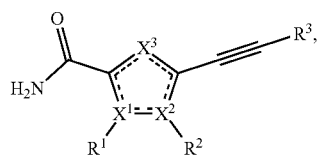

wherein
X$^1$ is either N or C,
X$^2$ is either N or C, and
X$^3$ is either N or C,
provided that
at least one of X$^1$, X$^2$ and X$^3$ is N,
no more than two of X$^1$, X$^2$ and X$^3$ are N, and
if X$^1$ is N, then X$^2$ is not N, and
wherein the dotted lines represent a single or double bond to enable the five-membered ring to be aromatic;
R$^1$ is phenyl or N-heteroaryl, wherein said N-heteroaryl comprises 1, 2 or 3 nitrogen ring atoms, and wherein each of said phenyl or said N-heteroaryl are optionally substituted with 1, 2, 3 or 4 substituents selected from R$^4$, wherein each of R$^4$ is independently selected from halogen, C$_1$-C$_6$alkyl, C$_1$-C$_6$alkoxy, cyano, haloC$_1$-C$_6$alkyl and haloC$_1$-C$_6$alkoxy;
R$^2$ is hydrogen or C$_1$-C$_6$alkyl, provided that if X$^2$ is N, then R$^2$ is not hydrogen; and
R$^3$ is heteroaryl or phenyl, wherein each of said heteroaryl or said phenyl are optionally substituted with 1, 2, 3 or 4 substituents selected from R$^5$, wherein each of R$^5$ is independently selected from hydroxy, halogen, cyano, C$_1$-C$_6$alkyl, C$_1$-C$_6$alkoxy, haloC$_1$-C$_6$alkyl and haloC$_1$-C$_6$alkoxy, or
wherein two vicinal R$^5$ groups form a five-membered or six-membered heterocyclyl fused with R$_3$, wherein the heterocyclyl is optionally substituted with one or more groups independently selected from hydroxy, halogen, C$_1$-C$_6$alkyl, C$_1$-Calkoxy, haloC$_1$-C$_6$alkyl and haloC$_1$-C$_6$alkoxy.

2. The compound according to claim 1, wherein the compound is of formula Ia

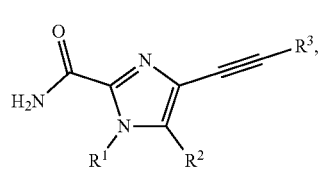

or pharmaceutically acceptable salts thereof.

3. The compound according to claim 1, wherein the compound is of formula Ib

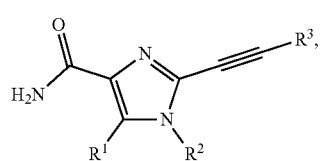

or pharmaceutically acceptable salts thereof.

4. The compound according to claim 1, wherein the compound is of formula Ic

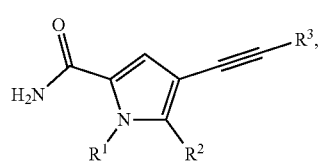

or pharmaceutically acceptable salts thereof.

5. The compound according to claim 1 or a pharmaceutically acceptable salt thereof, wherein R$^1$ is phenyl, pyrazinyl, pyridazinyl, pyrimidinyl or pyridinyl.

6. The compound according to claim 1 or a pharmaceutically acceptable salt thereof, wherein R$^1$ is phenyl, pyrazinyl, pyridazinyl or pyridinyl, wherein said phenyl, said pyrazinyl, said pyridazinyl or said pyridinyl are optionally substituted with 1 or 2 substituents selected from R$^4$.

7. The compound according to claim 1 or a pharmaceutically acceptable salt thereof, wherein each R$^4$ is independently selected from halogen, C$_1$-C$_6$alkyl and C$_1$-C$_6$alkoxy.

8. The compound according to claim 1 or a pharmaceutically acceptable salt thereof, wherein each R$^4$ is independently selected from fluoro, chloro, methyl and methoxy.

9. The compound according to claim 1 or a pharmaceutically acceptable salt thereof, wherein R$^2$ is C$_1$-C$_6$ alkyl.

10. The compound according to claim 1 or a pharmaceutically acceptable salt thereof, wherein R$^2$ is methyl.

11. The compound according to claim 1 or a pharmaceutically acceptable salt thereof, wherein $R^3$ is phenyl, pyrazolyl, pyridinyl, pyrimidinyl or thiophenyl, wherein said phenyl, said pyrazolyl, said pyridinyl, said pyrimidinyl or said thiophenyl are optionally substituted with 1 or 2 substituents selected from $R^5$.

12. The compound according to claim 1 or a pharmaceutically acceptable salt thereof, wherein each $R^5$ is independently selected from halogen, cyano, methyl, trifluoromethyl and methoxy, or wherein two vicinal $R^5$ groups form dioxolanyl.

13. The compound according to claim 1 or a pharmaceutically acceptable salt thereof, wherein $R^1$ and $R^3$ are each independently phenyl or pyridinyl.

14. The compound according to claim 1 or a pharmaceutically acceptable salt thereof, wherein said compound is selected from:

4-((2-Chloro-3-methylpyridin-4-yl)ethynyl)-5-methyl-1-(6-methylpyridin-3-yl)-1H-imidazole-2-carboxamide;
4-((2-Chloro-3-fluoropyridin-4-yl)ethynyl)-5-methyl-1-(6-methylpyridin-3-yl)-1H-imidazole-2-carboxamide;
4-[2-(5-Chlorothiophen-3-yl)ethynyl]-5-methyl-1-(6-methylpyridin-3-yl)imidazole-2-carboxamide;
4-[2-(3-Chlorophenyl)ethynyl]-5-methyl-1-(6-methyl-3-pyridyl)imidazole-2-carboxamide;
4-((3-Cyanophenyl)ethynyl)-5-methyl-1-(6-methylpyridin-3-yl)-1H-imidazole-2-carboxamide;
4-(2-Chloro-pyridin-4-ylethynyl)-5-methyl-1-(6-methylpyridin-3-yl)-1H-imidazole-2-carboxylic acid amide;
4-((2-Chloro-5-fluoropyridin-4-yl)ethynyl)-5-methyl-1-(6-methylpyridin-3-yl)-1H-imidazole-2-carboxamide;
4-((3-Methoxyphenyl)ethynyl)-5-methyl-1-(6-methylpyridin-3-yl)-1H-imidazole-2-carboxamide;
4-[2-(4-Chlorophenyl)ethynyl]-5-methyl-1-(6-methyl-3-pyridyl)imidazole-2-carboxamide;
5-Methyl-1-(6-methylpyridin-3-yl)-4-(m-tolylethynyl)-1H-imidazole-2-carboxamide;
5-Methyl-1-(6-methylpyridin-3-yl)-4-((2-(trifluoromethyl)pyridin-4-yl)ethynyl)-1H-imidazole-2-carboxamide;
4-[2-(2-Fluoro-4-pyridyl)ethynyl]-5-methyl-1-(6-methyl-3-pyridyl)imidazole-2-carboxamide;
4-(Benzo[d][1,3]dioxol-4-ylethynyl)-5-methyl-1-(6-methylpyridin-3-yl)-1H-imidazole-2-carboxamide;
4-((6-Chloropyridin-2-yl)ethynyl)-5-methyl-1-(6-methylpyridin-3-yl)-1H-imidazole-2-carboxamide;
4-((2-Chloropyrimidin-4-yl)ethynyl)-5-methyl-1-(6-methylpyridin-3-yl)-1H-imidazole-2-carboxamide;
4-((3-Fluoropyridin-4-yl)ethynyl)-5-methyl-1-(6-methylpyridin-3-yl)-1H-imidazole-2-carboxamide;
4-[2-(5-Chloro-3-pyridyl)ethynyl]-5-methyl-1-(6-methyl-3-pyridyl)imidazole-2-carboxamide;
4-((4-Chloropyridin-2-yl)ethynyl)-5-methyl-1-(6-methylpyridin-3-yl)-1H-imidazole-2-carboxamide;
4-((6-Chloropyrimidin-4-yl)ethynyl)-5-methyl-1-(6-methylpyridin-3-yl)-1H-imidazole-2-carboxamide;
5-Methyl-1-(6-methyl-3-pyridyl)-4-[2-(3-pyridyl)ethynyl]imidazole-2-carboxamide;
5-Methyl-1-(6-methyl-3-pyridyl)-4-[2-(4-pyridyl)ethynyl]imidazole-2-carboxamide;
5-Methyl-1-(6-methylpyridin-3-yl)-4-((2-methylpyridin-4-yl)ethynyl)-1H-imidazole-2-carboxamide;
4-[2-(2-Chloro-3-methyl-4-pyridyl)ethynyl]-5-methyl-1-(5-methylpyrazin-2-yl)imidazole-2-carboxamide;
4-[2-(2-Chloro-3-methyl-4-pyridyl)ethynyl]-5-methyl-1-(6-methylpyridazin-3-yl)imidazole-2-carboxamide;
4-[2-(2-Chloro-3-methyl-4-pyridyl)ethynyl]-5-methyl-1-(5-methyl-3-pyridyl)imidazole-2-carboxamide;
4-[2-(2-Chloro-3-methyl-4-pyridyl)ethynyl]-1-(6-chloro-3-pyridyl)-5-methyl-imidazole-2-carboxamide;
4-[2-(2-Chloro-3-methyl-4-pyridyl)ethynyl]-1-(6-methoxy-3-pyridyl)-5-methyl-imidazole-2-carboxamide;
4-[2-(2-Chloro-3-methyl-4-pyridyl)ethynyl]-5-methyl-1-(5-methyl-2-pyridyl)imidazole-2-carboxamide;
4-[2-(2-Chloro-3-methyl-4-pyridyl)ethynyl]-5-methyl-1-(3-pyridyl)imidazole-2-carboxamide;
4-[2-(3-Chloro-2-methyl-phenyl)ethynyl]-5-methyl-1-(3-pyridyl)imidazole-2-carboxamide;
4-[2-(2-Chloro-4-pyridyl)ethynyl]-5-methyl-1-(6-methyl-3-pyridyl)pyrrole-2-carboxamide;
2-[2-(2-Chloro-4-pyridyl)ethynyl]-1-methyl-5-(6-methyl-3-pyridyl)imidazole-4-carboxamide;
2-[2-(3-Chloro-2-methyl-phenyl)ethynyl]-1-methyl-5-(6-methyl-3-pyridyl)imidazole-4-carboxamide;
2-[2-(3-Chlorophenyl)ethynyl]-1-methyl-5-(6-methyl-3-pyridyl)imidazole-4-carboxamide;
2-[2-(3-Chloro-2-methyl-phenyl)ethynyl]-1-methyl-5-(3-pyridyl)imidazole-4-carboxamide formic acid salt;
2-[2-(2-Chloro-3-methyl-4-pyridyl)ethynyl]-1-methyl-5-(3-pyridyl)imidazole-4-carboxamide formic acid salt;
5-Methyl-4-(phenylethynyl)-1-(p-tolyl)-1H-imidazole-2-carboxamide;
4-[2-(2-Chloro-4-pyridyl)ethynyl]-5-methyl-1-(p-tolyl)imidazole-2-carboxamide;
1-(4-Chlorophenyl)-4-((2-chloropyridin-4-yl)ethynyl)-5-methyl-1H-imidazole-2-carboxamide;
1-(3-Chlorophenyl)-4-((2-chloropyridin-4-yl)ethynyl)-5-methyl-1H-imidazole-2-carboxamide;
4-(2-Chloro-pyridin-4-ylethynyl)-1-(2,4-difluoro-phenyl)-5-methyl-1H-imidazole-2-carboxylic acid amide;
4-(2-Chloro-pyridin-4-ylethynyl)-1-(4-fluoro-phenyl)-1H-imidazole-2-carboxylic acid amide;
4-((2-Chloropyridin-4-yl)ethynyl)-1-(6-methylpyridin-3-yl)-1H-imidazole-2-carboxamide; and
2-[2-(3-Chloro-2-methyl-phenyl)ethynyl]-1-methyl-5-(6-methyl-3-pyridyl)imidazole-4-carboxamide.

15. A pharmaceutical composition comprising a compound of formula I according to claim 1 or a pharmaceutically acceptable salt thereof, and one or more pharmaceutically acceptable excipients.

16. A method for the treatment of a disorder mediated by HCN1 in a subject in need thereof, said method comprises administering to said subject a therapeutically effective amount of a compound of formula I according to claim 1 or a pharmaceutically acceptable salt thereof.

17. The method of claim 16, wherein the disorder mediated by HCN1 is a central nervous system (CNS) disorder.

18. The method according to claim 17, wherein the treatment delays progression of the CNS disorder.

19. The method according to claim 18, wherein the CNS disorder is selected from the group consisting of cognitive impairments associated with schizophrenia, early infantile epileptic encephalopathies, epilepsy, mood disorders, depression, neuropathic pain, and autism.

20. The method according to claim 19, wherein the CNS disorder is cognitive impairments associated with schizophrenia.

21. A method of preparing a compound of formula I according to claim 1 or a pharmaceutically acceptable salt thereof, said method comprising reacting a compound of formula IVa with a compound of $R^3$—Y in the presence of a transition metal complex and a base to form the compound of formula I

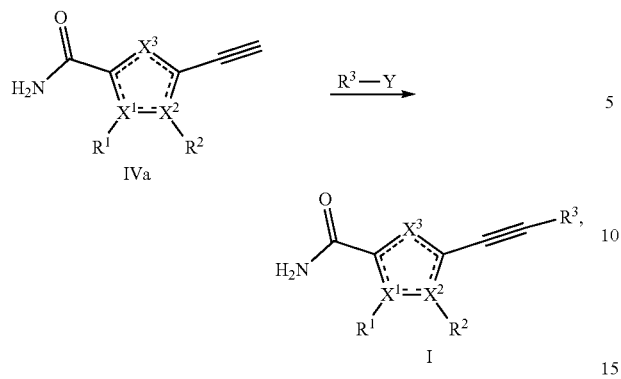

wherein $R^1$, $R^2$, $R^3$, $X^1$, $X^2$ and $X^3$ are as defined in claim 1, and Y is halogen.

22. The method of claim 21, wherein Y is bromine or iodine.

23. The method of claim 21, wherein the transition metal complex is bis(triphenylphosphine)palladium(II) dichloride, or 1,1'-bis(diphenylphosphino) ferrocene-palladium(II)dichloride.

24. The method of claim 21, wherein the base is triethyl amine or cesium carbonate.

25. The method of claim 21, wherein the reacting of the compound of formula IVa with the compound of $R^3$—Y further takes place in the presence of a co-catalyst.

26. The method of claim 25, wherein the co-catalyst is copper(I) iodide.

* * * * *